United States Patent
Yanaka et al.

(10) Patent No.: US 8,050,820 B2
(45) Date of Patent: Nov. 1, 2011

(54) VEHICLE

(75) Inventors: Akihiro Yanaka, Toyota (JP); Yoshikazu Motozono, Nishikama-gun (JP); Yasukazu Honda, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 877 days.

(21) Appl. No.: 12/089,476

(22) PCT Filed: Oct. 5, 2006

(86) PCT No.: PCT/JP2006/319998
§ 371 (c)(1),
(2), (4) Date: Apr. 7, 2008

(87) PCT Pub. No.: WO2007/043447
PCT Pub. Date: Apr. 19, 2007

(65) Prior Publication Data
US 2008/0290618 A1   Nov. 27, 2008

(30) Foreign Application Priority Data
Oct. 7, 2005   (JP) .................. 2005-295197

(51) Int. Cl.
*B60G 17/00* (2006.01)
*B62D 9/02* (2006.01)
*B62D 61/08* (2006.01)
(52) U.S. Cl. .................. 701/37; 280/124.103; 180/41
(58) Field of Classification Search .................. 701/37, 701/38; 280/124.103; 180/41, 210–217
See application file for complete search history.

(56) References Cited

U.S. PATENT DOCUMENTS

| | | | | |
|---|---|---|---|---|
| 2,757,938 A | * | 8/1956 | Crowder | 280/124.103 |
| 2,887,322 A | * | 5/1959 | De Monge | 280/104 |
| 4,484,648 A | | 11/1984 | Jephcott | |
| 4,659,106 A | * | 4/1987 | Fujita et al. | 280/124.103 |
| 4,887,829 A | * | 12/1989 | Prince | 280/282 |
| 5,116,069 A | * | 5/1992 | Miller | 280/5.509 |
| 5,580,089 A | * | 12/1996 | Kolka | 280/124.103 |
| 5,765,846 A | * | 6/1998 | Braun | 280/124.103 |
| 6,467,783 B1 | * | 10/2002 | Blondelet et al. | 280/124.106 |
| 6,511,078 B2 | * | 1/2003 | Sebe | 280/5.509 |
| 6,547,260 B2 | * | 4/2003 | Laurent et al. | 280/5.509 |
| 7,131,650 B2 | * | 11/2006 | Melcher | 280/5.52 |
| 7,246,806 B2 | * | 7/2007 | Andre et al. | 280/124.106 |
| 7,343,997 B1 | * | 3/2008 | Matthies | 180/215 |
| 7,401,794 B2 | * | 7/2008 | Laurent et al. | 280/5.514 |
| 7,648,148 B1 | * | 1/2010 | Mercier | 280/124.103 |
| 7,731,210 B2 | * | 6/2010 | Pedersen | 280/124.103 |
| 2001/0028154 A1 | | 10/2001 | Sebe | |

FOREIGN PATENT DOCUMENTS

| | | |
|---|---|---|
| EP | 1 078 844 A2 | 2/2001 |
| EP | 1 078 844 A3 | 2/2001 |
| FR | 967.710 | 11/1950 |
| FR | 2.153.205 | 5/1973 |

(Continued)

*Primary Examiner* — Ruth Ilan
(74) *Attorney, Agent, or Firm* — Oblon, Spivak, McClelland, Maier & Neustadt, L.L.P.

(57) ABSTRACT

When a vehicle turns, a body and a left and a right wheel are inclined inward of a turning circle. Consequently forces are exerted to an operator in an up-down direction, which leads to reducing discomfort felt by the operator. In addition, since a gravity center of the vehicle is moved inward of the turning circle, a turning stability of the vehicle is improved.

25 Claims, 39 Drawing Sheets

FOREIGN PATENT DOCUMENTS

| | | |
|---|---|---|
| FR | 2 400 147 | 3/1979 |
| JP | 62 45114 | 9/1987 |
| JP | 62 38442 | 10/1987 |
| JP | 3 253476 | 11/1991 |
| JP | 4-100724 | 4/1992 |
| JP | 4 125712 | 4/1992 |
| JP | 6-278442 | 10/1994 |
| JP | 7-156629 | 6/1995 |
| JP | 7 35822 | 8/1995 |
| JP | 8 34353 | 2/1996 |
| JP | 2001 515821 | 9/2001 |
| JP | 2004 123080 | 4/2004 |
| JP | 2005 82044 | 3/2005 |
| JP | 2005 112300 | 4/2005 |
| JP | 2006 219033 | 8/2006 |
| WO | WO 97/27071 | 7/1997 |
| WO | WO 99/12795 A1 | 3/1999 |
| WO | WO 99/14099 | 3/1999 |
| WO | WO 2005/051712 A2 | 6/2005 |
| WO | WO 2005/051712 A3 | 6/2005 |
| WO | WO 2005/058620 A1 | 6/2005 |
| WO | 2005 077683 | 8/2005 |

* cited by examiner

LP2 > LP1

θ foot > θ 'foot

FIG.14
(a) 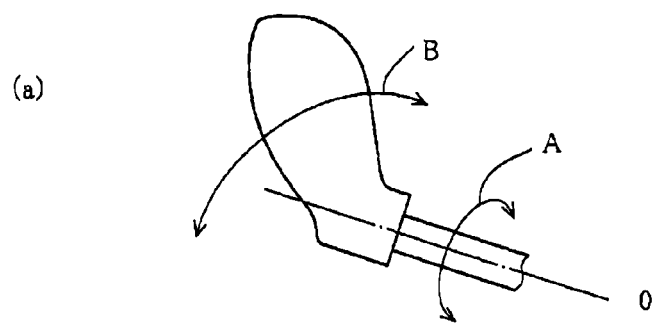
(b) 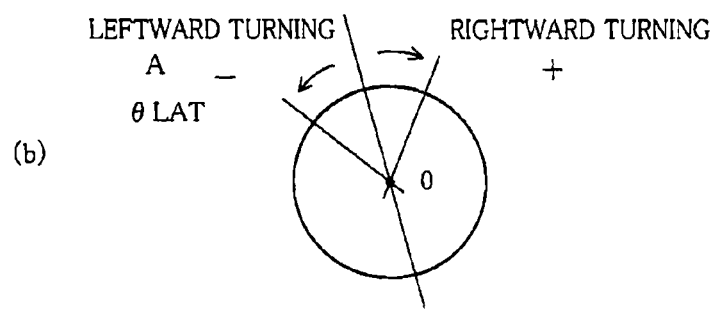
(c) 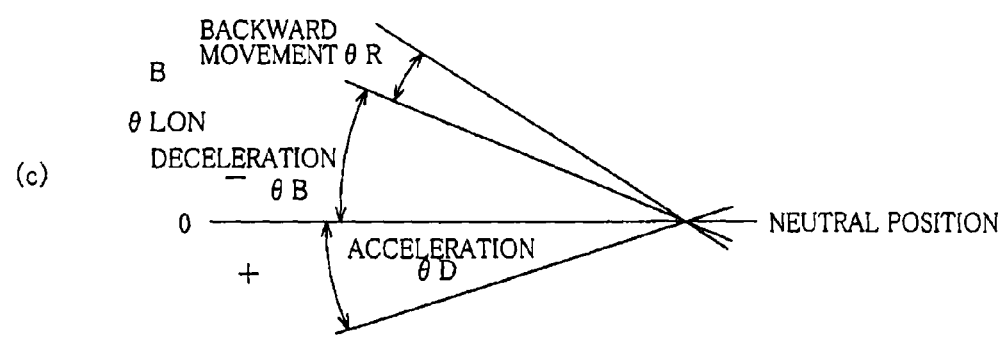

FIG.32
(a)
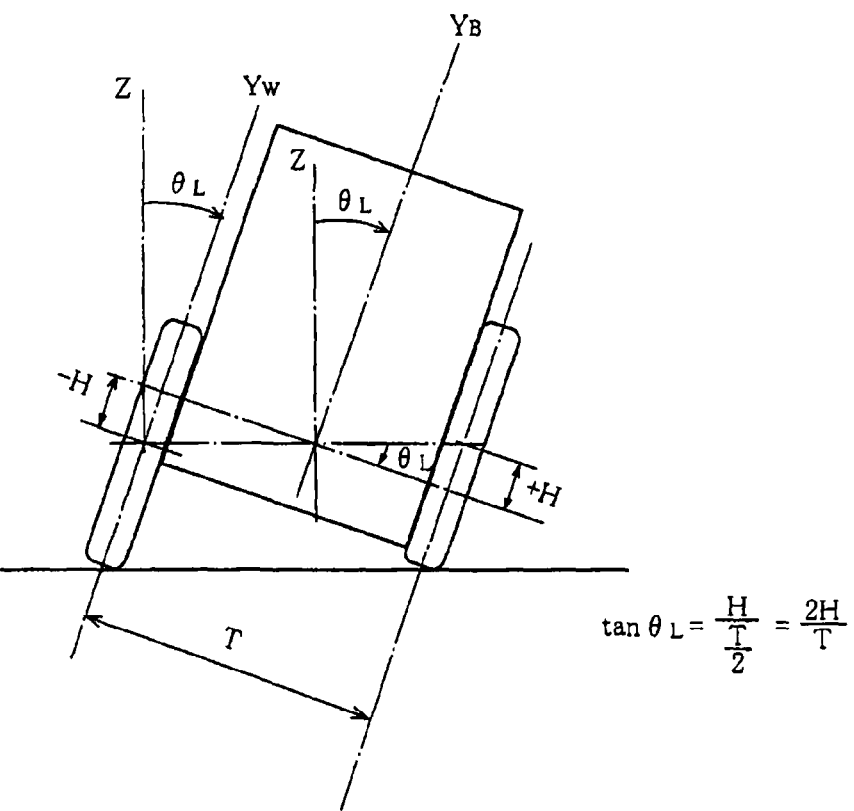
(b)
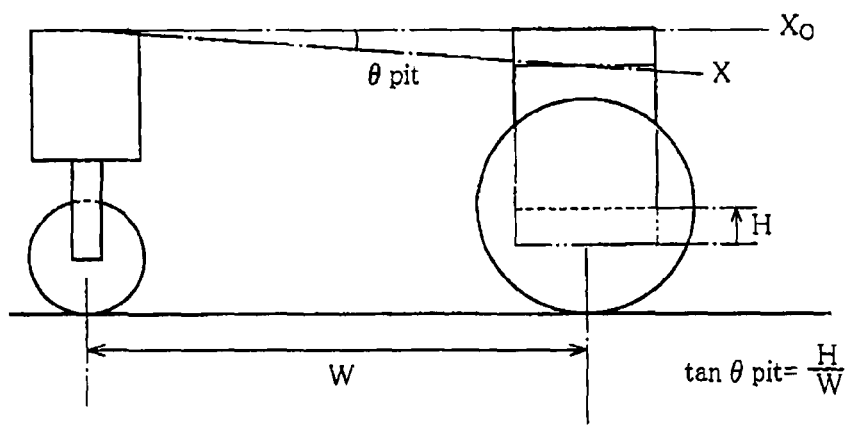

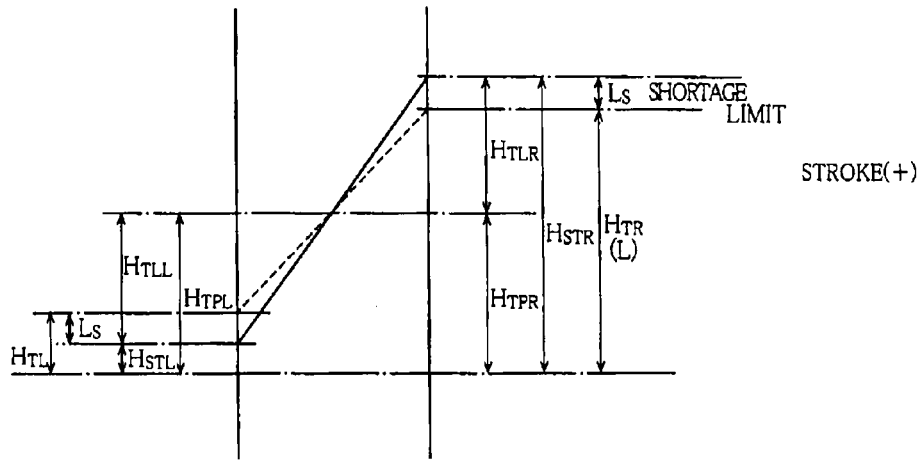

STROKE(+)

TARGET FRONT-REAR LEAN ANGLE=ACTUAL FRONT-REAR LEAN ANGLE $$\tan \theta_{Tpit} = \frac{H_{TPR}}{W} = \tan \theta_{pit}$$

TARGET LEFT-RIGHT LEAN ANGLE $\quad \tan \theta_{TL} = \frac{2H_{TLR}}{T}$

ACTUAL LEFT-RIGHT LEAN ANGLE $\quad \tan \theta_L = \frac{2(H_{TLR}-L_s)}{T} = \tan \theta_{TL} - \frac{2L_s}{T}$ (b)
(S60)

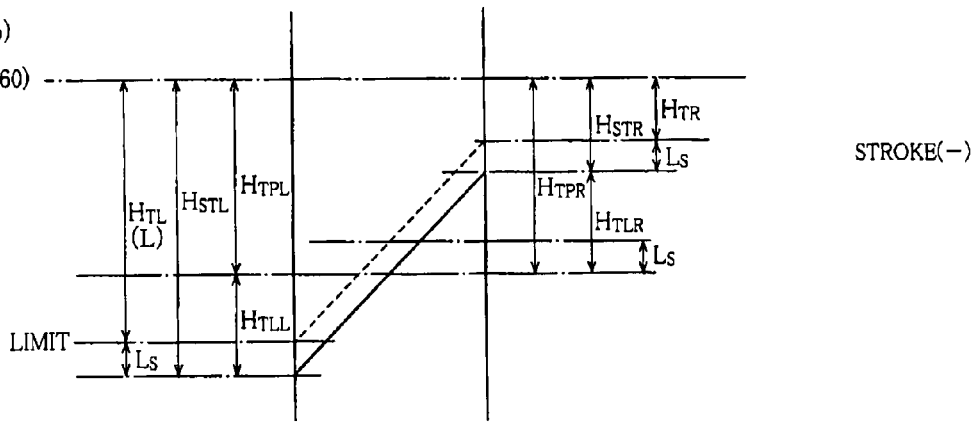

STROKE(−)

TARGET LEFT-RIGHT LEAN ANGLE $\quad \tan \theta_{TL} = \frac{2H_{TLR}}{T}$ (ACTUAL LEFT-RIGHT LEAN ANGLE)

TARGET FRONT-REAR LEAN ANGLE $\quad \tan \theta_{Tpit} = \frac{H_{TPR}}{W}$ (<0)

ACTUAL FRONT-REAR LEAN ANGLE $\quad \tan \theta_{pit} = \frac{H_{TPR}+L_s}{W}$ $$= \tan \theta_{Tpit} + \frac{L_s}{W}$$

VEHICLE

TECHNICAL FIELD

The present invention relates to a vehicle having two, three or four wheels.

BACKGROUND ART

Japanese Patent Application Publication No. 2005-112300 discloses a one-person vehicle having a body, a steering wheel attached to a front portion of the body, and a driving wheel attached to a rear portion of the body. In addition, Japanese Patent Application Publication No. 2005-82044 discloses a vehicle having a body, and a left wheel and a right wheel which are distant from each other in a widthwise direction of the body and whose positions relative to the body in upward and downward directions are adjustable. In this vehicle, the respective positions of the left and right wheels relative to the body in the upward and downward directions are so controlled as to keep the body horizontal.

DISCLOSURE OF INVENTION

An object of the present invention is to improve a turning performance of a vehicle.

The above object is achieved according to each of the following modes:

(1) A vehicle having (a) a body and (b) at least a pair of wheels consisting of a left wheel and a right wheel which are distant from each other in a widthwise direction of the body, the vehicle being characterized by comprising:

an up-down moving device which is provided between the body and each of the left wheel and the right wheel and which moves said each of the left wheel and the right wheel relative to the body in upward and downward directions; and a lateral-direction posture control device which controls, when the vehicle turns, the up-down moving device so that a position of the left wheel relative to the body and a position of the right wheel relative to the body differ from each other and accordingly the body and the left and right wheels are inclined, relative to a road surface, inward of a turning circle of the vehicle.

If the position of the left wheel relative to the body in the upward and downward directions and the position of the right wheel relative to the body in the upward and downward directions differ from each other, the wheels and the body are inclined relative to the road surface. According to the present invention, when the vehicle turns, the wheels and the body are inclined inward of the turning circle. That is, respective upper portions of the two wheels are moved more inward of the turning circle than respective lower portions of the wheels are moved, and an upper portion of the body is moved more inward of the turning circle than a lower portion of the body.

If the wheels and the body are inclined inward of the turning circle, a gravity center of the vehicle (including an operator riding thereon) is moved inward of the turning circle. Consequently an intersection point of (a) a resultant force of a centrifugal force and a gravitational force each exerted to the vehicle and (b) the road surface is located inside a locus of turning of the vehicle. Thus, a turning stability of the vehicle is improved.

The wheels and the body may be inclined such that the respective positions of the left and right wheels relative to the body in the upward and downward directions are changed symmetrically with each other with respect to a neutral position. In this case, a height position of the gravity center of the vehicle as measured from the road surface is lowered. Therefore, the turning stability of the vehicle is further improved.

In addition, if the wheels and the body are inclined inward of the turning circle, a direction of the resultant force of the centrifugal force and the gravitational force exerted to the vehicle approaches a direction in which an upper half portion (or a backbone) of the operator's body extends. Therefore, the operator can feel improved running comfort, as compared with the case where a lateral-direction force is exerted to the operator.

The up-down moving device is operated with supply of power such as electric energy, and is not operated with an operating force applied by the operator to an operable member, i.e., is not mechanically connected to the operable member.

The up-down moving device may be one which is operated in response to the operator's operation of a posture-control instructing member (i.e., an electric signal corresponding to the operation), or one which is operated based on a running state of the vehicle (e.g., a turning state of the same).

The clause "when the vehicle turns" encompasses at least a case where the vehicle is actually in a turning state, and a case where the operator has operated a steering instructing member so as to instruct turning of the vehicle.

The present vehicle includes at least the left and right wheels that are distant from each other in the widthwise direction of the body. However, the vehicle may further include one or more wheels that is or are distant from the left and right wheels in a front-rear direction of the vehicle.

(2) The vehicle according to the mode (1), wherein the lateral-direction posture control device comprises an inclination-angle determining portion which determines an inclination angle defined as an angle of each of respective planes on which the left wheel and the right wheel rotate, relative to a normal line of the road surface, such that an absolute value of the inclination angle is greater when a centrifugal force exerted to the vehicle is great than when the centrifugal force is small.

When the centrifugal force is great, a great centripetal force is needed. Meanwhile, a gripping force of a tire is greater when the absolute value of the inclination angle is great than the absolute value is small. Hence, the absolute value of the inclination angle is made greater when the centrifugal force is great than when the centrifugal force is small. Thus, the centripetal force (i.e., the gripping forces of the tires) balanced with the centrifugal force can be obtained.

The centrifugal force may be directly detected by a lateral-acceleration sensor or the like, or may be indirectly obtained based on a running state of the vehicle. For example, the centrifugal force may be obtained based on a steering angle of a steering wheel, a running speed of the vehicle, etc.

(3) The vehicle according to the mode (1) or the mode (2), wherein the lateral-direction posture control device comprises a gravity-center-height-position-change restraining portion which restrains a change of a height position of a gravity center of the vehicle when a turning direction of the vehicle in a turning state is changed to a direction opposite to the turning direction, as compared with when the vehicle in a straight running state is changed to the turning state.

When the left and right wheels and the body are inclined in the lateral direction, the two wheels may be moved, in the upward and downward directions, symmetrically with each other with respect to the neutral position. More specifically described, one of the left and right wheels is moved upward (to the bound side) relative to the body from the neutral position and the other wheel is moved downward (to the rebound side) relative to the body from the neutral position.

The neutral position is defined as a position of each wheel relative to the body in a state in which the inclination angle of the wheels and the body is equal to zero.

If the left and right wheels and the body are moved relative to each other, in the upward and downward directions, symmetrically with each other with respect to the neutral position, the height position of the gravity center of the vehicle changes as the inclination angle changes. If the change of height position of the gravity center is great, the operator feels discomfort. In addition, it is difficult for the vehicle to quickly change the turning directions of the vehicle.

When the vehicle changes from a straight running state to a turning state, the left and right wheels and the body are inclined inward of a turning circle. In this case, if one of the two wheels is moved upward relative to the body from the neutral position and the other wheel is moved downward by the same amount relative to the body from the neutral position, then the height position of the gravity center of the vehicle as measured from the road surface is lowered.

Conversely, when the vehicle changes from the turning state to the straight running state, the inclination of the wheels and the body is canceled or zeroed. In this case, if one of the two wheels is moved downward to the neutral position and the other wheel is moved upward by the same amount to the neutral position, then the height position of the gravity center of the vehicle is raised.

When the direction of turning of the vehicle is changed to the opposite direction, the direction of inclination of the wheels and the body is also changed to the opposite direction. In this case, first, one of the two wheels is moved downward to the neutral position and the other wheel is moved upward by the same amount to the neutral position, so that the two wheels are located at the neutral position. Then, the one wheel is moved downward from the neutral position and the other wheel is moved upward by the same amount from the neutral position. Therefore, when the two wheels are located at the neutral position, the gravity center takes the highest position and, before and after the two wheels are located at the neutral position, the height position of the gravity center increases and then decreases, respectively.

The operator feels the stronger discomfort caused by the change of height position of the gravity center, when the direction of turning of the vehicle is changed to the opposite direction, than when the vehicle is changed from the straight running state to the turning state or vice versa. In addition, it is strongly needed to quickly change the direction of turning of the vehicle to the opposite direction (i.e., quickly steer back the vehicle). Therefore, in the vehicle in accordance with the present mode, the change of height position of the gravity center caused by the change of the inclination angle of the wheels and the body is more strongly restrained when the direction of turning of the vehicle is changed to the opposite direction, than when the vehicle is changed from the straight running state to the turning state or vice versa. Thus, the discomfort felt by the operator when the vehicle is steered back can be reduced and the steering-back of the vehicle can be quickly carried out.

Meanwhile, in the vehicle in accordance with the present mode, it is possible to keep the gravity center at a constant height position when the direction of turning of the vehicle is changed to the opposite direction. However, it is not necessarily required to keep the gravity center at the constant height position, so long as the change of height position of the gravity center is decreased as compared with the case where the two wheels are moved in the upward and downward directions symmetrically with each other with respect to the neutral position.

Meanwhile, the change of height position of the gravity center occurs not only when the left and right wheels are moved in the upward and downward directions symmetrically with each other with respect to the neutral position, but also when the two wheels are moved asymmetrically with each other with respect to the neutral position. That is, the present mode is also applicable to a mode in which the left and right wheels are moved in the upward and downward directions, asymmetrically with each other with respect to the neutral position.

(4) The vehicle according to the mode (3), wherein the lateral-direction posture control device further comprises a relative-position control device which moves the left wheel and the right wheel relative to the body in the upward and downward directions, symmetrically with each other with respect to a neutral position, so as to incline the body and the left and right wheels with respect to a lateral direction, and wherein the gravity-center-height-position-change restraining portion comprises a neutral-position changing portion which changes the neutral position such that a height position of the neutral position as measured from the road surface is more largely lowered when an absolute value of an inclination angle of the left and right wheels is small than when the absolute value of the inclination angle is great.

As described above, in the case where the left and right wheels are moved in the upward and downward directions symmetrically with each other with respect to the neutral position, the gravity center takes the highest position as measured from the road surface, when the absolute value of the inclination angle is equal to zero (i.e., the respective positions of the left and right wheels relative to the body are equal to the neutral position). Therefore, if the neutral position, i.e., the height position as measured from the road surface is more largely lowered as the absolute value of the inclination angle is decreased, the change of height position of the gravity center can be restrained.

(5) The vehicle according to the mode (4), wherein the neutral-position changing portion comprises a neutral-position determining portion which determines the neutral position according to a speed of change of the turning direction of the vehicle.

Usually, the speed of change of the turning direction of the vehicle is small (i.e., the absolute value of the acceleration of change of the turning direction is great) when the change starts or ends, and is great during the progress of the change. Therefore, it can be speculated that when the turning direction is changed to the opposite direction, the speed of change of the turning direction takes the greatest value at the middle point of change of the turning direction (i.e., at the time when the vehicle is in the straight running state).

Thus, if the neutral position as the position measured from the road surface is changed such that the neutral position is more largely lowered when the speed of change of the turning direction is high than when the speed of change is low, then the neutral position is more largely lowered when the absolute value of the inclination angle is small than when the absolute value is great, and takes the lowest height position when the inclination angle is equal to zero.

Thus, in the case where the inclination angle of the wheels and the body is controlled by moving the left and right wheels relative to the body symmetrically with each other with respect to the neutral position, if the neutral position is changed as described above, the change of height position of the gravity center of the vehicle caused when the turning direction of the vehicle is changed to the opposite direction, can be effectively restrained.

The speed of change of the turning direction may be obtained based on a speed of change of a steering angle of a steering wheel of the vehicle, a yaw rate of the vehicle, or a speed of change of a steering angle (i.e., an operation state) of a steering instructing member which is operable by the operator.

(6) The vehicle according to any of the modes (3) through (5), further comprising a steering instructing member which is operable by an operator, wherein the gravity-center-height-position-change restraining portion operates when a speed of operation of the steering instructing member is not lower than a pre-set speed.

In the case where the turning direction of the vehicle is changed to the opposite direction, if the wheels and the body are inclined at a higher speed when the speed of operation of the steering instructing member is high than when the speed of operation is low, then the discomfort felt by the operator due to the change of height position of the gravity center of the vehicle is stronger when the speed of operation of the steering instructing member is high than when the speed of operation is low. In addition, then it is required to quickly change the turning direction of the vehicle to the opposite direction. Therefore, it is reasonable to restrain the change of height position of the gravity center when the speed of operation of the steering instructing member is not lower than the pre-set speed.

(7) The vehicle according to any of the modes (1) through (6), wherein the lateral-direction posture control device comprises a feed-back control portion which controls the up-down moving device based on at least one of a roll angle and a roll rate of the vehicle.

If the up-down moving device is controlled so that an actual roll angle approaches a target roll angle, or is controlled when the absolute value of the roll rate is not smaller than a pre-set value, then the posture of the body can be controlled to an appropriate one.

The control of the vehicle's posture with respect to the lateral direction may be performed by either a feed-back control or a feed-forward control. However, in a case where the position of the gravity center of the vehicle (including the operator) largely changes depending on the presence or absence of the operator and/or the build of the operator, the feed-back control is preferable to the feed-forward control.

In a case where the up-down moving device is controlled based on both the roll angle and the roll rate, the up-down moving device can be more accurately controlled as compared with a case where the moving device is controlled based on either one of the roll angle and the roll rate.

(8) The vehicle according to any of the modes (1) through (7), wherein the up-down moving device comprises a left-side moving device and a right-side moving device which respectively move, in the upward and downward directions, the left wheel and the right wheel each relative to the body and parallel to each other, and wherein the left-side moving device and the right-side moving device comprise respective guide members which extend parallel to each other.

The left and right wheels are moved relative to the body in the upward and downward directions along the left and right guide members, respectively. Since the left and right guide members extend parallel to each other in the upward and downward directions, the left and right wheels are moved relative to the body and parallel to each other.

Therefore, the angle of inclination of the wheels and the angle of inclination of the body are equal to each other and accordingly the inclination angles can be easily controlled.

(9) The vehicle according to any of the modes (1) through (8), further comprising (a) at least one wheel which is attached to a portion of the body that is distant from the left and right wheels in a front-rear direction, and (b) a front-rear-direction posture control device which controls at least the up-down moving device to move the left and right wheels relative to the body in a same direction and thereby controls an inclination of the body relative to the road surface with respect to the front-rear direction.

Since the inclination of the body with respect to the front-rear direction can be controlled, the running stability of the vehicle, for example, when the vehicle is being braked or driven can be improved. In addition, since the body can be inclined in the front-rear direction, a direction of a resultant force of a gravitational force and an inertia force exerted to the vehicle can be made nearer to the upward and downward directions in which an upper half portion of the operator's body extends. Therefore, the riding comfort felt by the operator can be improved as compared with the case where forces are exerted to the operator in the front-rear direction.

For example, in the case where the left and right wheels are provided in rear of the at least one wheel, if the left and right wheels are moved upward (to the bound side) relative to the body, then the rear portion of the body is lowered; and if the left and right wheels are moved downward (to the rebound side) relative to the body, then the rear portion of the body is raised.

The at least one wheel, attached to the portion of the body that is distant from the left and right wheels in the front-rear direction, may also be associated with the up-down moving device. In this case, the inclination of the body with respect to the front-rear direction can be controlled by controlling at least one of (a) the respective positions of the left and right wheels relative to the body in the upward and downward directions and (b) a position of the at least one wheel relative to the body in the upward and downward directions. A single wheel or two wheels may be attached to the portion of the body that is distant from the left and right wheels in the front-rear direction.

(10) The vehicle according to the mode (9), wherein the front-rear-direction posture control device comprises an acceleration-deceleration-related front-rear-direction inclining portion which controls the up-down moving device to lower a front portion of the body relative to a rear portion thereof when the vehicle is accelerated by being driven and to lower the rear portion of the body relative to the front portion thereof when the vehicle is decelerated by being braked.

The gravity center of the vehicle is moved rearward when the vehicle is driven and accelerated. In this case, if the front portion of the body is lowered relative to the rear portion thereof an inclination of the body with respect to the front-rear direction, caused by the acceleration, can be restrained and accordingly an amount of rearward movement of the gravity center can be decreased.

When the vehicle is braked and decelerated, the gravity center of the vehicle is moved frontward. In this case, if the rear portion of the body is lowered relative to the front portion thereof an inclination of the body with respect to the front-rear direction, caused by the deceleration, can be restrained and accordingly an amount of frontward movement of the gravity center can be decreased.

Whether the vehicle is being driven and accelerated and whether the vehicle is being braked and decelerated can be judged based on a positive or negative sign of an actual front-rear-direction acceleration of the vehicle, an operation state of an acceleration-deceleration instructing member operated by the operator, or an operation state of a drive device or a brake device (or a device that functions as both a drive device and a brake device).

(11) The vehicle according to the mode (9) or the mode (10), wherein the acceleration-deceleration-related front-rear-direction inclining portion comprises an inclination-angle determining portion which determines an inclination angle of the body with respect to the front-rear direction such that an absolute value of the inclination angle of the body is greater when an absolute value of a front-rear-direction acceleration of the vehicle is great than when the absolute value of the front-rear-direction acceleration is small.

(12) The vehicle according to any of the modes (9) through (11), wherein the front-rear-direction posture control device comprises an inclination-angle restraining portion which determines an inclination angle of the body with respect to the front-rear direction such that the inclination angle of the body is smaller when at least one of braking and driving occurs to the vehicle in a turning state, than when at least one of braking and driving occurs to the vehicle in a straight running state.

If the vehicle is braked or driven when it is turning, the absolute value of the inclination angle of the body with respect to the front-rear direction is made smaller as compared with the case where the vehicle is braked or driven when it is running straight. Thus, even if the vehicle may be braked or driven when it is turning, the running stability of the vehicle can be prevented from lowering. The clause "when at least one of braking and driving occurs to the vehicle" means not only a state in which the vehicle is actually braked or driven but also a state in which the braking or driving of the vehicle is requested.

(13) The vehicle according to any of the modes (9) through (12), wherein the front-rear-direction posture control device comprises a feed-back control portion which controls an inclination angle of the body with respect to the front-rear direction, based on at least one of a pitch angle and a pitch rate of the vehicle.

(14) The vehicle according to any of the modes (1) through (13), further comprising (a) at least one steering wheel which is attached to a portion of the body that is located in front of the left and right wheels; (b) a steering device which steers said at least one steering wheel; and (c) a steering control device which controls the steering device and thereby controls steering of said at least one steering wheel.

The steering of the at least one steering wheel may be controlled based on, e.g., the turning state of the vehicle or the operation state of the steering instructing member operated by the operator, as will be described later.

The vehicle may have one or two steering wheels, that is, the vehicle may be a three-wheel or four-wheel vehicle.

(15) The vehicle according to the mode (14), further comprising (a) a steering instructing member which is operable by an operator; and (b) a steering-instruction detecting device which detects an operation state of the steering instructing member, wherein the steering control device comprises an operation-state-dependent steering control portion which controls the steering of said at least one steering wheel based on the operation state of the steering instructing member detected by the steering-instruction detecting device.

(16) The vehicle according to the mode (15), wherein the operation-state-dependent steering control portion comprises an opposite-direction steering portion which steers, when the operation state of the steering instructing member detected by the steering-instruction detecting device has changed, said at least one steering wheel in an opposite direction that is opposite to a steering direction corresponding to a direction of the change of the operation state.

If the at least one steering wheel is steered, then a lateral force is exerted to the tire of the steering wheel, and accordingly a roll moment is exerted to the body in a direction to cause the body to be inclined outward of the turning circle. This inclination direction is opposite to the steering direction, i.e., the inward direction with respect to the turning circle corresponding to the operation state of the steering instructing member. Therefore, if the steering wheel is steered in the direction opposite to the steering direction corresponding to the operation state of the steering instructing member, then the body can be inclined inward of the turning circle (i.e., outward of a turning circle corresponding to the steering of the steering wheel in the opposite direction).

Even if the respective positions of the left and right wheels relative to the body may be changed, the body cannot be readily inclined. On the other hand, if the steering wheel is steered in the opposite direction, the body can be quickly inclined inward of the turning circle. Thus, the present vehicle can advantageously perform a slalom running or a quick turn.

The steering device including the opposite-direction steering portion in accordance with this mode may be employed by a vehicle that does not employ at least one of the lateral-direction-posture control device and the lateral-direction-posture control device.

(17) The vehicle according to the mode (16), wherein the opposite-direction steering portion comprises an opposite-direction-steering-angle determining portion which determines, according to at least a speed of the change of the operation state of the steering instructing member detected by the steering-instruction detecting device, a steering angle of said at least one steering wheel in the opposite direction.

The turning direction of the vehicle needs to be more quickly changed when the speed of operation of the steering instructing member is high than when the speed is low. Meanwhile, as the steering angle of the steering wheel in the opposite direction is increased, the lateral force exerted to the tire of the steering wheel is also increased and accordingly the roll moment exerted to the body is also increased. Thus, the body can be inclined more reliably.

In the vehicle in accordance with this mode, the absolute value of the steering angle may be continuously or stepwise increased as the speed of change of the operation state of the steering instructing member is increased. For example, when the speed of change is lower than a pre-set speed, then the steering angle may be made equal to zero and, when the speed of change is not lower than the pre-set speed, then the steering angle may be selected at a pre-set angle greater than zero. Alternatively, when the speed of change is not lower than a pre-set speed, then the steering angle may be continuously increased according to the speed of change. Otherwise, the steering angle may be continuously increased in proportion to the change of operation state of the steering instructing member.

(18) The vehicle according to the mode (17), wherein the opposite-direction-steering-angle determining portion determines the steering angle of said at least one steering wheel in the opposite direction, such that an absolute value of the steering angle is greater when a running speed of the vehicle is high than when the running speed is low.

For example, in the case where the vehicle runs forward, the absolute value of the steering angle in the opposite direction may be made greater when the running speed of the vehicle is high than when the running speed is low, because a centrifugal force as a reaction force against a force to incline the vehicle inward of the turning circle is greater when the running speed is high than when the running speed is low; and when the vehicle moves backward, the steering in the opposite direction may not be permitted because in this case it is not necessarily required to steer the vehicle in the opposite direction.

(19) The vehicle according to any of the modes (16) through (18), wherein the opposite-direction steering portion comprises a normal-state opposite-direction steering portion which does not steer said at least one steering wheel in the opposite direction when the vehicle is in a roll-over state, and steers said at least one steering wheel in the opposite direction when the vehicle is not in the roll-over state.

It is not desirable that the steering in the opposite direction be permitted when the vehicle is in the roll-over state. Therefore, it is reasonable to permit the steering in the opposite direction only in the case where the operation state of the steering instructing member has changed when the vehicle is not in the roll-over state.

For example, it may be judged that the vehicle is in the roll-over state, if a tendency of spinning of the vehicle is not lower than a pre-set degree, if a roll rate to cause the vehicle to be inclined outward of the turning circle has occurred, or if a side slip of the vehicle is not smaller than a pre-set value.

(20) The vehicle according to any of the modes (14) through (19), wherein the steering control device comprises a roll-over restraining portion which restrains a roll-over state of the vehicle by decreasing an absolute value of a steering angle of said at least one steering wheel.

The roll-over restraining portion starts its operation when a predetermined starting condition is met, and ends the operation when a predetermined ending condition is met.

For example, the starting condition is met if at least one of (a) a condition that a roll rate to cause the body to be inclined outward of the turning circle has been detected, and (b) a condition that a difference of (b1) a roll rate obtained based on respective changes of the respective positions of the left and right wheels relative to the body and (b2) an actual roll rate is not smaller than a pre-set value is met.

In addition, the ending condition may be met if at least one of (a) a condition that the roll rate has lowered to a value not greater than a pre-set value, and (b) a condition that the operator has corrected the steering angle by an amount enough to restrain the rolling-over state of the vehicle.

The roll-over restraining portion may be one that is adapted to lower the running speed of the vehicle.

(21) The vehicle according to the mode (20), further comprising (a) a steering instructing member which is operable by the operator; and (b) a steering-instruction detecting device which detects an operation state of the steering instructing member, wherein the steering control device further comprises a selecting portion which controls, when an angle of returning of said at least one steering wheel that corresponds to an amount of operation of the steering instructing member detected by the steering-instruction detecting device is smaller than an angle of returning of said at least one steering wheel by the roll-over restraining portion, the roll-over restraining portion to control the steering angle of said at least one steering wheel, and which does not control, when the angle of returning of said at least one steering wheel that corresponds to the amount of operation of the steering instructing member is greater than the angle of returning of said at least one steering wheel by the roll-over restraining portion, the roll-over restraining portion to control the steering angle of said at least one steering wheel.

The returning angle is defined as an amount of decrease of the absolute value of the steering angle.

It is difficult to distinguish the operator's operation of the steering instructing member to restrain the rolling-over state of the vehicle and the operation of the steering instructing member to steer back the vehicle, from each other. Therefore, if, when the vehicle is in the roll-over state, the steering instructing member is operated to change the turning direction to the opposite direction or to increase the turning radius, the roll-over restraining portion decreases the absolute value of the steering angle, so long as the amount of decrease required by the operation of the instructing member falls within a predetermined operation range of the roller-over restraining portion. However, if the amount of decrease required by the operation of the steering instructing member does not fall within the predetermined operation range of the roll-over restraining portion (i.e., if the returning angle corresponding to the operator's operation of the steering instructing member is greater than the greatest returning angle under the control of the roll-over restraining portion), the steering wheel is steered according to the operation of the steering instructing member.

(22) The vehicle according to any of the modes (14) through (21), wherein the steering control portion further comprises a rotation-speed-difference control portion which controls, according to a turning state of the vehicle, a difference of respective rotation speeds of the left and right wheels.

Since the difference of the respective rotation speeds of the left and right wheels is controlled, the turning radius can be decreased and accordingly the vehicle can turn along the small circle.

In the case where the left and right wheels are directly connected to respective drive sources that are independent of each other, if an appropriate difference of the respective rotation speeds of the left and right wheels is produced according to the current turning state of the vehicle, the occurrence of a phenomenon called "tight-corner braking" can be avoided.

However, the difference of the respective rotation speeds of the left and right wheels may be controlled based on the steering angle or the operation state of the steering instructing member.

(23) The vehicle according to any of the modes (14) through (22), further comprising: (a) a steering instructing member which is operable by the operator; and (b) a steering-instruction detecting device which detects an operation state of the steering instructing member, wherein the steering control device further comprises an after-posture-control steering control portion which, after the lateral-direction posture control device has started a control to incline, according to the operation state of the steering instructing member, the body and the left and right wheels inward of the turning circle when the steering-instruction detecting device has detected the operation state of the steering instructing member caused by the operator, controls the steering device to steer said at least one steering wheel.

In the vehicle in accordance with this mode, the steering control is started after the posture control is started. That is, the posture control is prior to the steering control.

The steering control may be started during, or after, the posture control. If, however, the steering control is started during the posture control, then the vehicle can be advantageously inclined and can quickly take a posture corresponding to a desired turning state.

In the case where the difference of the respective rotation speeds of the left and right wheels is controlled according to the preceding mode, it is desirable that the control of the difference be started after the posture control is started and be synchronized with the control of steering of the steering wheel.

The vehicle may be inclined as the steering instructing member is operated. In this case, the operator can utilize the steering instructing member to support his or her body. In addition, when the direction of operation of the steering instructing member (corresponding to the turning direction, i.e., the inward direction of the turning circle) and the direction of inclination of the body (i.e., the inward direction of the turning circle) are the same direction, the operator can enjoy the improved feeling of operation of the steering instructing member.

(24) The vehicle according to any of the modes (1) through (23), further comprising (a) at least one wheel which is attached to a portion of the body that is distant from the left and right wheels in a front-rear direction; (b) a front-rear-direction posture control device which controls at least the up-down moving device to move the left and right wheels relative to the body in a same direction, and thereby controls an inclination of the body relative to the road surface with respect to the front-rear direction; (c) a drive device which drives at least one driving wheel of a plurality of wheels comprising the left and right wheels and said at least one wheel; (d) a steering device which steers at least one steering wheel of the plurality of wheels; (e) a steering control device which controls the steering device based on an operation state of a steering instructing member; and (f) a posture-control-failure-related running-state control device which, when at least one of the lateral-direction posture control device and the front-rear-direction posture control device fails to control a corresponding one of a lateral-direction posture and a front-rear-direction posture of the vehicle to a desirable posture, decreases at least one of an absolute value of a steering angle of said at least one steering wheel and a front-rear-direction acceleration of the vehicle.

When the posture of the vehicle cannot be controlled to a desirable posture, the running state of the vehicle is so controlled as to agree with the posture, in such a manner that, e.g., the absolute value of the steering angle is decreased or the acceleration caused by the driving of the vehicle is decreased. Thus, the running stability of the vehicle can be improved.

The clause "when the posture of the vehicle cannot be controlled to a desirable posture" may mean a case where the up-down moving device cannot move at least one wheel beyond a limited movement (stroke) range defined by the construction of the moving device, or a case where the lateral-direction posture control device or the front-rear-direction posture control device has failed to operate.

(25) The vehicle according to any of the modes (1) through (24), further comprising (a) at least one wheel which is attached to a portion of the body that is distant from the left and right wheels in a front-rear direction; and (b) a front-rear-direction posture control device which controls at least the up-down moving device to move the left and right wheels relative to the body in a same direction, and thereby controls an inclination of the body relative to the road surface with respect to the front-rear direction, wherein the front-rear-direction posture control device comprises a turning-braking-related control portion which controls, when turning and braking occur to the vehicle, the up-down moving device according to a deceleration of the vehicle and thereby lowers a rear portion of the body relative to a front portion thereof, and wherein the lateral-direction posture control device comprises a limit-using lateral-direction posture control portion which controls, when turning and braking occur to the vehicle, the up-down moving device to move the left and right wheels within respective limited movement ranges thereof, according to a centrifugal force exerted to the vehicle, and thereby inclines the body inward of the turning circle.

(26) The vehicle according to the mode (25), further comprising (a) a steering device which steers said at least one wheel; (b) a steering control device which controls the steering device and which comprises a steering restraining portion which, when the limit-using lateral-direction-posture control portion controls the up-down moving device while being limited by at least one of the limited movement ranges, controls the steering device such that an absolute value of a steering angle of said at least one wheel is smaller than an absolute value of a steering angle of said at least one wheel on an assumption that the limit-using lateral-direction-posture control portion controls the up-down moving device while being not limited by either of the respective limited movement ranges.

In the case where turning and braking occur to the vehicle, a posture control corresponding to the braking has priority over a posture control corresponding to the turning, because it is more important to attain a braking stability.

(27) The vehicle according to any of the modes (1) through (26), further comprising (a) at least one wheel which is attached to a portion of the body that is distant from the left and right wheels in a front-rear direction; and (b) a front-rear-direction posture control device which controls at least the up-down moving device to move the left and right wheels relative to the body in a same direction, and thereby controls an inclination of the body relative to the road surface with respect to the front-rear direction, wherein the lateral-direction posture control device comprises a turning-driving-related control portion which controls, when turning and driving occur to the vehicle, the up-down moving device according to a centrifugal force exerted to the vehicle and thereby inclines the body inward of the turning circle, and the front-rear-direction posture control device comprises a limit-using front-rear-direction-posture control portion which controls, when turning and driving occur to the vehicle, the up-down moving device to move the left and right wheels within respective limited movement ranges thereof, according to an acceleration of the vehicle, and thereby lowers a front portion of the body relative to a rear portion thereof.

(28) The vehicle according to the mode (27), further comprising (a) a drive device which drives at least one driving wheel of a plurality of wheels comprising the left and right wheels and said at least one wheel; (b) a driving control device which controls the drive device and which comprises an acceleration restraining portion which, when the limit-using front-rear-direction posture control portion controls the up-down moving device while being limited by at least one of the respective limited movement ranges, controls the drive device such that an acceleration of the vehicle is smaller than an acceleration of the vehicle when the limit-using front-rear-direction posture control portion controls the up-down moving device while being not limited by either of the respective limited movement ranges.

In the case where turning and driving occur to the vehicle, a posture control corresponding to the turning has priority over a posture control corresponding to the driving, because in many cases there arises no problem even if the acceleration caused by the driving may be kept low.

(29) The vehicle according to any of the modes (1) through (28), further comprising (a) at least one steering wheel which is attached to a portion of the body that is located in front of the left and right wheels; (b) a steering device which steers said at least one steering wheel; and (c) a steering control device which controls the steering device and thereby controls steering of said at least one steering wheel, wherein the steering control device comprises a steering restraining portion which, when the lateral-direction posture control portion cannot control, according to a centrifugal force exerted to the vehicle, the up-down moving device to move the left and right wheels relative to the body in the upward and downward directions, controls the steering device such that an absolute value of a steering angle of said at least one steering wheel is smaller than an absolute value of a steering angle of said at least one steering wheel when the lateral-direction-posture control portion can control the up-down moving device according to the centrifugal force.

In the case where the posture of the body with respect to the lateral direction cannot be controlled to a posture corresponding to a turning state required by the operator, the absolute value of the steering angle is decreased. Thus, the turning state of the vehicle and the lateral-direction posture thereof can agree with each other.

The absolute value of the steering angle may be decreased based on a roll angle and/or a roll rate of the vehicle.

The decreasing of the absolute value of the steering angle may be either decreasing of the absolute value of the target steering angle or decreasing of the absolute value of the actual steering angle.

In the case where the lateral-direction posture cannot be controlled, it is possible to control the drive device or the brake device to lower the running speed of the vehicle or limit the acceleration of the vehicle.

The clause "when the lateral-direction-posture control portion fails to control, according to a centrifugal force exerted to the vehicle, the up-down moving device" may mean, as described above, the case where the up-down moving device cannot move at least one wheel beyond the limited movement (stroke) range defined by the construction of the moving device, or the case where the lateral-direction posture control device or the front-rear-direction posture control device has failed to operate. In the case where the up-down moving device cannot move at least one wheel beyond the limited movement range, the request to control the current posture to the desirable posture cannot be fully met, but the current posture can be so changed as to approach the desirable posture.

(30) The vehicle according to any of the modes (1) through (29), further comprising (a) at least one wheel which is attached to a portion of the body that is distant from the left and right wheels in a front-rear direction; (b) a front-rear-direction posture control device which controls at least the up-down moving device to move the left and right wheels relative to the body in a same direction and thereby controls an inclination of the body relative to the road surface with respect to the front-rear direction; (c) an obtaining device which obtains at least one of an angle of inclination of the body with respect to the front-rear direction and an angular speed of the inclination of the body; (d) a drive device which drives at least one driving wheel of a plurality of wheels comprising the left and right wheels and said at least one wheel; and (e) a driving control device which controls the drive device and which comprises an acceleration restraining portion which, when the front-rear-direction posture control portion cannot control, according to a front-rear-direction acceleration of the vehicle, a front-rear-direction posture of the vehicle, controls the drive device based on said at least one of the angle of inclination of the body with respect to the front-rear direction and the angular speed of the inclination of the body, and thereby restrains the acceleration of the vehicle.

When the posture of the vehicle with respect to the front-rear direction does not agree with the running state of the vehicle, it is desirable to restrain the acceleration of the vehicle. For example, the acceleration may be more strongly restrained when the absolute value of a pitch angle (i.e., an angle of inclination of the body with respect to the front-rear direction) or a pitch rate (i.e., an angular speed of the inclination of the body with respect to the front-rear direction) is great than when the absolute value of the pitch angle, or the pitch rate is small. For example, the acceleration may be restrained in such a manner that when both the pitch angle and the pitch rate are considerably small, the acceleration is not restrained; when at least one of the pitch angle and the pitch rate exceeds a first pre-set value, the acceleration is limited by an upper limit so as not to exceed the upper limit; when at least one of the pitch angle and the pitch rate exceeds a second pre-set value greater than the first pre-set value, the acceleration is decreased; and when both the pitch angle and the pitch rate exceed respective third pre-set values greater than the second pre-set value, the vehicle is braked. Thus, the restraining of the acceleration assures that the posture and the running state agree with each other and that the running stability of the vehicle is improved.

In this way, if both the pitch angle and the pitch rate are used, then it can be judged whether there is a need to restrain the acceleration of the vehicle. Therefore, it is possible to restrain the acceleration only in the case where the restraining is truly needed. In addition, for example, when the pitch angle is great but the pitch rate is small, an amount of decrease of the acceleration may be reduced and, when the pitch angle is small but the pitch rate is great, the amount of decrease of the acceleration may be increased. Thus, if both the pitch angle and the pitch rate are utilized, then the acceleration can be finely restrained so that the restrained acceleration well agree with the posture and meets the operator's intension as much as possible.

(31) The vehicle according to any of the modes (1) through (30), further comprising (a) at least one wheel which is attached to a portion of the body that is distant from the left and right wheels in a front-rear direction; (b) a drive device which drives at least one driving wheel of a plurality of wheels comprising the left and right wheels and said at least one wheel; (c) a brake device which restrains rotation of at least one of the plurality of wheels; (d) an acceleration-deceleration instructing member which is operable by an operator; (e) a driving-braking control device which controls the drive device and the brake device based on an operation state of the acceleration-deceleration instructing member; (f) a steering instructing member which is operable by the operator; (g) a steering device which steers at least one steering wheel of the plurality of wheels; and (h) a steering control device which controls the steering device based on an operation state of the steering instructing member.

The vehicle in accordance with this mode may be one which does not employ the lateral-direction posture control device and/or the front-rear-direction posture control device.

(32) The vehicle according to the mode (31), wherein the acceleration-deceleration instructing member and the steering instructing member comprise a common member, and wherein the vehicle further comprises a common-member holding device which holds, on the body, the common member such that the common member is rotatable about each of a first axis line and a second axis line which intersect each other.

(33) The vehicle according to the mode (32), wherein the steering control device comprises an operation-dependent steering control portion which controls the steering device based on an angle of rotation of the common member about the first axis line, and wherein the driving-braking control device comprises (i) a target-vehicle-speed determining portion which determines, when the common member is rotated, from a neutral position thereof, in a predetermined direction about the second axis line, a target forward-running speed of the vehicle, according to an angle of rotation of the common member about the second axis line; (j) a target-deceleration determining portion which determines, when the common member is rotated, from the neutral position thereof, in an opposite direction that is opposite to the predetermined direction about the second axis line, a target deceleration of the vehicle based on an angle of rotation of the common member in the opposite direction; and (k) a target-value-dependent driving-braking control portion which controls the drive device to attain the target running speed determined by the target-vehicle-speed determining portion, and controls the brake device to attain the target deceleration determined by the target-deceleration determining portion.

The acceleration-deceleration instructing member and the steering instructing member are provided by the single, common member. Thus, the total number of parts needed to constitute the vehicle can be decreased, and a plurality of sorts of instructions can be given by the single operable member.

The common member is held such that the common member is rotatable about each of the first axis line and the second axis line that intersect each other. The common-member holding device may be one which employs a universal joint. The second axis line may be perpendicular to the first axis line, so that the common member is rotatable about the first axis line irrespective of which angle the common member may take about the second axis line.

The rotation of the common member about the second axis line constitutes an acceleration-deceleration instruction. More specifically described, the rotation of the common member about the second axis line in a predetermined direction (e.g., a frontward or downward direction) constitutes an acceleration instruction or a forward-running instruction; and the rotation of the common member about the second axis line in a direction opposite to the predetermined direction (e.g., a rearward or upward direction) constitutes a deceleration instruction. Thus, the acceleration instruction (or the forward-running instruction) and the deceleration instruction can be given in distinction from each other. In the case where a target vehicle speed corresponding to an angle of rotation of the common member in the frontward direction is higher than an actual vehicle speed, the rotation of the common member in the frontward direction constitutes the acceleration instruction.

(34) The vehicle according to the mode (32) or the mode (33), wherein the driving-braking control device comprises at least one of (a) an engine-brake-application control portion which controls, when the common member is positioned at a neutral position thereof about the second axis line, at least one of the drive device and the brake device so that the vehicle is placed in a moderately braked, accelerated state, and (b) a backward-movement control portion which, when the angle of rotation of the common member in the opposite direction is not smaller than a pre-set angle and when a running speed of the vehicle is not higher than a pre-set speed at which the vehicle can be regarded as being stopped, controls the drive device so that the vehicle moves backward.

The moderately braked accelerated state corresponds to an "engine-braked" state of a vehicle employing an engine. The engine-braked state is a state in which fuel is not supplied to the engine and, if the rotation speed of the drive device (i.e., the rotation speed transmitted to the wheel) is higher than the rotation speed of the wheel rotated by the road surface, the wheel is accelerated and, if the rotation speed of the wheel rotated by the road surface is higher than the rotation speed of the drive device, the wheel is braked.

In the vehicle in accordance with this mode, the common member is operable to instruct steering, driving, braking, backward moving, and moderately braked acceleration. Thus, the common member also functions as a shifting member.

(35) The vehicle according to any of the modes (32) through (34), wherein the common member comprises a grip which is graspable by the operator.

In the vehicle in accordance with this mode, the grip as the common member is operable by a hand of the operator.

Although the common member may be one which is operable by a foot or feet of the operator, the grip can be more accurately operated than the member operable by the foot. The grip may be replaced with a lever or a handle.

(36) The vehicle according to any of the modes (32) through (35), further comprising a left-side operable device and a right-side operable device which are distant from each other in a left-right direction of the vehicle, wherein the left-side operable device comprises the common member as a left-side common member and the common-member holding device as a left-side common-member holding device, and the right-side operable device comprises a right-side common member and a right-side common-member holding device, and wherein the vehicle further comprises a connecting device which connects the left-side operable device and the right-side operable device to each other such that the left-side common member and the right-side common member are interlocked with each other.

Since the left-side operable device and the right-side operable device are connected to each other such that the left-side common member and the right-side common member are interlocked with each other, the operator's feeling of operation of the common members is improved.

(37) The vehicle according to the mode (36), wherein the connecting device comprises a left-side operable-device holding device and a right-side operable-device holding device which hold the left-side operable device and the right-side operable device, respectively, such that the left-side operable device and the right-side operable device are movable relative to the body along respective third axis lines, and wherein each of the left-side operable-device holding device and the right-side operable-device holding device comprises (a) two axis members each of which is rotatable relative to the body and is not movable relative to the body in an axial direction thereof parallel to a corresponding one of the third axis lines, and (b) two engaged members which are engaged with the two axis members, respectively, such that each of the two engaged members is movable relative to a corresponding one of the two axis members in the axial direction of said one axis member and is not rotatable relative to said one axis member, and wherein each of the left-side operable device and the right-side operable device further comprises a main body which is attached to the two engaged members of a corresponding one of the left-side operable-device holding device and the right-side operable-device holding device, such that the main body is not movable relative to the two engaged members along a corresponding one of the third axis lines and permits each of the two engaged members to be rotated relative thereto.

The two operable devices are provided on the left and right sides of the body, respectively, and the two operable-device holding devices are also provided on the left and right sides of the body, respectively. The main body of the right-side operable device is held by the right-side operable-device holding device such that the main body is movable relative to the body along the corresponding third axis line; and the main body of the left-side operable device is held by the left-side operable-device holding device such that the main body is movable relative to the body along the corresponding third axis line.

The main body is fixed to the two engaged members, and the two engaged members are engaged with the two axis members, respectively, such that the engaged members are movable relative to the body along the third axis line. Therefore, the main body is movable relative to the vehicle's body along the third axis line. Thus, the position of the common member where the common member is operated can be adjusted. This movement of the main body relative to the vehicle's body may be used to output another instruction.

(38) The vehicle according to the mode (37), wherein the respective rotations of the left-side common member about the first and second axis lines are transmitted to the two engaged members of the left-side operable-device holding device, respectively, and the respective rotations of the right-side common member about the first and second axis lines are transmitted to the two engaged members of the right-side operable-device holding device, and wherein the respective rotations of the two axis members of each one of the left-side and right-side operable-device holding devices are transmitted to the two axis members of an other of the left-side and right-side operable-device holding devices, respectively.

Each of the two operable-device holding devices includes the two engaged members and the two axis members. The respective rotations of the left-side common member about the first and second axis lines are transmitted to the two engaged members of the left-side operable-device holding device, respectively, and the respective rotations of the right-side common member about the first and second axis lines are transmitted to the two engaged members of the right-side operable-device holding device. In addition, the two axis members of the left-side operable-device holding device are mechanically connected to the two axis members of the right-side operable-device holding device, respectively.

For example, if the left-side common member is operated by being rotated about the corresponding first axis line, one of the two engaged members of the left-side operable-device holding device is rotated and a corresponding one of the two axis members of the same (i.e., the axis member with which the one engaged member is engaged) is also rotated. Consequently a corresponding one of the two axis members of the right-side operable-device holding device is rotated, a corresponding one of the two engaged members of the same is rotated, and the right-side common member is rotated about the corresponding first axis line.

If the left-side common member is operated by being rotated about the corresponding second axis line, the other of the two engaged members of the left-side operable-device holding device is rotated and the other of the two axis members of the same is also rotated. Consequently the other of the two axis members of the right-side operable-device holding device is rotated, the other of the two engaged members of the same is rotated, and the right-side common member is rotated about the corresponding second axis line.

The above explanations are true with the case where the right-side common member is operated by being rotated about the corresponding first or second axis line. Thus, the rotations of the right-side common member are transmitted to the left-side common member.

In this way, the respective rotations of one of the left-side common member and the right-side common member about the corresponding first and second axis lines are transmitted, independent of each other, to the other of the left-side common member and the right-side common member. This means that the left-side common member and the right-side common member are mechanically connected to each other such that the two common members are interlocked with each other.

The transmission of each rotation can be effected irrespective of which relative position the corresponding engaged and axis members may have.

(39) The vehicle according to the mode (37) or the mode (38), wherein each of the two axis members of each of the left-side and right-side operable-device holding devices comprises a spline shaft, and a pulley fixed to one of opposite ends of the spline shaft, and each of the two engaged members of said each of the left-side and right-side operable-device holding devices comprises a nut which fits on a corresponding one of the two spline shafts, and a pulley fixed to one of opposite ends of the nut.

Since each axis member is a spline shaft and each engaged member is a nut, each operable-device holding device can enjoy a simple construction. Each spline shaft has a plurality of teeth each of which extends parallel to the third axis line.

The connecting device may be one which includes a plurality of pulleys and a plurality of cables, and the rotation of each axis member is transmitted by the corresponding cable. In the vehicle in accordance with this mode, the pulleys and the cables cooperate with each other to constitute a rotation transmitting device as a portion of the connecting device.

The left-side and right-side operable devices may be connected to each other via a rear side of an operator's seat of the vehicle, i.e., via a curved route. In this case, the rotation transmitting device is advantageously constituted by one which includes the pulleys and the cables.

(40) The vehicle according to any of the modes (1) through (39), further comprising (a) a posture instructing member which is operable by an operator; and (b) a posture-instruction detecting device which detects an operation state of the posture instructing member, wherein the lateral-direction posture control device comprises an operation-state-dependent posture control portion which controls an inclination of the body with respect to a lateral direction thereof, based on the operation state of the posture instructing member detected by the posture-instruction detecting device.

The up-down moving device may be controlled by the lateral-direction posture control device based on the operation state of the posture instructing member. The up-down moving device may be controlled based on only the operation state of the posture instructing member, or both the operation state of the posture instructing member and the current state of the vehicle (i.e., at least one of a running state of the vehicle and an operation state or states of the acceleration-deceleration instructing member and/or the steering instructing member).

In the case where the vehicle employs the posture instructing member, the acceleration-deceleration instructing member and the steering instructing member, those instructing members may be provided by respective separate members, or alternatively two or all of the instructing members may be provided by a common member. Each of the instructing members may be one which is operable by the operator's hand or one which is operable by the operator's foot. The instructing member operable by the operator's hand may be a handle, a lever, or a grip; and the instructing member operable by the operator's foot may be a pedal.

The up-down moving device may be controlled by the front-rear-direction posture control device based on the operation state of the posture instructing member detected by the posture-instruction detecting device.

(41) The vehicle according to the mode (40), wherein the posture instructing member comprises a pair of pedals consisting of a left-side pedal and a right-side pedal which are held by the body such that the left-side pedal and the right-side pedal are pivotable about respective fourth axis lines with respect to leftward and rightward directions, and which are mechanically connected to each other such that the left-side pedal and the right-side pedal are interlocked with each other.

According to this mode, the left-side pedal and the right-side pedal are pivotable about the respective fourth axis lines with respect to the leftward and rightward directions. The two pedals are connected to each other such that the pedals are interlocked with each other. Therefore, the operator's feeling of operation of the pedals can be improved as compared with the case where the pedals are not interlocked with each other.

In addition, since the two pedals are mechanically connected to each other, the rotation of one of the two pedals with respect to the leftward and rightward directions can be reliably transmitted to the other pedal.

Each fourth axis line is parallel to a depressed surface of the corresponding pedal that is depressed by the operator's foot. Here, the word "parallel" means geometrically parallel or that an angle contained by the fourth axis line and the depressed surface of the pedal is not greater than a pre-set angle that is, e.g., 25 degrees, 20 degrees, 15 degrees, 10 degrees, or 5 degrees. In the case where the angle contained by the fourth axis line and the depressed surface is not greater than the pre-set angle, a distance between the fourth axis line and the depressed surface may increase or decrease in the frontward direction. Each pedal can be more easily operated in the case where the distance between the fourth axis line and the depressed surface increases, than in the case where the distance decreases.

Each fourth axis line may be provided apart from the depressed surface of the corresponding pedal or an opposite surface thereof opposite to the depressed surface, or in the depressed or opposite surface per se, or inside the pedal.

Each of the fourth axis lines corresponds to a first axis line of a corresponding one of two pedal operation devices that will be described in BEST MODE FOR CARRYING OUT THE INVENTION.

(42) The vehicle according to the mode (41), wherein a distance between the respective fourth axis lines of the left-side pedal and the right-side pedal increases in a frontward direction of the vehicle.

An angle contained by the two fourth axis lines may fall in a range of from 5 degrees to 45 degrees, and may be not smaller than 10 degrees, 15 degrees, or 20 degrees, and not greater than 40 degrees, 35 degrees, 30 degrees, or 25 degrees. Preferably, the angle contained by the two fourth axis lines may fall in a range of from 15 degrees to 35 degrees, a range of from 20 degrees to 30 degrees, or a range of from 23 degrees to 28 degrees.

(43) The vehicle according to the mode (42), wherein the left-side pedal and the right-side pedal are held by the body such that the left-side pedal and the right-side pedal are pivotable about respective fifth axis lines which intersect the corresponding fourth axis lines.

Each of the fifth axis lines corresponds to a second axis line of a corresponding one of the two pedal operation devices that will be described in BEST MODE FOR CARRYING OUT THE INVENTION.

(44) The vehicle according to any of the modes (41) through (43), further comprising a link device which connects the left-side pedal and the right-side pedal to each other such that when an inner portion of each one of the left-side pedal and the right-side pedal is pivoted downward about a corresponding one of the fourth axis lines, an outer portion of an other of the left-side pedal and the right-side pedal is pivoted downward about an other of the fourth axis lines, by an angle smaller than an angle by which said each one pedal is pivoted downward.

(45) The vehicle according to the mode (44), wherein the link device comprises (a) a left-side arm portion which extends outward from the fourth axis line corresponding to the left-side pedal, and a right-side arm portion which extends outward from the fourth axis line corresponding to the right-side pedal, and (b) a rod portion including two portions which are distant from each other in an axial direction of the rod portion and which are pivotally connected to the left-side arm portion and the right-side arm portion, respectively.

(46) The vehicle according to any of the modes (40) through (45), further comprising a selecting portion which selects either one of (a) an automatic control portion which automatically controls a lateral-direction posture and a front-rear-direction posture of the vehicle, based on an operation state of at least one of a steering instructing member and an acceleration-deceleration instructing member, and a running state of the vehicle, and (b) the operation-state-dependent posture control portion.

Since the operator can select and instruct one of the manual posture control mode based on the operation state of the posture instructing member and the automatic posture control mode based on the running state of the vehicle and the operation state of a running instructing member, the operability of the vehicle is improved.

(47) The vehicle according to any of the modes (1) through (46), wherein a gravity-center-height-position-to-tread ratio obtained by dividing a height position of a gravity center of the vehicle by a tread defined as a distance between the left and right wheels is not less than 1.0.

In the case where the height position of the gravity center of the vehicle is considerably high as compared with the tread, it is highly needed to be able to incline the body for the purpose of improving the turning performance of the vehicle. The gravity-center-height-position-to-tread ratio of the vehicle may be not less than 1.05, 1.1, or 1.15.

(48) The vehicle according to any of the modes (1) through (47), further comprising at least one wheel which is distant from the left and right wheels in a front-rear direction, wherein a gravity-center-height-position-to-wheel-base ratio obtained by dividing a height position of a gravity center of the vehicle by a wheel base defined as a distance between said at least one wheel and the left and right wheels in the front-rear direction is not less than 1.0.

In the case where the height position of the gravity center of the vehicle is considerably high as compared with the wheel base, it is highly needed to be able to incline the body with respect to the front-rear direction so as to improve the running stability of the vehicle when the vehicle is braked or driven. The gravity-center-height-position-to-wheel-base ratio of the vehicle may be not less than 1.05, 1.1, or 1.15.

BRIEF DESCRIPTION OF THE DRAWINGS

FIGS. 14(a), 14(b), and 14(c) are illustrative views showing manners in which a grip of the grip operation device is operated.

FIGS. 32(a) and 32(b) views showing a state in which the vehicle is inclined with respect to a lateral direction and a state in which the vehicle is inclined with respect to a front-rear direction.

FIGS. 36(a) and 36(b) are views showing a manner in which target strokes are determined in the case where the priority-dependent control is performed in the vehicle.

BEST MODE FOR CARRYING OUT THE INVENTION

A vehicle that is one embodiment as the best mode for carrying out the present invention will be described by reference to the drawings.

Figure 1:
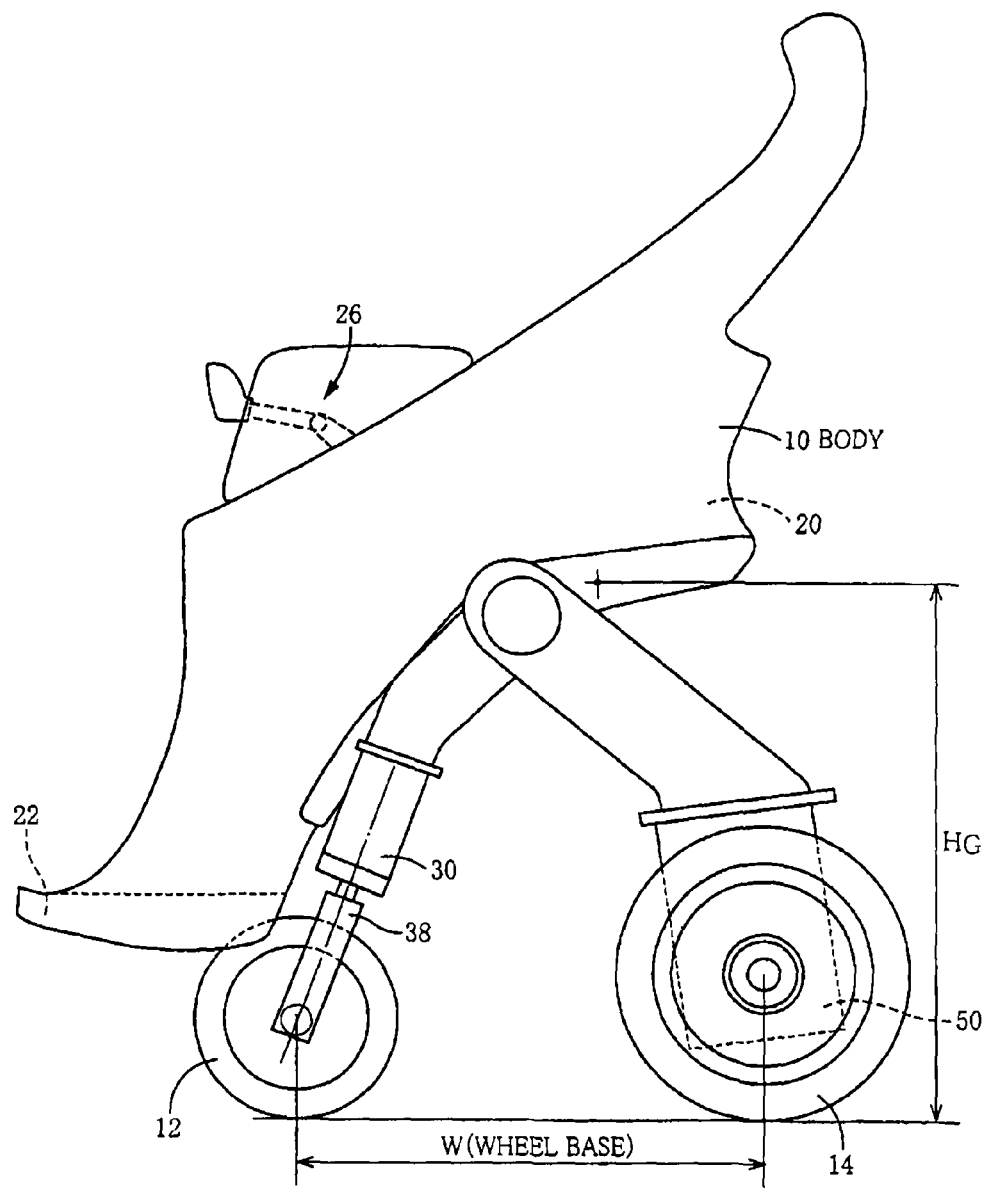
FIG. 1 is a side view of a vehicle as an embodiment of the present invention.
Figure 2:
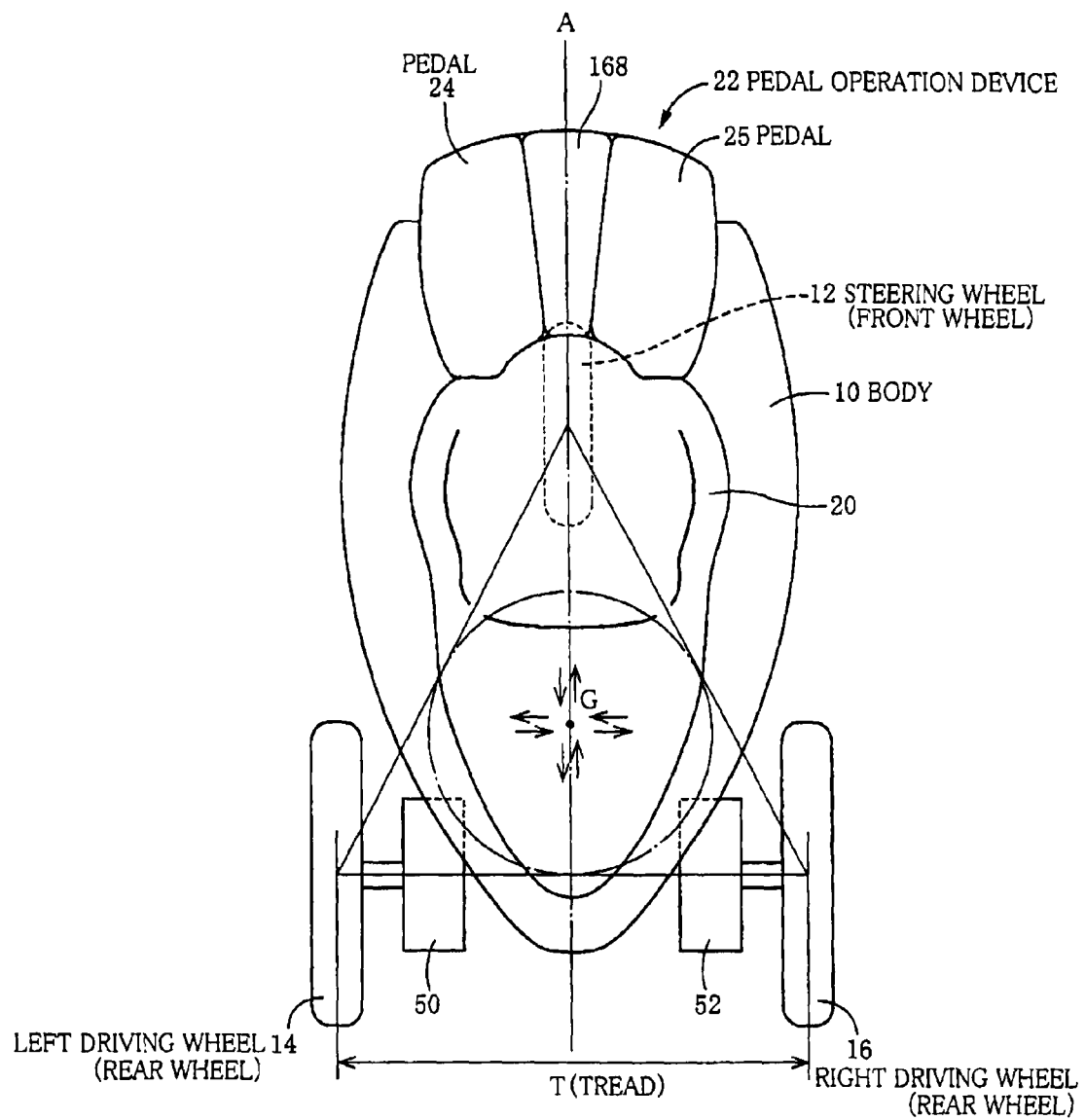
FIG. 2 is a plan view of the vehicle.

As shown in FIGS. 1 and 2, the vehicle includes a body 10, a single front wheel 12 as a steering wheel, and a pair of rear wheels, i.e., left and right rear wheels 14, 16 as driving wheels. The body 10 includes a single seat 20 where an operator rides. A pedal operation device 22 is provided in front of the seat 20.

The pedal operation device 22 includes a left pedal 24 and a right pedal 25 that are provided on a left side and a right side of the front wheel 12, respectively. In the present embodiment, the left and right pedals 24, 25 are posture instructing members that are operable by the operator.

In addition, two grip operation devices (i.e., a left grip operation device and a right grip operation device) 26, 28 (FIG. 10) are respectively provided on a left side and a right side of a portion of the body 10 that corresponds to a middle portion of the seat 20.

As shown in FIG. 2 (i.e., a plan view), a gravity center, G, of the present vehicle (in a state in which the operator does not ride on the seat 20) is located on a vertical line passing through a gravity center of a triangle that is obtained by connecting, to each other, respective points where the front wheel 12 and the left and right rear wheels 14, 16 contact a road surface, such that a gravity-center-height-position-to-tread ratio, $\gamma_t$ (=$H_G$/T), as a ratio of a gravity-center height position, $H_G$ (FIG. 1), to a tread, T, is not less than 1.0. Therefore, the present vehicle highly needs to control its posture with respect to its lateral direction. In addition, as shown in FIG. 1, a gravity-center-height-position-to-wheel-base ratio, $\gamma_w$ (=$H_G$/W), as a ratio of the gravity-center height position $H_G$ to a wheel base, W, is not less than 1.0. Therefore, the present vehicle highly needs to control its posture with respect to its front-rear direction.

However, each of the gravity-center-height-position-to-tread ratio and the gravity-center-height-position-to-wheel-base ratio of the vehicle may be not less than 0.95, not less than 0.9, not less than 0.85, or not less than 0.8.

Since the present vehicle has the single front wheel 12, the overall size of the vehicle can be reduced as compared with a case where two front wheels are employed.

Figure 15:
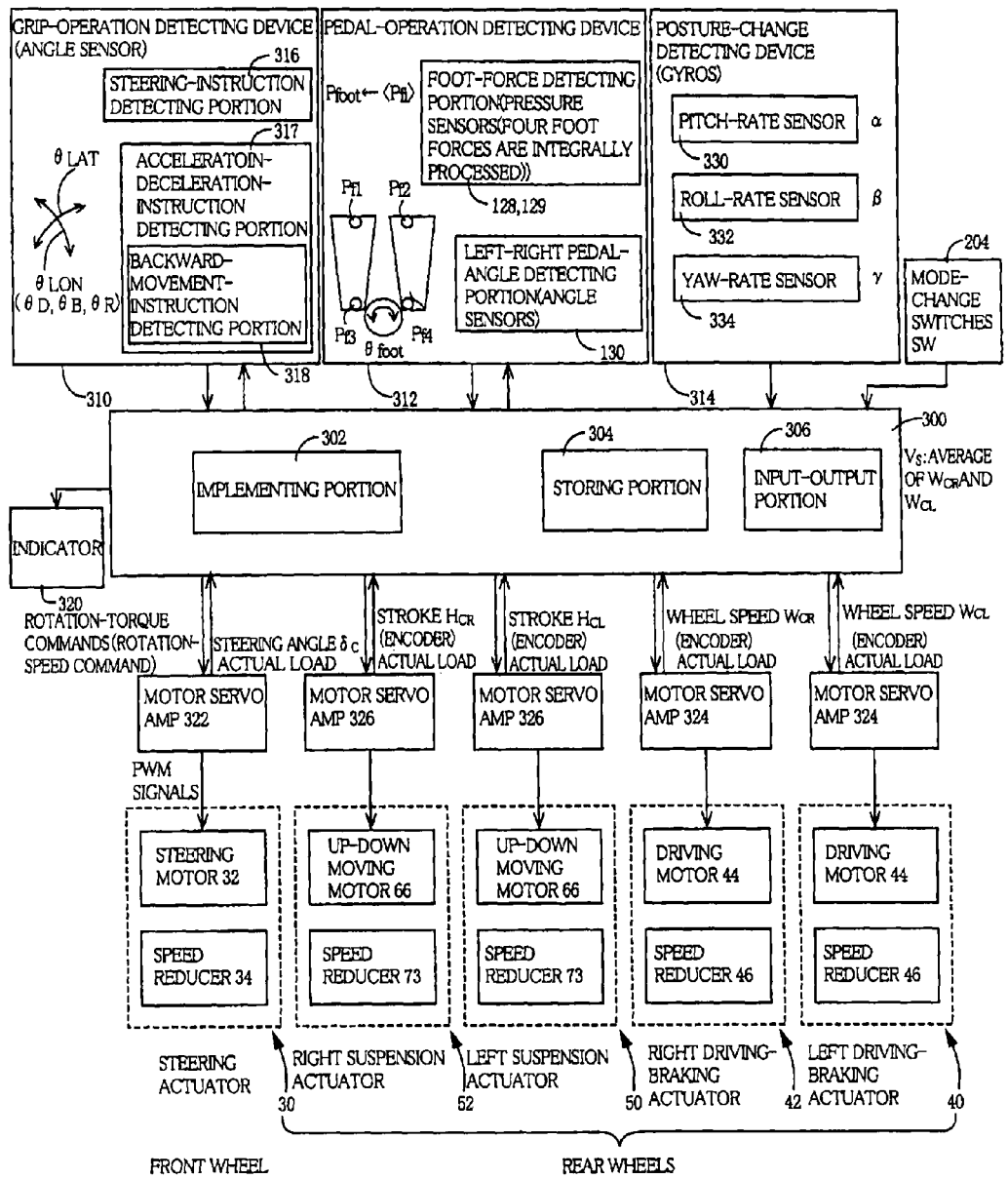
FIG. 15 is a view showing a control device that controls the vehicle as a whole, and peripheral devices connected to the control device.

The steering wheel 12 is provided with a steering device (i.e., a steering actuator) 30 through which the wheel 12 is attached to the body 10. As shown in FIG. 15, the steering actuator 30 includes a steering motor (i.e., an electric motor) 32 and a speed reducer 34. The steering actuator 30 is connected to an upper end portion of a king pin 38 (FIG. 1) that supports the steering wheel 12, and the actuator 30 steers the wheel 12 by rotating the king pin 38.

The left and right driving wheels 14, 16 are provided with a left and a right driving-braking device (i.e., a left and a right driving-braking actuator) 40, 42, respectively. The two driving-braking devices 40, 42 have an identical construction including a driving motor 44, a speed reducer 46, and a battery device, not shown. The two driving motors 44 are connected via the respective speed reducers 46 to the left and right driving wheels 14, 16. Respective driving forces and respective regenerative braking forces that are applied to the left and right driving wheels 14, 16 are controlled by controlling the two driving motors 44. In the present embodiment, the respective driving forces or the respective braking forces that are applied to the left and right driving wheels 14, 16 can be controlled independent of each other.

The left and right driving wheels 14, 16 are attached to the body 10 via a left and a right up-down moving device (i.e., a left and a right suspension actuator) 50, 52 as suspension devices.

Figure 3:
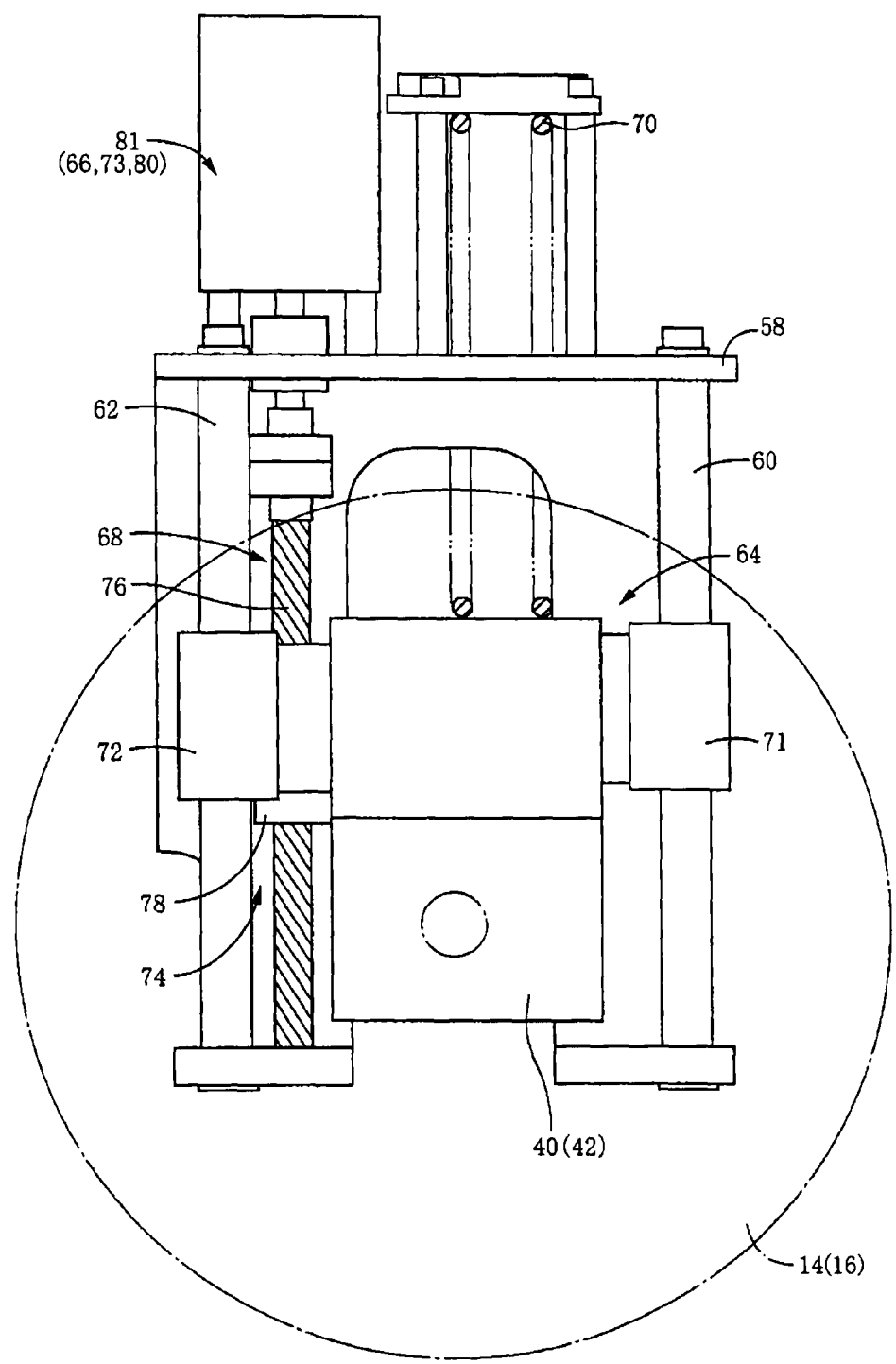
FIG. 3 is a front view of an up-down moving device of the vehicle.
Figure 4:
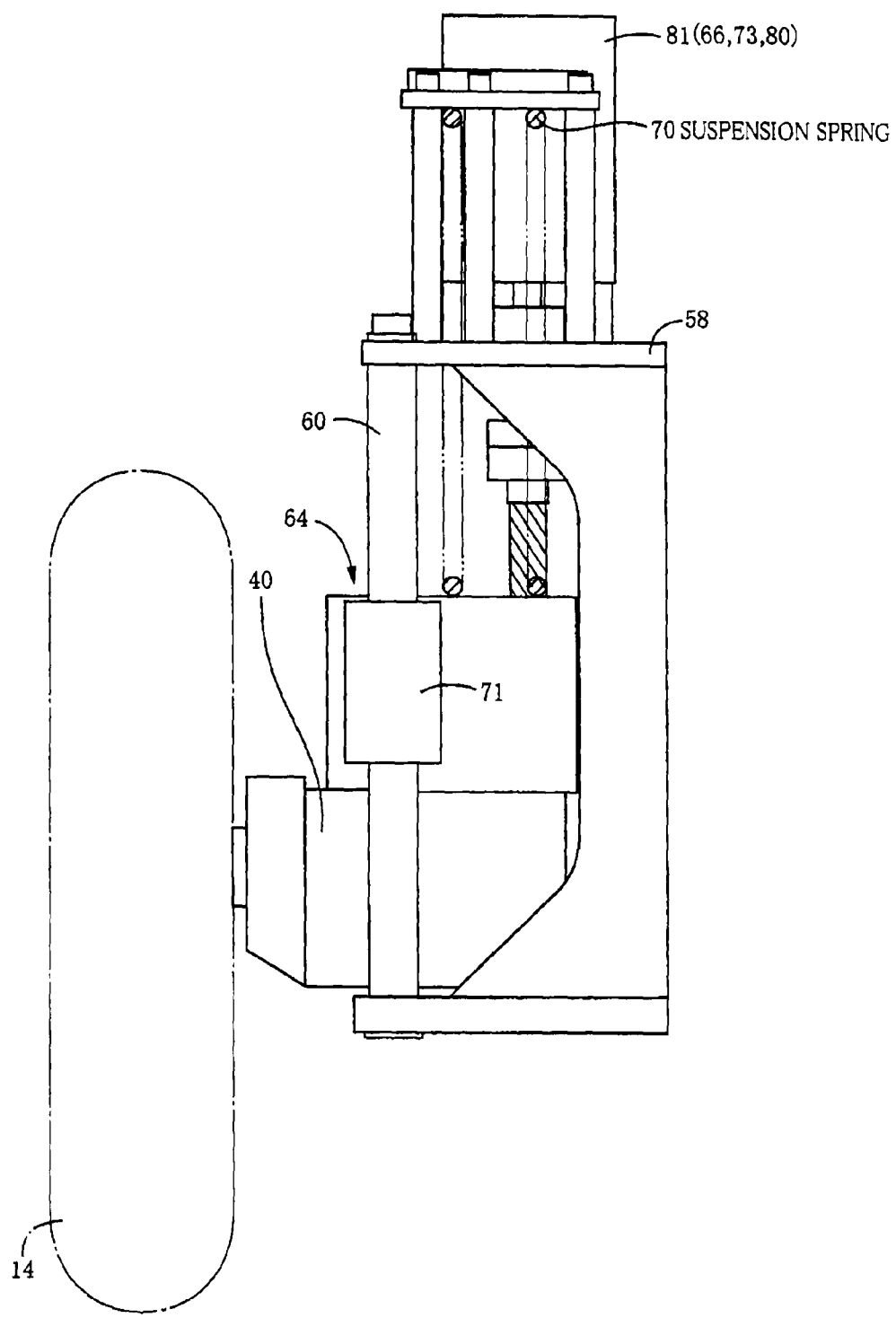
FIG. 4 is a side view of the up-down moving device.

The two up-down moving devices 50, 52 have an identical construction and, as shown in FIGS. 3 and 4, each moving device 50, 52 includes a frame 58 fixed to the body 10; two guide members 60, 62 that are fixed to the frame 58 and extend in upward and downward directions; a wheel holding member 64 that is movable in the upward and downward directions while being guided by the two guide members 60, 62; an up-down moving motor 66; a driving-force transmitting device 68 that transmits a driving force of the up-down moving motor 66 to the wheel holding member 64; and a suspension spring 70 that is provided between the body 10 (or the frame 58) and the wheel holding member 64.

The two wheel holding members 64 hold the two driving-braking devices 40, 42, respectively, that are connected to the two wheels 14, 16, respectively. When the two wheel holding members 64 are moved in the upward and downward directions while being guided by the respective pairs of guide members 60, 62, the two wheels 14, 16 and the two driving-braking devices 40, 42 are moved together with each other relative to the body 10 (or the frame 58) in the upward and downward directions. Each of the two wheel holding members 64 includes two engaged portions 71, 72 that are engaged with the two guide members 60, 62, respectively.

The driving-force transmitting device 68 includes a speed reducer 73 and a ball-screw mechanism 74, and the ball-screw mechanism 74 includes a screw 76 that extends parallel to the guide members 60, 62 and is attached to the frame 58 such that the screw 76 is rotatable relative thereto and is not movable in an axial direction thereof parallel to a rotation axis line of the screw 76; and a nut 78 that is threadedly engaged with the screw 76. The nut 78 is attached to the wheel holding member 64 such that the nut 78 is not movable relative thereto in the upward and downward directions.

The rotation of the up-down moving motor 66 is transmitted via the speed reducer 73 to the screw 76 of the ball-screw mechanism 74. The ball-screw mechanism 74 converts the rotary motion of the screw 76 into a linear motion of the nut 78, and transmits the linear motion to the wheel holding member 64. Thus, the driving-force transmitting device 68 also functions as a motion converting device.

Even in a state in which no electric current is supplied to the two up-down moving motors 66, two electromagnetic clutches 80 operate for keeping the respective positions of the two wheels 14, 16 relative to the body 10 (i.e., the respective positions of the two wheel holding members 64 relative to the corresponding pairs of guide members 60, 62). Thus, the two up-down moving devices 50, 52 can be said to include respective motor units 81 each of which includes the up-down moving motor 66, the speed reducer 73, and the electromagnetic clutch 80.

Since the suspension spring 70 is provided between each wheel holding member 64 and the body 10 (or the frame 58), an elastic force corresponding to a distance between the holding member 64 and the body 10 is applied to the holding member 64, which contributes to lowering an output of the corresponding up-down moving motor 66.

In the present embodiment, the two up-down moving motors 66 are controlled to control the respective positions in the upward and downward directions of the left and right driving wheels 14, 16 relative to the body 10, independent of each other.

The construction of the present vehicle allows the two wheel holding members 64 (or the two driving-braking devices 40, 42 held thereby) to be moved relative to the body 10 in the upward and downward directions, within respective limited movement ranges that are defined by the frame 58. That is, those limited movement ranges are defined by respective limits of movement of the two holding members 64 relative to the frame 58 in the upward and downward directions. In the present embodiment, however, the limited movement ranges corresponding to the construction of the vehicle are further limited to respective predetermined narrower movement ranges so that the two holding members 64 are only allowed to be moved relative to the body 10 in those narrower limited movement ranges.

As shown in FIG. 2, the two up-down moving devices 50, 52 are provided on left and right sides of the body 12 in a widthwise direction thereof. The two guide members 60, 62 of the left up-down moving device 50 extend parallel to the two guide members 60, 62 of the right up-down moving device 52. Therefore, the two wheels 14, 16 are moved parallel to each other, when the wheels 14, 16 are moved relative to the body 10 in the upward and downward directions. In the present embodiment, a position (i.e., a "bound-side" position) of each wheel 14, 16 relative to the body 10 in the upward direction that is higher than a predetermined zero point is represented by a positive value; and a position (i.e., a "rebound-side" position) of each wheel 14, 16 relative to the body 10 in the downward direction that is lower than the predetermined zero point is represented by a negative value. When the wheels 14, 16 are moved to the bound side, a height of the body 10 is lowered; and when the wheels 14, 16 are moved to the rebound side, the height of the body 10 is increased. The zero point may be predetermined to be equal to a middle point of the above-described narrower limited movement ranges predetermined for the up-down moving devices 50, 52, or a point that is defined by the construction of the vehicle, e.g., the suspension springs 70.

In the present embodiment, the two up-down moving devices 50, 52 include the respective electric motors 66, and the two electric motors 66 operate for moving the respective wheels 14, 16 relative to the body 10 in the upward and downward directions. However, each moving device 50, 52 may have a different construction. For example, each moving device 50, 52 may be one that moves, by utilizing a fluid such as a working liquid or air, the corresponding wheel 14, 16 relative to the body 10 in the upward and downward directions.

Otherwise, each wheel 14, 16 may be held by the body 10 via a link device, such that the position of each wheel 14, 16 relative to the body 10 is adjustable.

In addition, in the present embodiment, the movement of each wheel 14, 16 relative to the body 10 is allowed within the narrower limited movement range than the limited movement range defined by the construction of the vehicle, i.e., the upper and lower limits of movement of the corresponding wheel holding member 64 in the upward and downward directions. However, the movement of each wheel 14, 16 relative to the body 10 may be allowed within the limited movement range defined by the construction per se.

As shown in FIGS. 5, 6, 7 and 8, the pedal operation device 22 includes the above-described two pedals 24, 25; a main body 98; two pedal-pivot mechanisms 100, 102 that are provided on the main body 98; a connecting device 104 (FIG. 8); and a locking device 106.

The two pedal-pivot mechanisms 100, 102 have an identical construction, and are symmetrical with each other with respect to a centerline, A, of the pedal operation device 22 that extends in the front-rear direction. The left and right pedals 24, 25 are also symmetrical with each other with respect to the centerline A. The left pedal 24 is pivotable about each of a first axis line, $B_L$, and a second axis line, $C_L$; and the right pedal 25 is pivotable about each of a first axis line, $B_R$, and a second axis line, $C_R$. The connecting device 104 connects between the two pedals 24, 25 such that the respective pivotal motions thereof about the respective first axis lines $B_L$, $B_R$ are interlocked with each other. The respective pivotal motions of the two pedals 24, 25 can be permitted or inhibited by the operation of the locking device 106.

Hereinafter, there will be described the pedal-pivot mechanism 100 corresponding to the left pedal 24.

The pedal-pivot mechanism 100 includes a first axis member 110, a second axis member 112, a presser plate 114, a coil spring 116, and a damper 118.

Figure 7:
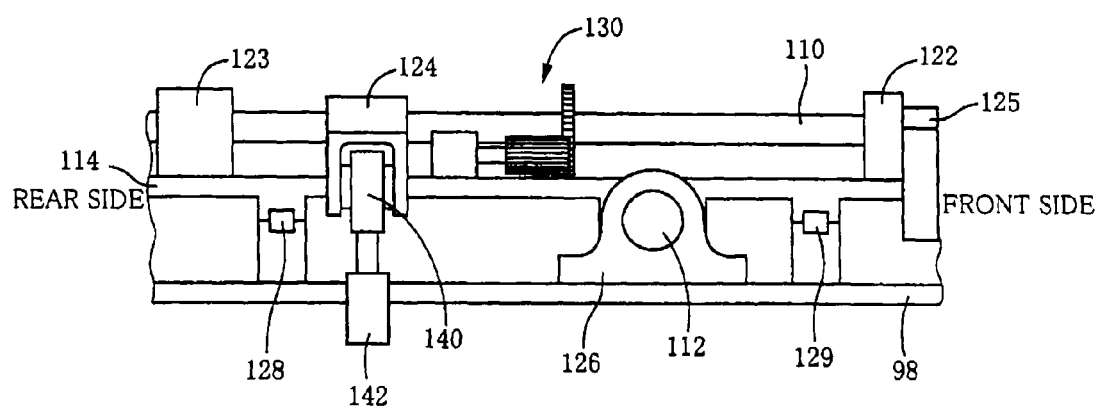
FIG. 7 is a side view of the pedal operation device.

The first axis member 110 extends parallel to the first axis line $B_L$, and is attached to the presser plate 114, via two bearings 122, 123 spaced from each other in an axial direction of the axis member 110, such that the axis member 110 is pivotable relative to the presser plate 114. The first axis member 110 supports two flanges 124, 125 such that the two flanges 124, 125 are spaced from each other in the axial direction and are not rotatable relative to the axis member 110. The pedal 24 is attached to the two flanges 124, 125 such that the pedal 24 is not pivotable relative to the same 124, 125. Thus, the pedal 24 and the first axis member 110 are pivotable, as an integral unit, about the first axis line $B_L$. As shown in FIG. 7, a potentiometer 130 as a rotation-angle detecting device that detects an angle of rotation of the first axis member 110 is provided between the first axis member 110 and the presser plate 114. Thus, the potentiometer 130 detects an angle of rotation of the first axis member 110 relative to the presser plate 114 which rotation is caused by a pivotal motion of the pedal 24 in a leftward-downward direction or a rightward-downward direction, i.e., a leftward-downward pivotal motion of the pedal 24 or a rightward-downward pivotal motion of the same 24.

The second axis member 112 extends parallel to the second axis line $C_L$, in a direction intersecting the first axis line $B_L$. The second axis member 112 is attached to the main body 98 via two bearings 126, 127 that are distant from each other in an axial direction parallel to the second axis line $C_L$, such that the second axis member 112 is pivotable relative to the main body 98. The presser plate 114 is attached to the second axis member 112, such that the presser plate 114 is not pivotable relative to the second axis member 112. The presser plate 114 is pivotable as an integral unit with the second axis member 112, by a small angle only.

As shown in FIG. 7, two pressure sensors 128, 129 are provided, on either side (i.e., front and rear sides) of the second axis member 112, at respective positions between the presser plate 114 and the main body 98. The pressure sensors 128, 129 are for detecting a foot force (i.e., a depressing force) applied to the pedal 24 by the operator's left foot. Since the second axis member 112 is pivotable about the second axis line $C_L$, the pressure sensors 128, 129 can accurately detect the foot force.

The coil spring 116 is provided between the main body 98 and the flange 125 attached to the front-end portion of the first axis member 110. The coil spring 116 applies a biasing force to the pedal 24 in a direction to lower an outer portion thereof that is located outside the first axis line $B_L$. Thus, when the pedal 24 is operated, i.e., pivoted in a direction to lower an inner portion thereof that is located inside the first axis line $B_L$, the coil spring 116 applies, to the pedal 24, a reaction force corresponding to an angle of pivotal motion thereof.

In the present embodiment, the two pedals 24, 25 are connected to each other, and the respective coil springs 116 of the left and right pedal-pivot mechanisms 100, 102 bias the corresponding pedals 24, 25 to take respective neutral positions where respective strokes thereof are equal to zero. Thus, when the respective foot forces are removed from the two pedals 24, 25, the pedals 24, 25 are accurately returned to the respective neutral positions by the corresponding coil springs 116.

Meanwhile, a pivotal-motion transmitting member 132 is attached to the rear-end portion of the first axis member 110 such that the pivotal-motion transmitting member 132 is not pivotable relative to the first axis member 110, and the pivotal motion of the first axis member 110 is transmitted via the transmitting member 132 to a damper 118 that applies a resistance to the pivotal motion of the pedal 24 about the first axis line $B_L$.

Figure 8:
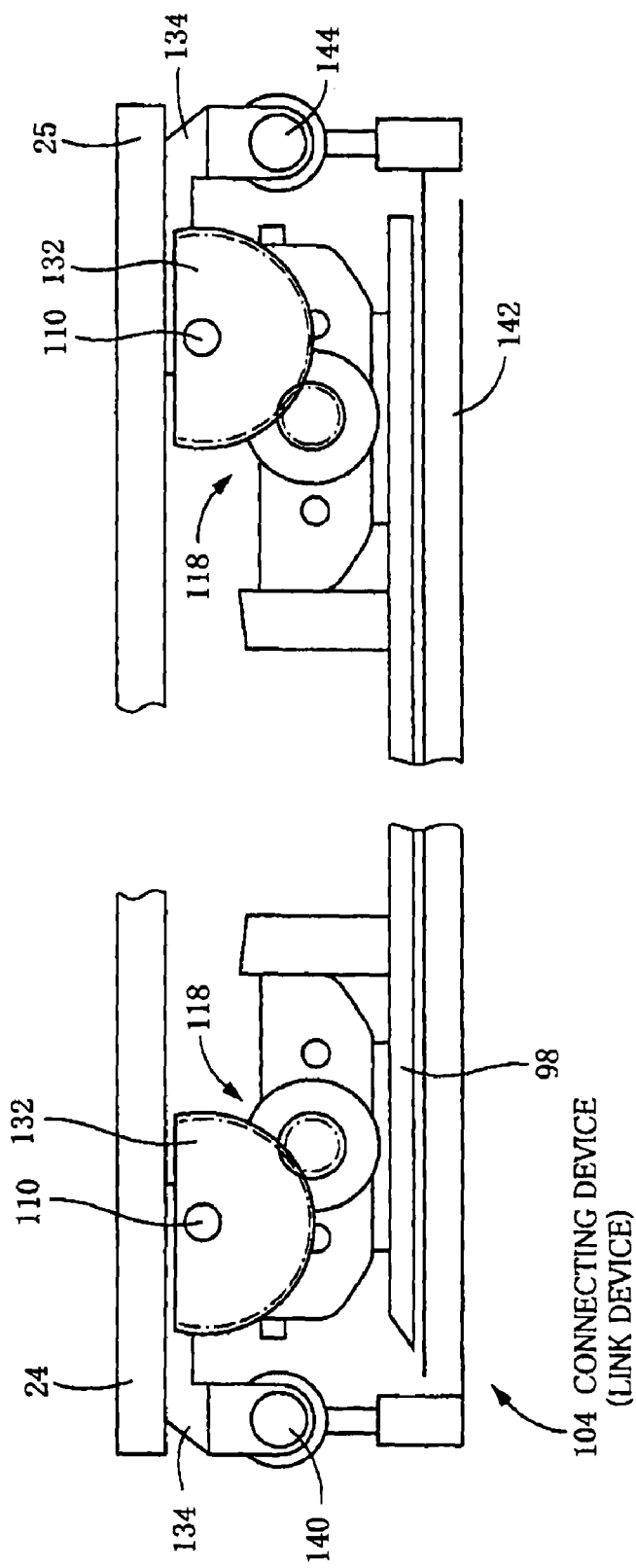
FIG. 8 is a front view of the pedal operation device.
Figure 9:
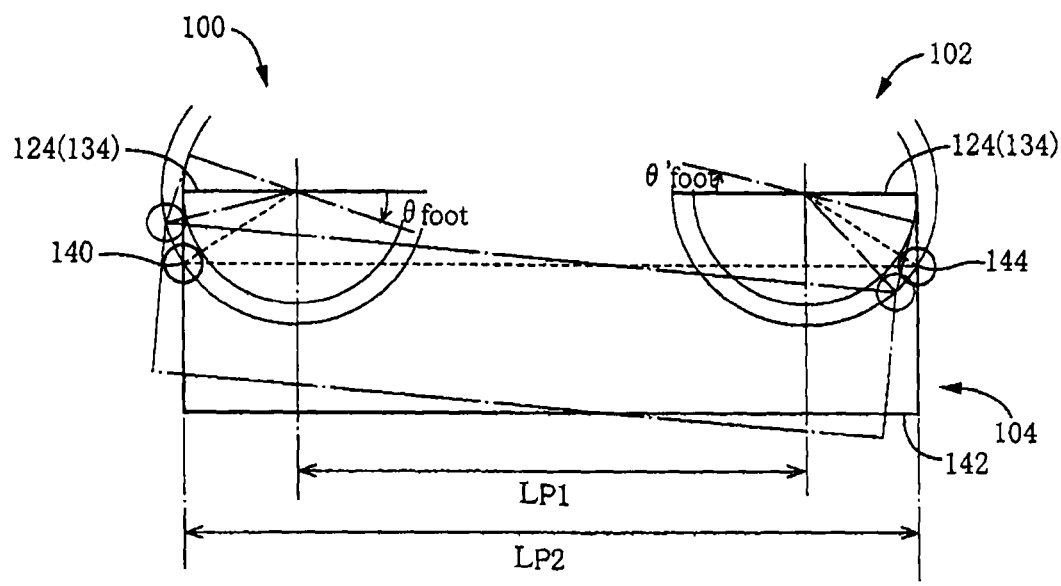
FIG. 9 is a view showing an operation of the pedal operation device.

As shown in FIGS. 8 and 9, the flange 124, attached to the rear portion of the first axis member 110, includes an arm portion (i.e., a first link member) 134 projecting outward, and an end portion of the arm portion 134 is connected via a universal joint 140 to one end portion of a rod (i.e., a second link member) 142. The other end portion of the rod 142 is connected via a universal joint 144 to an end portion of an arm portion 134 of a flange 124 of the right pedal-pivot mechanism 102.

That is, the left and right pedals 24, 25 are connected to each other by a link device (i.e., the connecting device) 104 including the arm portions 134, the rod 142, and the joints 140, 144. The rod 142 extends below the main body 98.

As shown in FIG. 9, the link device 104 is a trapezoidal link in which an effective length, $L_{P2}$, of the rod 142 is greater than a distance, $L_{P1}$, between the two first axis members 110, 110. Therefore, a downward pivotal motion of the inner portion of the left pedal 24 located inside the first axis line $B_L$ causes a downward pivotal motion of the outer portion of the right pedal 25 located outside the first axis line $B_R$, such that an angle, $\theta_{foot}'$, of the downward pivotal motion of the outer portion of the right pedal 25 is smaller than an angle, $\theta_{foot}$, of the downward pivotal motion of the inner portion of the left pedal 24.

Since the two pedals 24, 25 are connected to each other in the above-described manner, for example, when the outer portion of one pedal 24 located outside the first axis line $B_L$ is pivoted downward, the one pedal 24 receives a reaction force from the coil spring 116 provided for the other pedal 25. Thus, irrespective of which direction each pedal 24, 25 may be pivoted in, the each pedal 24, 25 receives the biasing force against the pivotal motion thereof.

That is, according to the present arrangement, although each pedal 24, 25 is not provided with respective coil springs to bias the inner and outer portions of the pedal 24, 25 in the downward direction, the each pedal 24, 25 can receive the reaction force against the pivotal motion thereof irrespective of which direction the each pedal 24, 25 may be pivoted in. It is, however, estimated that a frequency at which each pedal 24, 25 is operated to pivot the outer portion thereof located outside the corresponding first axis line $B_L$, $B_R$ in the downward direction is considerably low.

Figure 6:
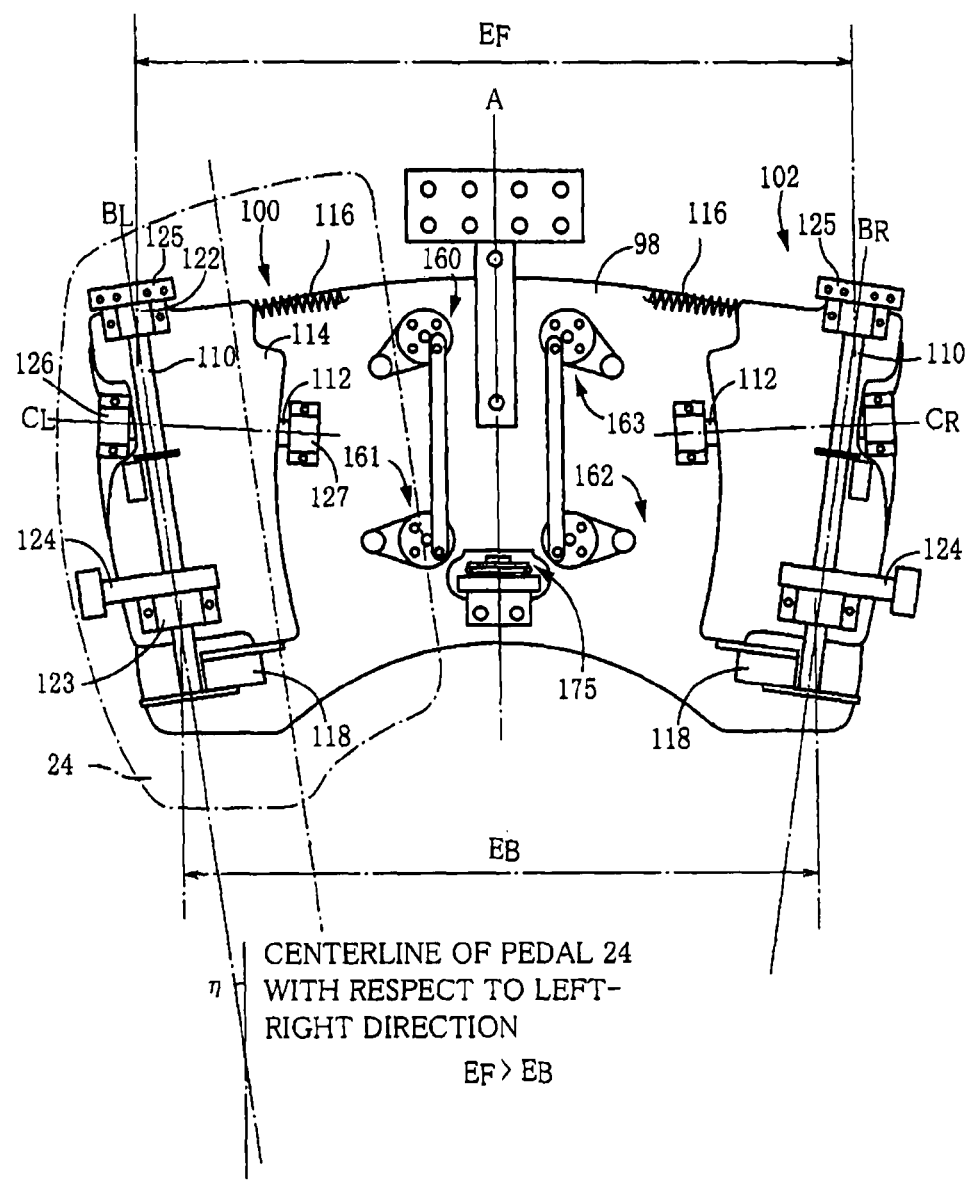
FIG. 6 is a plan view of the pedal operation device.

As shown in FIG. 6, the two first axis lines $B_L$, $B_R$ extend like a capital, V, i.e., such that a distance therebetween increases in the frontward direction, i.e., $E_F > E_B$. In the present embodiment, each of the two first axis lines $B_L$, $B_R$ is inclined relative to the centerline A by an angle, η (preferably, the angle η falls in the range of from 10 degrees to 15 degrees and is selected at, e.g., 13 degrees). Thus, the two first axis lines BL, BR are distant from each other by an angle, 2η (preferably, the angle 2η falls in the range of from 20 degrees to 30 degrees and is selected at, e.g., 26 degrees).

Thus, in a state in which the operator's feet are placed on the two pedals 24, 25, respective heels (i.e., respective centers of pivotal motion) of the two feet are positioned right above the respective first axis members 110, and respective root portions of respective big toes of the two feet are positioned on respective front portions of the respective inner portions of the two pedals 24, 25 located inside the corresponding first axis members 110. Since the respective heels of the two feet are positioned above the respective first axis members 110, the two pedals 24, 25 can be easily pivoted.

In addition, when the two pedals 24, 25 are operated by being pivoted, respective knees of two legs of the operator can be prevented from being moved out of the body 12.

Moreover, since the respective root portions of respective big toes of the two feet can apply respective great forces, the respective inner portions of the two pedals 24, 25 can be easily pivoted downward about the corresponding first axis members 110.

In addition, the two first axis lines $B_L$, $B_R$ are located on respective outer sides of respective middle portions of the corresponding pedals 24, 25 as seen in respective widthwise directions thereof. Therefore, respective areas of the respective inner portions of the two pedals 24, 25 located inside the corresponding first axis lines $B_L$, $B_R$ are greater than respective areas of the respective outer portions of the same 24, 25. Thus, the respective inner portions of the two pedals 24, 25 can be easily pivoted downward. Since a great moment can be produced from a small foot force, each pedal 24, 25 can be pivoted with reliability.

The second axis lines $C_L$, $C_R$ substantially perpendicularly intersect the corresponding first axis lines $B_L$, $B_R$. In fact, however, each second axis line $C_L$, $C_R$ is somewhat inclined such that as each second axis line $C_L$, $C_R$ goes inward, each second axis line $C_L$, $C_R$ goes rearward. Since each second axis line $C_L$, $C_R$ is inclined in this way, respective portions of the two pedals 24, 25 that are located on the inner side of the corresponding first axis lines $B_L$, $B_R$ and are located on the front side of the corresponding second axis lines $C_L$, $C_R$ can have a large area. Therefore, the respective inner portions of the two pedals 24, 25 can be easily pivoted downward.

Reference numerals 157, 158 designate respective stoppers. Since a lower surface of each pedal 24, 25 abut on the stoppers 157, 158, the pivotal motion of the each pedal 24, 25 is limited.

The locking device 106 includes four lock-operation portions 160, 161, 162, 163. Two lock-operation portions 160, 161 of the four lock-operation portions 160, 161, 162, 163 are for permitting and inhibiting the pivotal motion of the left pedal 24; and the other, two lock-operation portions 162, 163 are for permitting and inhibiting the pivotal motion of the right pedal 25.

The four lock-operation portions 160, 161, 162, 163 have a basically same construction including a pivot axis member 164 that perpendicularly extends from the main body 98; an arm 165 that is pivotable about the pivot axis member 164; a locking member 166 that is attached to the arm 165; and a pulley 167 that is not rotatable relative to the arm 165.

Figure 5:
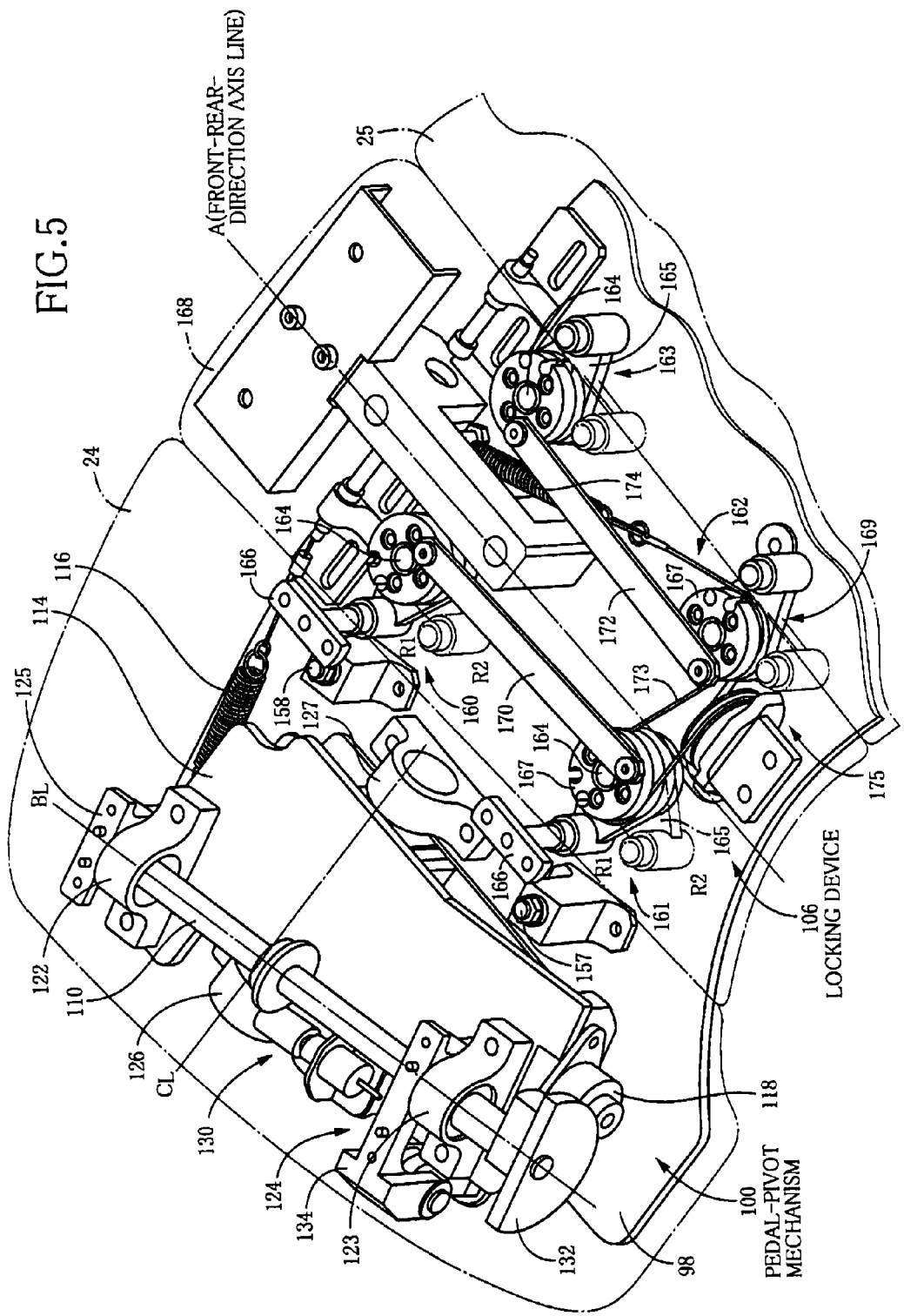
FIG. 5 is a perspective view of a portion of a pedal operation device of the vehicle.

FIG. 5 shows a locking position, R1, in which the locking member 166 is positioned under the pedal 24, and accordingly the pedal 24 is inhibited from being pivoted; and an unlocking position, R2, in which the locking member 166 is remote away from the pedal 24 and is positioned under a cover plate 168, and accordingly the pedal 24 is permitted to pivot. The cover plate 168 is provided between the two pedals 24, 25 and also functions as a foot rest.

The four lock-operation portions 160 through 163 are operated by a lock-drive device 169. The lock-drive device 169 includes a connection rod 170 that connects between the two lock-operation portions 160, 161; a connection rod 172 that connects between the two lock-operation portions 162, 163; the above-described pulleys 167; and a cable 173 that is wound on the appropriate pulleys 167. Each of the connection rods 170, 172 connects between the corresponding two pulleys 167, or two members that are rotatable with the two pulleys 167, respectively. One end of the cable 173 is fixed to the main body 98 via a spring 174, and the other end of the same 173 is connected to the grip operation devices 26, 28 via a transmitting member 175.

When a tensile force caused by the operator's operation of the grip operation devices 26, 28 is applied to the cable 173 against the elastic force of the spring 174, the lock-operation portion 161 is operated such that the arm 165 is pivoted counterclockwise about the pivot axis member 164 from the locking position R1 to the unlocking position R2. This rotation is transmitted via the connection rod 170 to the lock-operation portion 160, so that the lock-operation portion 160 is similarly operated such that the arm 165 thereof is pivoted counterclockwise about the pivot axis member 164 from the locking position R1 to the unlocking position R2. On the other hand, the lock-operation portion 162 is operated such that the arm 165 is pivoted clockwise about the pivot axis member 164 from the locking position R1 to the unlocking position R2. This rotation is transmitted via the connection rod 172 to the lock-operation portion 163, so that the lock operation portion 163 is similarly operated such that the arm 165 thereof is pivoted clockwise about the pivot axis member 164 from the locking position R1 to the unlocking position R2.

When the tensile force produced by the operator is removed from the cable 173, the cable 173 is drawn in the opposite direction by the elastic force of the spring 174, and the lock-operation portion 162 is operated such that the arm 165 is pivoted counterclockwise about the pivot axis member 164 from the unlocking position R2 to the locking position R1. Similarly, the lock-operation portion 163 is operated. On the other hand, the lock-operation portion 161 is operated such that the arm 165 is pivoted clockwise about the pivot axis member 164 from the unlocking position R2 to the locking position R1. Similarly, the lock operation portion 160 is operated. Since the two lock-operation portions 161, 160 and the two lock-operation portions 162, 163 are symmetrical with each other with respect to the centerline A, the direction of pivotal motion of the arms 165 of the lock-operation portions 161, 160 is opposite to the direction of pivotal motion of the arms 165 of the lock-operation portions 162, 163, when the locking and unlocking positions R1, R2 are switched to and from each other.

In the present embodiment, since the four lock-operation portions 160 through 163 are connected to each other, the four lock-operation portions 160 through 163 are switched between the locking and unlocking positions R1, R2, in the above-described interlocked manner. Thus, the four lock-operation portions 160 through 163 share the single drive device 169 and do not need respective exclusive drive devices. Thus, the total number of parts of the vehicle can be decreased and the production cost of the same can be reduced.

In the state in which the pivotal motions of the pedals 24, 25 are inhibited by the locking device 106, the pedals 24, 25 can be used as a foot rest. In this state, the operator can easily ride on and off the vehicle by using the pedals 24, 25.

In the state in which the pivotal motions of the pedals 24, 25 are permitted by the locking device 106, the operator can operate the pedals 24, 25 as a posture instructing member and thereby control a posture of the vehicle such that the vehicle's posture corresponds to the operated state of the pedals 24, 25.

In the present embodiment, the left and right pedal-pivot mechanisms 100, 102 have the respective potentiometers 130. However, it is possible that only one of the two pedal-pivot mechanisms 100, 102 have the potentiometer 130. The link device 104 defines a ratio of the pivotal-motion angle of one of the respective first axis members 110 of the two pedal-pivot mechanisms 100, 102 to that of the other first axis member 110. Therefore, if the pivotal-motion angle of one of the two pedals 24, 25 is detected, then that of the other pedal can be known.

In addition, since the two pedals 24, 25 are connected to each other, it is possible that only one of the two pedal-pivot mechanisms 100, 102 have the damper 118.

Moreover, it is not essentially required that the two pedals 24, 25 be pivotable about the respective second axis lines $C_L$, $C_R$. If the pressure sensors 128, 129 are replaced with strain gauges, then the strain gauges may be provided on each pedal 24, 25 per se so as to detect the operator's foot force applied thereto.

In addition, the first axis lines $B_L$, $B_R$ may be designed to intersect perpendicularly the corresponding second axis lines $C_L$, $C_R$, may be designed to extend parallel to the centerline A of the pedal operation device 22, or may be located at the respective middle portions of the pedals 24, 25 as seen in respective lateral directions thereof.

Figure 10:
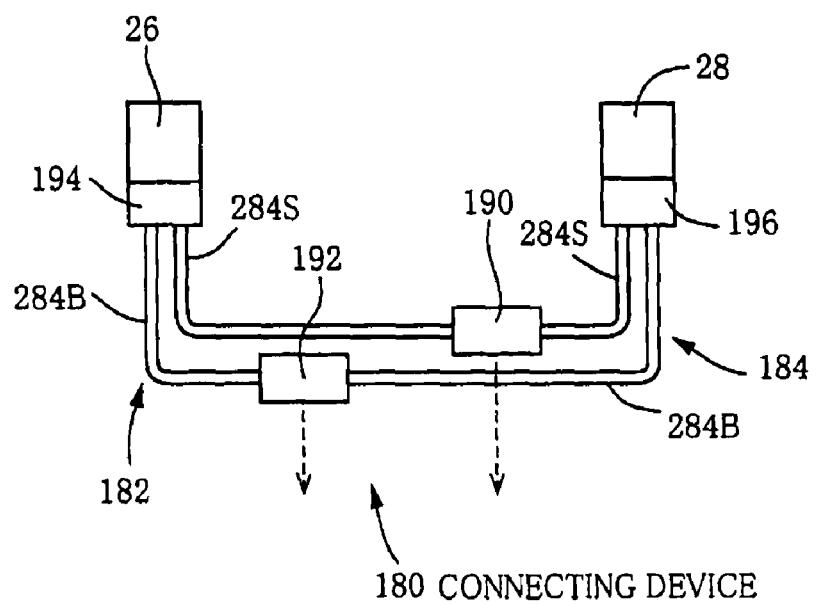
FIG. 10 is a diagrammatic view of grip operation devices and a connecting device.

As shown in FIG. 10, the left and right grip operation devices 26, 28 are connected to each other by a connecting device 180 that includes two pivotal-motion transmitting mechanisms 182, 184 each of which includes a plurality of cables and a plurality of pulleys; two force applying mechanisms 190, 192 which are provided on a back surface of the seat 20; and two operation-device holding devices 194, 196.

The left and right grip operation devices 26, 28 have respective identical constructions that are, however, symmetrical with each other with respect to the centerline A. Hereinafter, the right grip operation device 28 will be described in detail.

Figure 11:
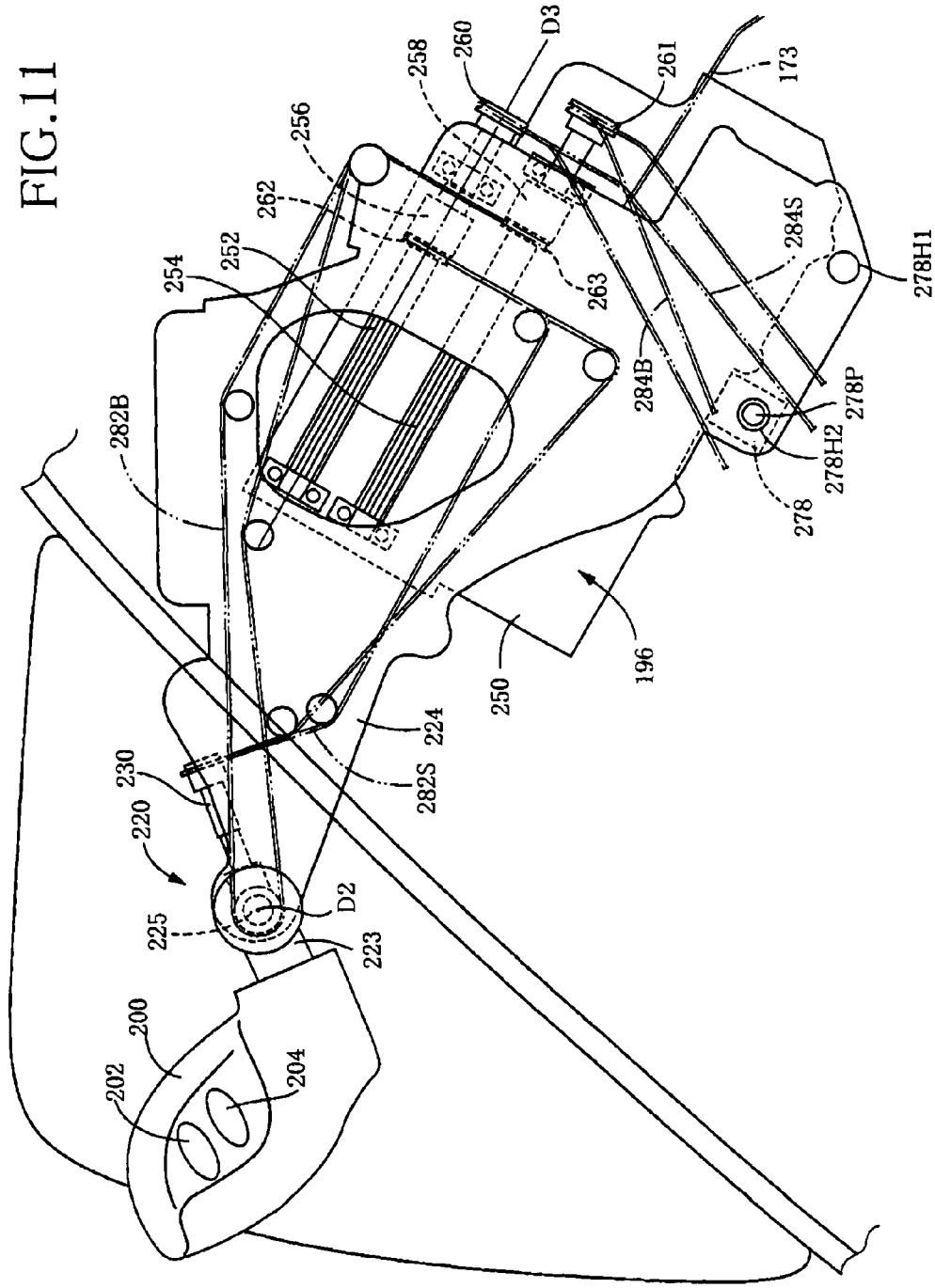
FIG. 11 is a front view of each grip operation device.
Figure 12:
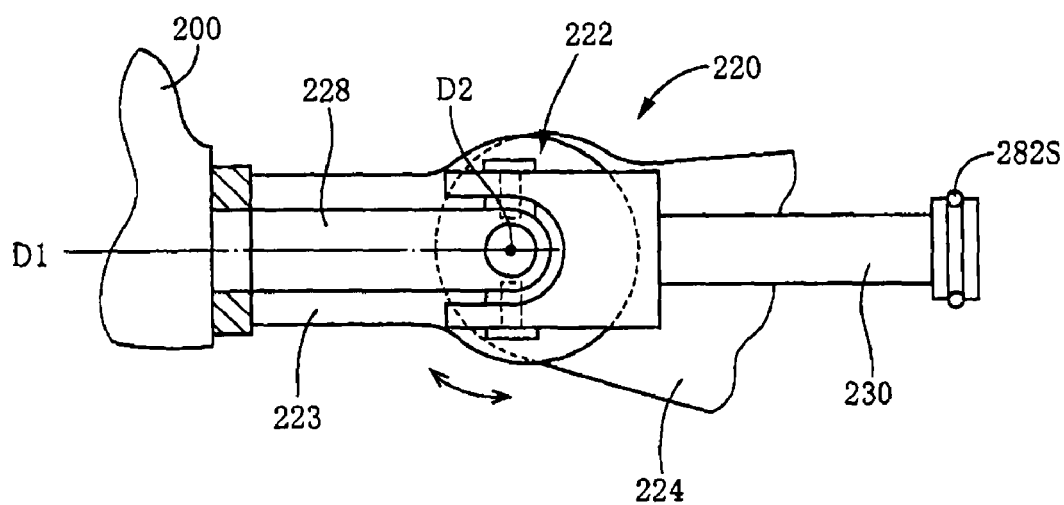
FIG. 12 is a front view of a grip holding device of the grip operation device.

As shown in FIGS. 11 and 12, the grip operation device 28 includes a grip 200, and a grip holding device (i.e., a common-member holding device) 220.

The respective grips 200 of the left and right grip operation devices 26, 28 have respective shapes that are symmetrical with each other with respect to the centerline A, and each of the two grips 200 has two switches 202, 204 provided on an inner surface thereof. Each grip 200 is gripped by the corresponding hand of the operator such that the thumb is positioned on the inner surface of the grip 200 and the index to little fingers are positioned on an outer surface of the grip 200. The outer surface includes a curved portion and a recessed portion, and the ring finger is positioned in the recessed portion. Thus, the grip 200 can be easily pivoted by the operator. The two switches 202, 204 are provided at respective positions where each switch 202, 204 can be easily operated by the thumb.

The grip holding device 220 holds the grip 200 such that the grip 200 is rotatable or pivotable about each of a first axis line, D1, and a second axis line, D2, perpendicular to the first axis line D1. As shown in FIG. 12, the grip holding device 220 includes a universal joint 222.

As shown in FIG. 11, a base portion 223 that holds the grip 200 is held by a second axis member 225 extending parallel to the second axis line D2, such that the base portion 223 is pivotable about the second axis member 225 relative to a main body 224. A first axis member 228 is held by the base portion 223 such that the first axis member 228 is not rotatable relative to the base portion 223, and is rotatable about the first axis line D1 relative to the main body 224. The first axis member 228 is connected to a rotation transmitting portion 230 via the universal joint 222. Even in a state in which the base portion 223 has been pivoted to a certain angular position about the second axis line D2 relative to the main body 224, a rotation of the first axis member 228 about the first axis line D1 can be transmitted, at that angular position, to the rotation transmitting portion 230 via the universal joint 222.

The grip 200 is supported by the first axis member 228 such that the grip 200 is not rotatable relative to the first axis member 228 about the first axis line D1. Therefore, when the grip 200 is rotated about the first axis line D1, the first axis member 228 is rotated about the first axis line D1 and accordingly the rotation transmitting portion 230 is rotated.

As shown in FIG. 11, the second axis line D2 extends parallel to the widthwise direction of the body 10 and, when the grip 200 takes its neutral position, the first axis line D1 perpendicularly intersects the second axis line D2 and is somewhat inclined relative to the front-rear direction of the body 10.

The two force applying mechanisms 190, 192 of the connecting device 180 have an identical construction including a reaction-force applying device that applies a reaction force corresponding to an angle of operation of the grip 200; a damping device that applies a damping force corresponding to a speed of operation of the grip 200; and an angle detecting device that detects the angle of operation of the grip 200.

The two operation-device holding devices 194, 196 have respective identical constructions that are, however, symmetrical with each other with respect to the centerline A. Hereinafter, the right operation-device holding device 196 that holds the right grip operation device 28 will be described in detail.

The main body 224 is attached to the body 10 via the operation-device holding device 196, such that the main body 224 is movable relative to the body 10.

Figure 13:
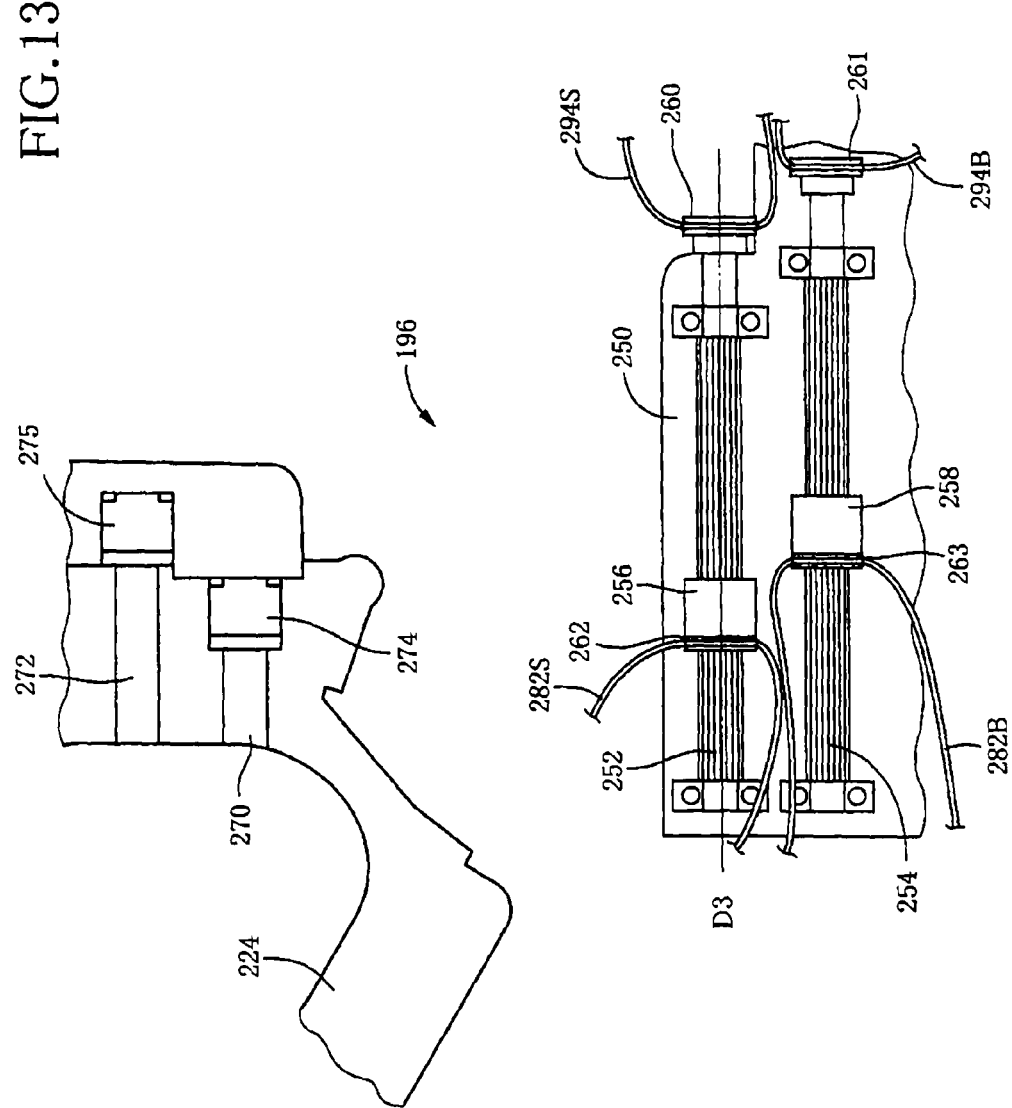
FIG. 13 is an exploded view of an operation-device holding device of the connecting device.

As shown in FIG. 13, the operation-device holding device 196 includes a body-side member 250 fixed to the body 10; two spline shafts 252, 254 attached to the body-side member 250; and two nuts 256, 258 that fit on the two spline shafts 252, 254, respectively. Each of the two spline shafts 252, 254 extends parallel to a third axis line, D3, and has a plurality of teeth extending parallel to the third axis line D3. Two pulleys 260, 261 are fixed to respective one end portions of the two spline shafts 252, 254; and two pulleys 262, 263 are fixed to respective one end portions of the two nuts 256, 258. The third axis line D3 is inclined relative to the body 10 such that as the third axis line D3 goes frontward, the axis line D3 goes upward.

The main body 224 has two grooves 270, 272 that are opposed to the two spline shafts 252, 254, respectively; and two grooves 274, 275 that are opposed to the two nuts 256, 258, respectively. The grooves 270, 272 have respective diameters greater than those of the spline shafts 252, 254, and do not engage the teeth of the same 252, 254. Likewise, the grooves 274, 275 have respective diameters greater than those of the nuts 256, 258. Therefore, in the state in which the main body 224 is attached to the body-side member 250, the spline shafts 252, 254 are respectively accommodated in the grooves 270, 272 and the nuts 256, 258 are respectively accommodated in the grooves 274, 275, such that respective rotations of the nuts 256, 258 and the spline shafts 252, 254 are permitted.

In addition, the respective diameters of the nuts 256, 258 are greater than those of the spline shafts 252, 254, and the respective diameters the grooves 274, 275 are greater than those of the grooves 270, 272. Therefore, in the state in which the main body 224 is attached to the body-side member 250, each of the nuts 256, 258 is inhibited from being moved relative to the main body 224 along the third axis line D3 by two wall surfaces defining opposite axial ends of a corresponding one of the grooves 274, 275.

The movement of the main body 224 relative to the body-side member 250 is permitted by the movement of the nuts 256, 258 relative to the spline shafts 252, 254. In the present embodiment, the main body 224 can be moved between its advanced position and its retracted position at each of which the main body 224 can be inhibited from being moved relative to the body-side member 250 by a locking device 278.

The locking device 278 includes a solenoid, and is supported by the body-side member 250. An electric current supplied to the solenoid is controlled such that a plunger 278P is inserted into each one of two positioning holes 278H1, 278H2 of the main body 224 so as to inhibit the movement of the main body 224 relative to the body-side member 250 (this is a locking position of the plunger 278P), or is retracted from the each positioning hole 278H1, 278H2 so as to permit the relative movement of the main body 224 (this is an unlocking position of the plunger 278P). The advanced position of the main body 224 is a position where the plunger 278P is inserted into the front positioning hole 278H1; and the retracted position of the main body 224 is a position where the plunger 278P is inserted into the rear positioning hole 278H2. The locking device 278 is operated in response to operation of the switch 202.

As shown in FIG. 11, a cable 282S that is wound on the rotation transmitting portion 230 is wound on the pulley 262 of the nut 256; and a cable 282B that is wound on the second axis member 225 is wound on the pulley 263 of the nut 258.

Two cables 284S, 284B are wound on the respective pulleys 260, 261 of the two spline shafts 252, 254 on which the two nuts 256, 258 fit, respectively. The two cables 284S, 284B are connected to the left grip operation device 26 via the above-described force applying devices 190, 192 and the left operation-device holding device 196.

When the grip 200 of the right grip operation device 28 is operated or rotated about the first axis line D1, the rotation transmitting portion 230 is rotated. The rotation of the rotation transmitting portion 230 is transmitted via the cable 282S to the pulley 262 of the nut 256, so that the nut 256 is rotated. The rotation of the nut 256 causes the rotation of the spline shaft 252 and the pulley 260. This rotation is transmitted via the cable 284S and the force applying device 190 to the spline shaft 252 of the left operation-device holding device 196 and further transmitted to the rotation transmitting portion 230 via the cable 282S. The rotation of the rotation transmitting portion 230 causes the rotation of the first axis member 228 about the first axis line D1. Thus, the left grip 200 is rotated about the first axis line D1, without needing the operator's operation. The force applying device 190 is commonly used for the respective rotations of the right grip operation device 28 and the left grip operation device 26 about the respective first axis lines D1. Thus, irrespective of which one of the left and right grips 200 may be rotated about the corresponding first axis line D1, the reaction force or the like is applied to the one grip 200 and the angle of rotation of the grip 200 is detected.

When the grip 200 of the right grip operation device 28 is operated or pivoted about the second axis line D2, the second axis member 225 is rotated. The rotation of the second axis portion 225 is transmitted via the cable 282B to the pulley 263 of the nut 258, so that the nut 258 is rotated. The rotation of the nut 258 causes the rotation of the spline shaft 254 and the pulley 261. This rotation is transmitted via the cable 284B and the force applying device 192 to the spline shaft 254 of the left operation-device holding device 194 and further transmitted to the second axis member 225 via the cable 282B. The rotation of the second axis member 225 causes the rotation of the base portion 223 about the second axis line D2. Thus, the left grip 200 is rotated about the second axis line D2, without needing the operator's operation. The force applying device 192 is commonly used for the respective pivotal motions of the right grip operation device 28 and the left grip operation device 26 about the respective second axis lines D2. Thus, irrespective of which one of the left and right grips 200 may be pivoted about the corresponding second axis line D2, the reaction force or the like is applied to the grip 200 and the angle of rotation of the grip 200 is detected.

Thus, in the present embodiment, the two grips 200 are connected to each other by the connecting device 180, in the interlocked manner in which the transmission of the rotation of one of the two grips 200 about the corresponding first axis line D1 to the other grip 200 and the transmission of the rotation of one of the two grips 200 about the corresponding second axis line D2 to the other grip 200 occur independent of each other.

The above-indicated transmissions of the rotations can occur irrespective of which positions the nuts 256, 258 may take relative to the corresponding spline shafts 252 254.

The rotation transmitting device 182 includes the cable 284S and the pulley 260; and the rotation transmitting device 184 includes the cable 284B and the pulley 261.

As will be described later, the grips 200 provide a steering-instructing operable member, an acceleration-deceleration-instruction operable member, or a common member functioning as each of the steering-instructing operable member and the acceleration-deceleration-instructing operable member.

Thus, the main body 224 is movable between the retracted position and the advanced position relative to the body 10. The main body 224 is connected via the cable 173 to the locking device 106 of the pedal operation device 22.

When the main body 224 is positioned at the retracted position, the cable 173 is pulled by the main body 224 and the locking device 106 is placed at the unlocking position R2; and when the main body 224 is positioned at the advanced position, the cable 173 is pulled by the spring 174 and the locking device 106 is placed at the locking position R1.

Each of the two operation-device holding devices 194, 196 may be arranged such that the position of the main body 224 relative to the body 10 can be fixed at an arbitrary position between the retracted position and the advanced position. In this case, the operation can finely adjust, according to his or her preference or build, respective positions where the two grips 200 are operated.

In the present embodiment, the left and right grip operation devices 26, 28 are employed. However, it is not essentially needed to employ the two grip operation devices. That is, it is possible to employ only one grip operation device.

In addition, it is not essentially required that the grips 200 constitute the common member functioning as each of the steering-instructing operable member and the acceleration-deceleration-instructing operable member. That is, it is possible to employ individual members that function as the steering-instructing operable member and the acceleration-deceleration-instructing operable member, respectively.

As shown in FIG. 15, the vehicle constructed as described above is controlled by a control device 300. The control device 300 is essentially constituted by a computer including an implementing portion 302, a storing portion 304, and an input-output portion 306. The input-output portion 306 is connected to a grip-operation detecting device 310 that detects an operation state of the grips 200; a pedal-operation detecting device 312 that detects an operation state of the pedals 24, 25; a posture-change detecting device 314 that detects a change of a posture of the vehicle; the switches 202, 204; an indicator 320; and the respective solenoids (not shown in FIG. 15) of the left and right locking devices 278. In addition, the input-output portion 306 is connected to the steering actuator 30, the driving-braking actuators 40, 42, and the suspension actuators 50, 52 via respective motor control devices (i.e., respective motor servo amps) 322, 324, 326.

The grip-operation detecting device 310 includes a steering-instruction detecting portion (i.e., a steering-related angle sensor) 316 that detects an angle of rotation, $\theta_{LAT}$, of the grips 200 about the first axis line D1; and an acceleration-deceleration-instruction detecting portion (i.e., an acceleration-deceleration-related angle sensor) 317 that detects an angle of rotation, $\theta_{LON}$, of the grips 200 about the second axis line D2. The acceleration-deceleration-instruction detecting portion 317 also functions as a backward-movement-instruction detecting portion 318.

As shown in FIG. 14(a), each grip 200 can be rotated about the first axis line D1 as indicated at arrow, A, and about the second axis line D2 as indicated at arrow, B. In addition, as shown in FIG. 14(b), a rightward rotation of the grip 200 from its neutral position about the first axis line D1, as seen from the operator, represents an instruction of a rightward steering; and a leftward rotation of the grip 200 from its neutral position represents an instruction of a leftward steering. In the present embodiment, the neutral position of the grip 200 is inclined inward by an appropriate angle (preferably, this angle falls in a range of from 10 degrees to 20 degrees and is equal to, e.g., 15 degrees). The rotation angle $\theta_{LAT}$ of the grip 200 as measured from its neutral position represents an instructed amount of steering. In the present embodiment, it is assumed for convenience that an angle of rightward turning takes a positive value and an angle of leftward turning takes a negative value, Likewise, regarding an angle of steering of the steering wheel 12, described later, it is assumed that an angle of rightward steering takes a positive value and an angle of leftward steering takes a negative value; and regarding an angle of inclination of the vehicle, described later, it is assumed for convenience that an angle of rightward inclination takes a positive value and an angle of leftward inclination takes a negative value.

In addition, as shown in FIG. 14(c), the rotation of each grip 200 about the second axis line D2 in a forward or downward direction from its neutral position (hereinafter, referred to as the forward rotation) represents an instruction of acceleration; and the rotation of each grip 200 about the second axis line D2 in a backward or upward direction from the neutral position (hereinafter, referred to as the backward rotation) represents an instruction of deceleration. In addition, when the running speed of the vehicle is zero, and if an angle of the backward rotation is not smaller than a predetermined angle ($\theta_R$), the backward rotation represents an instruction of backward movement. Meanwhile, there are some cases where the forward rotation does not represent an instruction of acceleration. If, however, a target running speed of the vehicle that is determined based on the angle $\theta_{LON}$ ($\theta_D$) of the forward rotation is higher than an actual running speed of the vehicle, the vehicle is accelerated by the drive devices 40, 42. In this case, therefore, the forward rotation can be said to represent an instruction of acceleration. The angle $\theta_{LON}$ ($\theta_B$) of the backward rotation corresponds to a request of deceleration. It is noted that the neutral position of each grip 200 represents an instruction of a moderately braked acceleration that corresponds to a state in which a vehicle driven by an engine is subjected to so-called "engine brake". More specifically described, if the speed of the rotation of the driving wheels 14, 16 caused by the road surface is higher than that caused by the drive motors 44, a braking force is applied to the driving wheels 14, 16; and, if the former speed is lower than the latter speed, a driving force is applied to the same 14, 16. In the present embodiment, a positive sign is given to angles of the forward rotation, and a negative sign is given to angles of the backward rotation, for the sake of convenience.

The pedal-operation detecting device (i.e., the posture-instruction detecting device) 312 includes the above-described potentiometers 130 that detect the angle $\theta_{foot}$ of pivotal motion of the pedals 24, 25, and the four pressure sensors 128, 129 that detect the foot forces applied to the pedals 24, 25. The pivotal-motion angle $\square_{foot}$ detected by the potentiometers 130 represents an operator's instruction to incline the body 10 and the wheels 14, 16 in the lateral direction. A greater absolute value of angle $\theta_{foot}$ represents an operator's instruction to incline the body 10 and the wheels 14, 16 by a greater absolute value of angle in the lateral direction. In the present embodiment, the downward pivotal motion of the inner portion of the left pedal 24 represents an operator's instruction to incline the body 10 in the rightward direction; and the downward pivotal motion of the inner portion of the right pedal 25 represents an operator's instruction to incline the body 10 in the leftward direction. That is, the direction in which the vehicle's body 10 is inclined by the operation of the pedals 24, 25 is the same as the direction in which the operator's body is inclined when the operator operates the pedals 24, 25. In the present embodiment, a positive sign is given to angles of pivotal motion of the left pedal 24 (that represent an instruction to incline the body 10 in the rightward direction); and a negative sign is given to angles of pivotal motion of the right pedal 25 (that represent an instruction to incline the body 10 in the leftward direction).

In addition, a negative sign is given to values detected by the two front foot-force sensors 129 out of the four foot-force sensors 128, 129; and a positive sign is given to values detected by the two rear foot-force sensors 128. Therefore, if a sum, or an average, of the values detected by the four foot-force sensors 128, 129 is negative, the sum or average represents an instruction to incline the body 10 in the forward direction; and if the sum or the average is positive, the sum or average represents an instruction to incline the body 10 in the backward direction. A greater absolute value of the sum or the average represents an instruction to incline the body 10 by a greater absolute value of angle. Hereinafter, the sum, or the average, of the values detected by the four foot-force sensors 128, 129 (i.e., the value obtained by processing the values detected by the four pressure sensors 128, 129) will be simply referred to as the foot-force value, $P_{foot}$.

In the present embodiment, a positive sign is given to angles of inclination of the body 10 from a reference posture (i.e., a reference position) in the rearward direction, i.e., angles of the rearward inclination in which the rear portion of the body 10 is moved downward relative to the front portion thereof and a negative sign is given to angles of inclination of the body 10 from the reference posture in the forward direction, i.e., angles of the forward inclination in which the rear portion of the body 10 is moved upward relative to the front portion thereof. Since the rearward inclination is carried out by moving the rear wheels 14, 16 to the bound side, and the forward inclination is carried out by moving the rear wheels 14, 16 to the rebound side, this rule is parallel to the previously-explained rule that the positive sign is given to the strokes of the rear wheels 14, 16 to the bound side and the negative sign is given to the strokes of the rear wheels 14, 16 to the rebound side.

The posture-change detecting device 314 includes three gyro sensors 330, 332, 334. Each gyro sensor detects a Coliolis force corresponding to an angular velocity thereof about an axis line thereof. The three gyro sensors include a pitch-rate sensor 330 whose axis line extends parallel to the widthwise direction of the vehicle; a roll-rate sensor 332 whose axis line extends parallel to the front-rear direction of the vehicle; and a yaw-rate sensor 334 whose axis line extends parallel to the upward and downward directions of the vehicle.

The indicator 320 indicates an ON state or an OFF state of a main switch, not shown, of the vehicle. For example, the indicator 320 may include a lamp that turns on when the main switch is ON, and turns off when the main switch is OFF. As will be described later, it is possible to additionally employ an indicator that indicates whether the vehicle is in a comfort mode or a performance mode, and/or an indicator that indicates whether a lean angle is insufficient.

The control device 300 outputs, to each of the motor control devices 322, 324, 326, a motor-rotation-torque command (i.e., a motor-rotation-speed command), and each of the motor control devices 322, 324, 326 supplies, to the control device 300, information representing an operation state of the corresponding motor 32, 44, 46 (i.e., a state of the corresponding wheel 12, 1, 16).

As described above, each of the switches 202 is operated when a corresponding one of the grip operation devices 26, 28 is moved relative to the body 10; and each of the switches 204 is operated when either the comfort mode or the performance mode is selected.

The comfort mode is a mode in which the posture of the body 10 is controlled irrespective of whether the pedals 24, 25 are operated, and the performance mode is a mode in which the posture of the body 10 is controlled based on the operation of the pedals 24, 25. Therefore, when the operator selects the comfort mode, the operator needs to move the main bodies 224 to their retracted positions. In this state, the pedal operation device 22 inhibits the operation of the pedals 24, 25. On the other hand, when the operator selects the performance mode, the operator needs to move the main bodies 224 to their advanced positions. In this state, the pedal operation device 22 permits the operation of the pedals 24, 25.

The storing portion 304 stores a plurality of programs that are respectively represented by the flow charts shown in FIGS. 23 through 31.

The operation of the control device 300 will be described below, by reference to the diagrammatic views shown in FIGS. 16 through 22.

Figure 16:
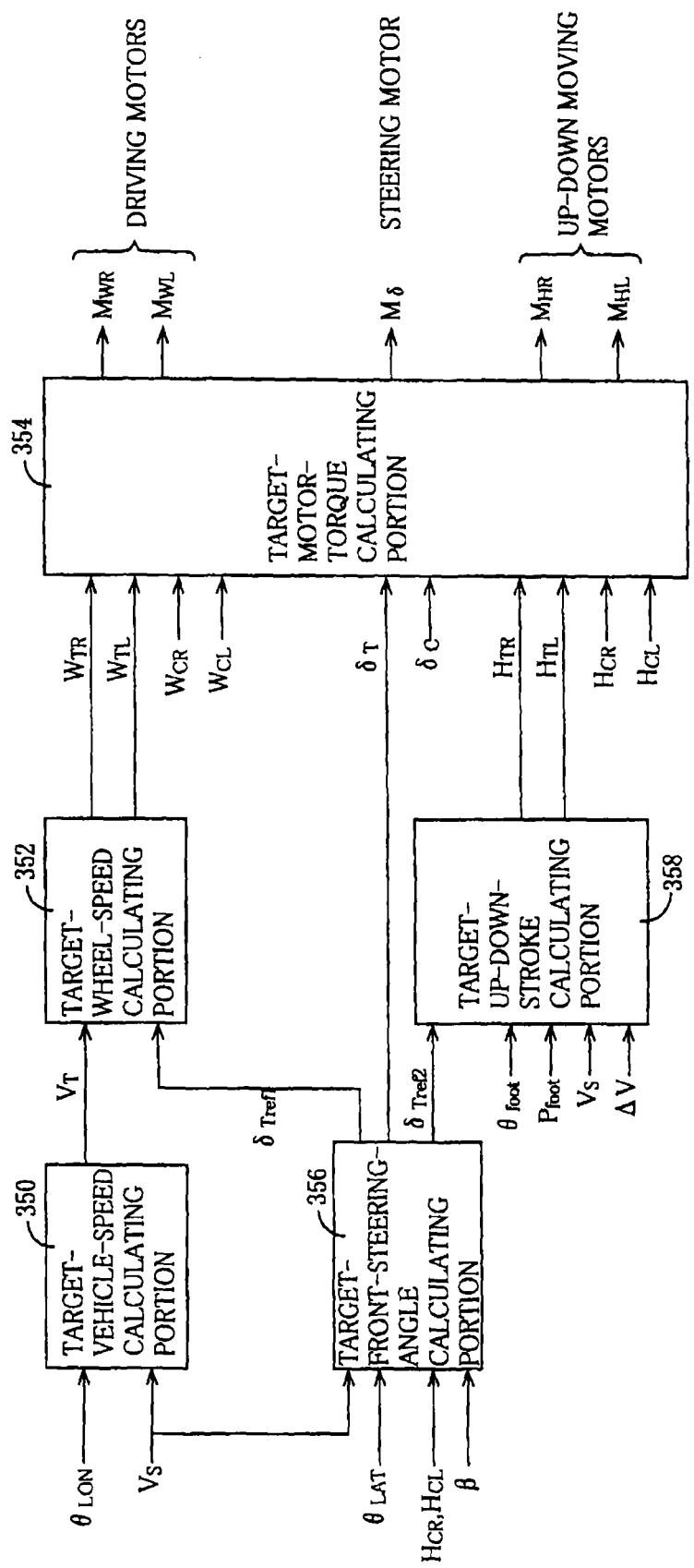
FIG. 16 is a diagrammatic view showing an overall operation of the control device.

First, an overall flow of the operation of the control device 300 is briefly described by reference to the diagrammatic view of FIG. 16.

A target-vehicle-speed calculating portion 350 calculates a target running speed, $V_T$, of the vehicle based on the rotation angle $\square_{LON}$ of the grips 200 with respect to the front-rear direction and an actual running speed, Vs, of the vehicle. A target-wheel-speed calculating portion 352 calculates respective target rotation speeds, $W_{TL}$, $W_{TR}$, of the left and right driving wheels 14, 16 based on the target running speed $V_T$ of the vehicle and a target-steering-angle-related reference value, $\delta_{Tref1}$ (this value $\delta_{Tref1}$ is different from a target steering angle outputted to a target-motor-torque calculating portion 354). The target-motor-torque calculating portion 354 calculates respective target torques, $M_{WL}$, $M_{WR}$, of the two driving motors 44 based on the target rotation speeds $W_{TL}$, $W_{TR}$ of the left and right driving wheels 14, 16 and respective actual rotation speeds $W_{CL}$, $W_{CR}$ of the same 14, 16. The target torques $M_{WL}$, $M_{WR}$ may be drive torques or brake torques.

Information representing the calculated target torques $M_{WL}$, $M_{WR}$ is supplied to the two motor control devices (i.e., motor servo amps) 324, respectively. The two motor control devices 324 control the respective operating states of the two driving motors 44 (i.e., output respective PWM signals to the same 44) so that respective actual torques thereof approach the corresponding target torques $M_{WL}$, $M_{WR}$. The motor control devices 324 supply, to the control device 300, information representing the actual rotation speeds $W_{CL}$, $W_{CR}$ of the driving wheels 14, 16 and the drive or brake torques actually applied to the same 14, 16.

Each of the actual rotation speeds $W_{CL}$, $W_{CR}$ of the driving wheels 14, 16 is obtained based on a value detected by an encoder. However, if an angular speed, a, of rotation of each of the driving wheels 14, 16 is multiplied by a radius, R, of the each wheel 14, 16 ($=\omega \cdot R$), a peripheral speed of the each wheel 14, 16 can be obtained, and the actual running speed of the vehicle can be obtained based on the respective peripheral speeds of the driving wheels 14, 16. Hereinafter, the actual running speed of the vehicle will be simply referred to as the "vehicle speed" $V_S$. In the present embodiment, the vehicle speed $V_S$ is determined based on an average of the respective peripheral speeds of the driving wheels 14, 16. However, in the following description, a rotation speed of each wheel 14, 16 may be obtained as a peripheral speed or a rotation angular speed thereof, and a vehicle speed may be obtained based on the respective rotation angular speeds of the driving wheels 14, 16.

A target-front-steering-angle calculating portion 356 calculates the target steering angle $\delta_T$ based on the actual vehicle speed $V_S$, the rotation angle $\theta_{LAT}$ of the grips 200 with respect to the lateral direction, respective actual up-down strokes, $H_{CL}$, $H_{CR}$, of the left and right rear wheels 14, 16 relative to the body 10, and the roll rate $\beta$; and the target-motor-torque calculating portion 354 calculates a target drive torque, $M_\delta$, of the steering motor 32 based on the target steering angle $\delta r$ and an actual steering angle, $\delta_C$, of the steering wheel 12.

Information representing the target drive torque $M_\delta$ is supplied to the motor control device (i.e., motor servo amp) 322. The motor control device 322 controls the operating state of the steering motor 32 so that an actual drive torque thereof approaches the target drive torque $M_\delta$. The motor control device 322 supplies, to the control device 300, information representing the actual steering angle $\delta_C$ of the steering wheel 12 and an actual load applied to the same 12.

In addition, the target-front-steering-angle calculating portion 356 calculates the target-steering-angle reference value $\delta_{Tref1}$ and another target-steering-angle reference value, $\delta_{Tref2}$, that are to be supplied to the target-wheel-speed calculating portion 352 and a target-up-down-stroke calculating portion 358, respectively.

The target-up-down-stroke calculating portion 358 calculates, in the comfort mode, respective target up-down strokes, $H_{TL}$, $H_{TR}$, of the left and right wheels 14, 16 relative to the body 10, based on the actual vehicle speed $V_S$ and a vehicle-speed deviation, $\Delta V$ (i.e., a value obtained by subtracting the actual vehicle speed $V_S$ from the target vehicle speed $V_T$), and calculates, in the performance mode, respective target up-down strokes $H_{TL}$, $H_{TR}$ based on the actual vehicle speed $V_S$, the vehicle-speed deviation $\Delta V$, the pedal rotation angle $\theta_{foot}$, and the foot force $P_{foot}$. The target-motor-torque calculating portion 354 calculates respective target drive torques, $M_{HL}$, $M_{HR}$, of the two up-down moving motors 66 based on the respective target up-down strokes $H_{TL}$, $H_{TR}$ and the respective actual up-down strokes $H_{CL}$, $H_{CR}$.

Information representing the two target drive torques $M_{HL}$, $M_{HR}$ is supplied to the two motor control devices (i.e., motor servo amps) 326, respectively. The motor control devices 326 control the respective operation states of the up-down moving motors 66 so that respective actual torques thereof approach the respective target torques $M_{HL}$, $M_{HR}$. The motor control devices 326 supply, to the control device 300, information representing the respective actual up-down strokes $H_{CL}$, $H_{CR}$ of the driving wheels 14, 16 relative to the body 10.

However, an up-down stroke may be obtained based on not an amount of rotation of each up-down moving motor 66 but a position of each wheel holding member 64 relative to the corresponding guide members 60, 62 that is detected by, e.g., a potentiometer.

A posture of the body 10 with respect to the lateral direction and a posture of the body 10 with respect to the front-rear direction can be controlled by controlling the up-down moving devices 50, 52.

As shown in FIG. 32(a), the posture of the body 10 with respect to the lateral direction is controlled by controlling an angle, $\theta_L$, of inclination of a straight line, $Y_B$, defining an up-down direction of the body 10, relative to a normal line, Z, of a road surface. Hereinafter, the inclination angle $\theta_L$ of the body 10 with respect to the lateral direction will be referred to as the left-right lean angle $\theta_L$. The body 10 and the left and right driving wheels 14, 16 are inclined by making different the respective positions of the wheels 14, 16 relative to the body 10 in the up-down direction. As described previously, in the present embodiment, the guide members 60, 62 of the left up-down moving device 50 extend parallel to the guide members 60, 62 of the right up-down moving device 52, respectively. Therefore, the inclination angle $\theta_L$ of the straight line $Y_B$ defining the up-down direction of the body 10 relative to the normal line Z is equal to an angle, $\theta_L$, of inclination of a straight line, $Y_W$, defining an up-down direction of a plane of rotation of each wheel 14, 16, relative to the normal line Z.

In addition, as shown in FIG. 32(b), if respective positions of the left and right driving wheels 14, 16 relative to the body 10 are changed in the same direction, an angle, $\theta_{pit}$, of inclination of a straight line, X, defining a front-rear direction of the body 10, relative to a straight line, $X_0$, defining a front-rear direction of the vehicle. Hereinafter, the inclination angle $\theta_{pit}$ of the body 10 with respect to the front-rear direction of the vehicle will be referred to as the pitch angle (i.e., the front-rear lean angle) $\theta_{pit}$.

In the present embodiment, respective positions of the left and right driving wheels 14, 16 that are taken, when the main switch of the vehicle is changed from the OFF state to the ON state, relative to the body 10 in a steady state of the vehicle defined as a stopped state thereof or a constant-speed running state thereof are referred to as reference positions where the pitch angle (i.e., front-rear lean angle) $\theta_{pit}$ is equal to zero. The straight line $X_0$ defines the front-rear direction of the vehicle in the steady state thereof. Respective deviations of the reference positions from the zero point can be obtained based on respective accumulated values of the up-down strokes. If the deviations of the reference positions from the zero point are corrected, e.g., when the up-down strokes reach their limits, those deviations can be accurately obtained.

Figure 17:
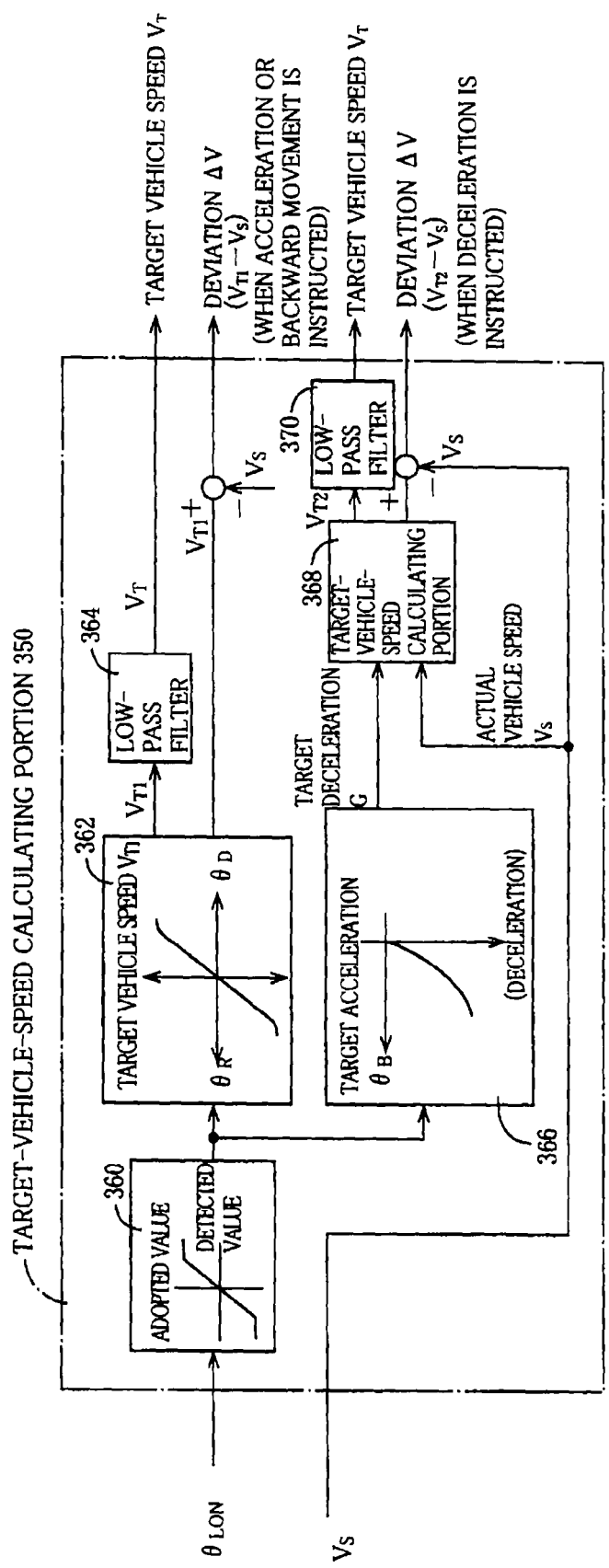
FIG. 17 is a view showing a target-vehicle-speed calculating portion of the control device.

As shown in FIG. 17, the target-vehicle-speed calculating portion 350 receives the value (i.e., the rotation angle of the grips 200 in the front-rear direction) $\theta_{LON}$ detected by the acceleration-deceleration-instruction detecting portion 324, and the actual vehicle speed $V_S$. The values detected by the acceleration-deceleration-instruction detecting portion 324 are saturated by a processing portion 360 (i.e., those values are limited by upper and lower limits, that is, the values greater than the upper limit or smaller than the lower limit are not outputted; in the following description, the word "saturated" has the same meaning). When the grips 200 are operated by being rotated in the frontward direction to instruct the acceleration of the vehicle, or are operated to instruct the backward movement of the vehicle, a target-vehicle-speed obtaining portion 362 calculates a target vehicle speed, $V_{T1}$, based on the rotation angle $\theta_{LON}$ ($\theta_D$ or $\theta_R$). The thus obtained target vehicle speed $V_{T1}$ is processed by a low-pass filter 364, and then is outputted (as the target vehicle speed $V_T$). In addition, the target-vehicle-speed calculating portion 350 outputs a deviation $\Delta V$ ($V_{T1}-V_S$) of the vehicle speed that is obtained by subtracting the actual vehicle speed $V_S$ from the target vehicle speed $V_{T1}$.

When the grips 200 are operated by being rotated in the rearward direction, a target-deceleration obtaining portion 366 calculates a target deceleration, G (<0), based on the rotation angle $\theta_{LON}$ ($\theta_B$), and then a target-vehicle-speed obtaining portion 368 calculates a target vehicle speed, $V_{T2}$ (t seconds after: $V_{T2}=V_S+G \cdot t$), based on the target deceleration G and the actual vehicle speed $V_S$. The thus obtained target vehicle speed $V_{T2}$ is processed by a low-pass filter 370, and then is outputted (as the target vehicle speed $V_T$). In addition, the target-vehicle-speed calculating portion 350 outputs a deviation $\Delta V$ ($V_{T2}-V_S$) of the vehicle speed that is obtained by subtracting the actual vehicle speed $V_S$ from the target vehicle speed $V_{T2}$.

Figure 18:
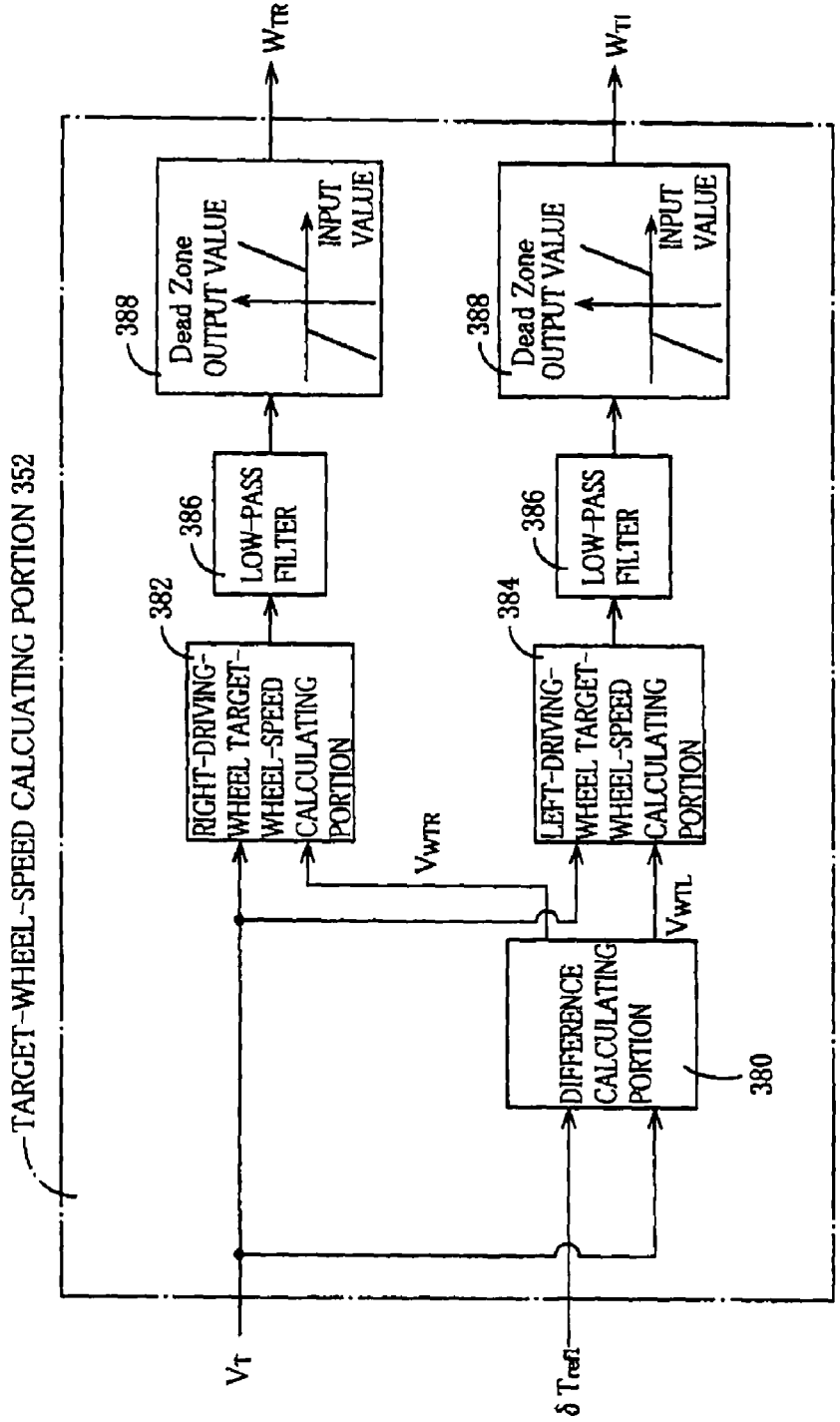
FIG. 18 is a view showing a target-wheel-speed calculating portion of the control device.

As shown in FIG. 18, the target-wheel-speed calculating portion 352 receives the target vehicle speed $V_T$ outputted by the target-vehicle-speed calculating portion 350, and the target-steering-angle reference value $\delta_{Tref1}$ (containing a delay), described later. A difference calculating portion 380 calculates, based on the target-steering-angle reference value $\delta_{Tref1}$ and the target vehicle speed $V_T$, a difference of respective rotation speeds of the left and right wheels 14, 16 when the vehicle turns, and outputs respective difference-dependent target speeds, $V_{WTL}$, $V_{WTR}$, of the wheels 14, 16.

A right-driving-wheel target-wheel-speed calculating portion 382 calculates a target speed $W_{TR}$ of the right driving wheel 16 based on the difference-dependent target speed $V_{WTR}$ of the right wheel 16 and the target vehicle speed $V_T$, and a left-driving-wheel target-wheel-speed calculating portion 384 calculates a target speed $W_{TL}$ of the left driving wheel 14 based on the difference-dependent target speed $V_{WTL}$ of the left wheel 14 and the target vehicle speed $V_T$. The thus obtained target wheel speeds $W_{TL}$, $W_{TR}$ are outputted after, first, those speeds are processed by respective low-pass filters 386 and then the speeds whose absolute values are smaller than a pre-set value are removed (i.e., are changed to zero) by respective processing portions 388.

As described previously, the target-motor-torque calculating portion 354 calculates the respective target torques $M_{TR}$, $M_{TL}$ of the driving motors 44 based on the target speed $W_{TR}$ of the right driving wheel 16, the target speed $W_{TL}$ of the left driving wheel 14, the actual speed $W_{CR}$ of the right driving wheel 16, and the actual speed $W_{CL}$ of the left driving wheel 14.

Figure 23:
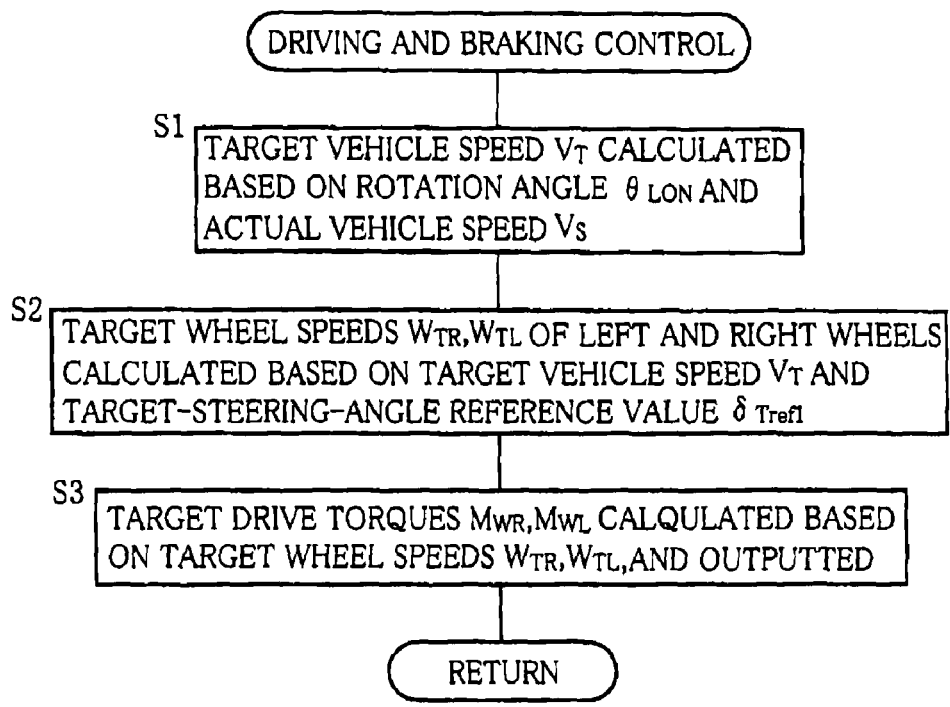
FIG. 23 is a flow chart representing a braking and driving program that is stored in a storing portion of the control device.

Respective portions of the respective operations of the target-vehicle-speed calculating portion 350, the target-wheel-speed calculating portion 352 and the target-motor-torque calculating portion 354 will be briefly described by reference to the flow chart shown in FIG. 23.

At Step S1, a target vehicle speed $V_T$ is calculated based on the rotation angle $\theta_{LON}$ of the grips 200 with respect to the front-rear direction, and the actual vehicle speed $V_S$. At Step S2, respective target speeds $W_{TL}$, $W_{TR}$ of the left and right driving wheels 14, 16 are calculated based on the target vehicle speed $V_T$ and the target-steering-angle reference value $\delta_{Trefl}$. At Step S3, respective target drive torques $M_{WL}$, $M_{WR}$ are calculated based on the respective target wheel speeds $W_{TL}$, $W_{TR}$ and respective actual wheel speeds $W_{CL}$, $W_{CR}$, and are outputted.

When the vehicle runs straight, the respective target wheel speeds $W_{TL}$, $W_{TR}$ outputted by the target-wheel-speed calculating portion 352 are equal to each other. However, when the vehicle turns rightward, the target speed $W_{TR}$ of the right driving wheel 16 is lower than the target speed $W_{TL}$ of the left driving wheel 14; and when the vehicle turns leftward, the target speed $W_{TL}$ of the left driving wheel 14 is lower than the target speed $W_{TR}$ of the right driving wheel 16.

Thus, in the present embodiment, the driving-braking actuators 40, 42 are so controlled as to reach the target vehicle speed $V_T$ corresponding to the operation state of the grips 200. In addition, since the frontward and rearward rotations of the grips 200 that instruct acceleration and deceleration, respectively, can be detected separately from each other, the driving-braking actuators 40, 42 can be controlled according to the operator's intension.

As will be described later, in the present embodiment, the control of steering angle is started with a delay after the control of vehicle's posture is started. In this case, it is desirable that the control of difference of respective rotation speeds of the left and right driving wheels 14, 16 be performed while the steering wheel 12 is steered. Hence, the target-steering-angle reference value $\delta_{Trefl}$ inputted to the target-wheel-speed calculating portion 352 has a delay. Thus, as the steering wheel 12 is steered, a difference occurs to the respective rotation speeds of the left and right driving wheels 14, 16, which leads to improving the turning performance of the vehicle. In addition, since the respective rotation speeds of the two wheels 14, 16 differ from each other, the vehicle can turn along a small circle (i.e., can move with a small turning radius).

In the present embodiment, the target-vehicle-speed obtaining portion 362 of the control device 300 constitutes a target-vehicle-speed determining portion; the target-deceleration obtaining portion 366 of the control device 300 constitutes a target-deceleration determining portion; and the target-motor-torque calculating portion 354 and the target-wheel-speed calculating portion 352 of the control device 300 cooperate with each other to constitute a target-value-dependent driving-braking control portion. In addition, the motor control devices 324 cooperate with each other to constitute a driving-braking control device.

In the present embodiment, when the vehicle moves backward as well, a target vehicle speed is determined based on the rotation angle $\theta_{LON}$ ($\theta_R$) of the grips 200. However, it is possible that when the vehicle moves backward, a target vehicle speed be determined at a pre-set speed irrespective of the magnitude of the rotation angle $\theta_{LON}$.

Figure 19:
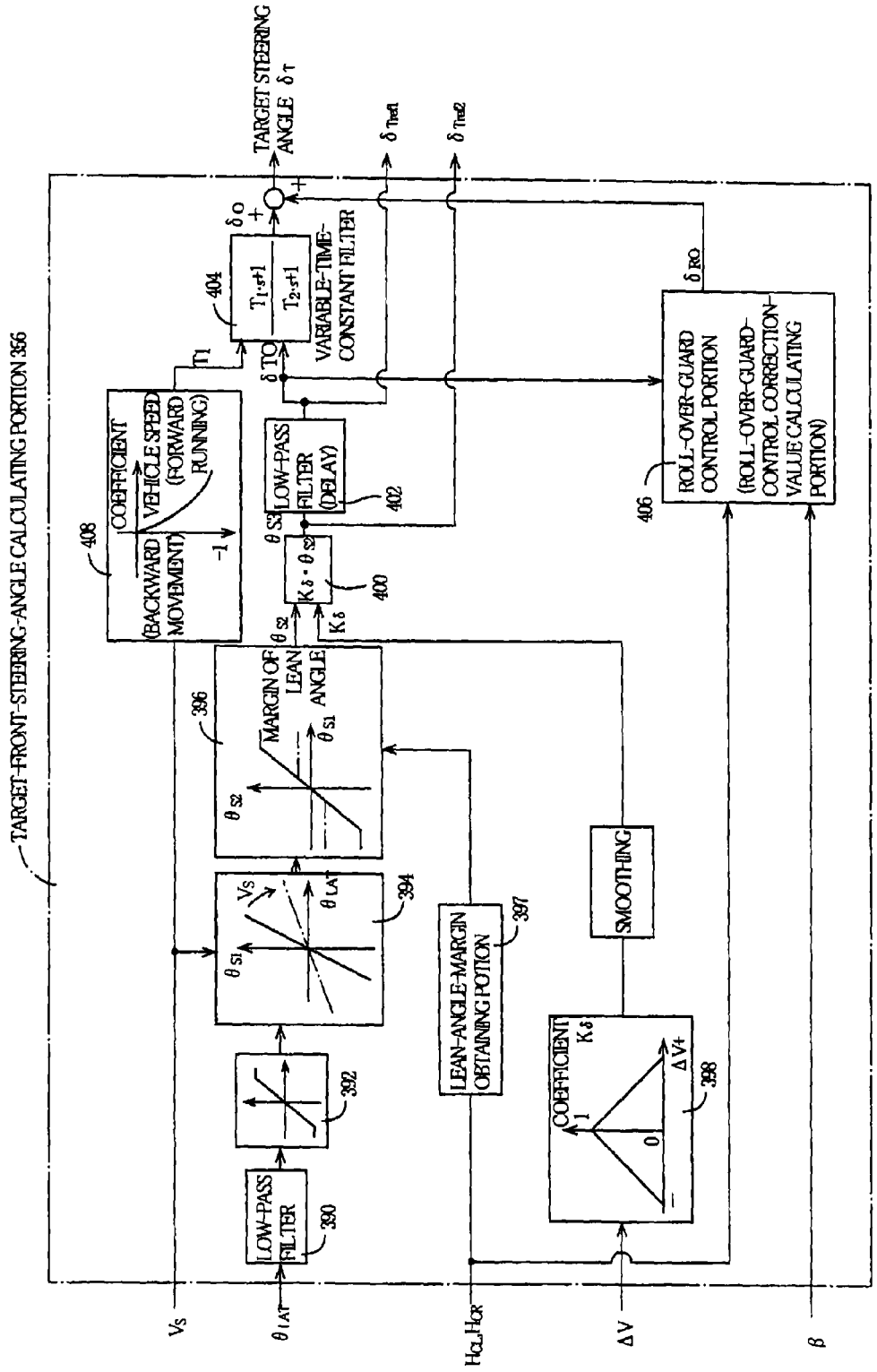
FIG. 19 is a view showing a target-front-steering-angle calculating portion of the control device.

As shown in FIG. 19, the target-front-steering-angle calculating portion 356 receives the actual vehicle speed $V_S$, the value $\theta_{LAT}$ (i.e., the rotation angle of the grips 200 with respect to the lateral direction) detected by the steering-instruction detecting portion 316, the vehicle-speed deviation $\Delta V$, the respective actual up-down strokes $H_{CL}$, $H_{CR}$ of the left and right driving wheels 14, 16, and the roll rate $\beta$ (i.e., the value detected by the corresponding sensor). The value $\theta_{LAT}$ detected by the steering-instruction detecting portion 316 is processed by a low-pass filter 390 and then is saturated by a processing portion 392.

Subsequently, a first target-steering-angle obtaining portion 394 obtains a target steering angle $\theta_{S1}$, based on the rotation angle $\theta_{LAT}$ and the actual vehicle speed $V_S$, such that the absolute value of the target steering angle $\theta_{S1}$ is greater when the absolute value of the rotation angle $\theta_{LAT}$ is great than when the absolute value of the rotation angle $\theta_{LAT}$ is small, and such that, on the assumption that the rotation angle $\theta_{LAT}$ does not change, the target steering angle $\theta_{S1}$ is smaller when the actual vehicle speed $V_S$ is high than when the actual vehicle speed $V_S$ is low.

Then, a processing portion 396 saturates the target steering angle $\theta_{S1}$, based on a margin of the left-right lean angle (i.e., respective margins of the up-down strokes), and outputs a target steering angle $\theta_{S2}$. Since the respective strokes of movement of the left and right wheels 14, 16 relative to the body 10 have the limits, the target steering angle $\theta_{S1}$ may be limited in advance, so that the left and right wheels 14, 16 may not be moved over those stroke limits in taking the posture corresponding to the target steering angle $\theta_{S1}$. The margin of the lean angle is obtained by a lean-angle-margin obtaining portion 397 based on the actual up-down strokes $H_{CL}$, $H_{CR}$ and pre-set limit values.

Thus, the target steering angle $\theta_T$ is determined within the limited movement ranges predetermined for the up-down moving devices 50, 52. More specifically described, when the up-down moving devices 50, 52 cannot be controlled to take the lateral-direction posture corresponding to the target steering angle $\theta_{S1}$ that has provisionally been determined, the absolute value of the provisional target steering angle $\theta_{S1}$ is decreased. Thus, the steering angle and the lateral-direction posture can appropriately correspond to each other, which leads to improving the turning stability of the vehicle. In view of this, this control can be said as a feed-forward control.

Meanwhile, a coefficient calculating portion 398 calculates a coefficient, $K_\delta$, based on the vehicle-speed deviation $\Delta V$. The coefficient $K_\delta$ is smaller when the absolute value of the deviation $\Delta V$ is great than when the absolute value of the deviation $\Delta V$ is small; and when the absolute value of the deviation $\Delta V$ is zero, the coefficient $K_\delta$ is equal to one. A multiplying portion 400 multiplies, by the coefficient $K_\delta$, the target steering angle $\theta_{S2}$ outputted by the processing portion 396.

As described above, a greater driving or braking force is applied to the wheels 14, 16 when the absolute value of the vehicle-speed deviation $\Delta V$ is great than when it is small. Therefore, the absolute value of the pitch angle $\delta_{pit}$ is increased in controlling the posture with respect to the front-rear direction. On the other hand, it is not desirable that when the vehicle is turning, the absolute value of the inclination angle with respect to the front-rear direction be increased. Hence, on the assumption that the input (i.e., the target steering angle $\theta_{S2}$) to the multiplying portion 400 does not change, an output (i.e., a target steering angle $\theta_{S3}$) from the multiplying portion 400 is made smaller when the absolute value of the deviation ΔV is great than when it is small, which leads to improving the running stability of the vehicle.

The signal (i.e., target steering angle) $\theta_{S3}$ outputted from the multiplying portion 400 is supplied via a low-pass filter 402 to a processing portion 404. Since the low-pass filter 402 produces a large delay, the target steering angle $\delta_T$ is outputted with a delay after the operation or rotation of the grips 200 by the angle $\theta_{LAT}$ about the respective first axis lines D1. Consequently the steering wheel 12 is steered with a delay after the operation or rotation of the grips 200.

The signal $\theta_{S3}$ outputted from the multiplying portion 400 is also outputted as it is as the target-steering-angle reference value $\delta_{Tref2}$; and a signal, $\delta_{TO}$, outputted from the low-pass filter 402 is also outputted as it is as the target-steering-angle reference value $\delta_{Tref1}$. Thus, the target-steering-angle reference value $\delta_{Tref1}$ has the large delay, whereas the target-steering-angle reference value $\delta_{Tref2}$ has a small delay. As described above, the target-steering-angle reference value $\delta_{Tref1}$ is supplied to the target-wheel-speed calculating portion 352; and the target-steering-angle reference value $\delta_{Tref2}$ is supplied to the target-up-down-stroke calculating portion 358.

Meanwhile, a coefficient obtaining portion 408 obtains a coefficient based on the actual vehicle speed $V_S$. This coefficient falls within a range of from 0 to −1. In the case where the vehicle runs forward, the absolute value of this coefficient is greater when the actual vehicle speed $V_S$ is high than when the speed $V_S$ is low; and in the case where the vehicle moves backward, this coefficient is kept at zero. This coefficient is used as a time constant, $T_1$, that is used in obtaining a target steering angle when an opposite-direction steering is carried out.

A processing portion 404 processes, using a transfer function, $T_1(s)/T_2(s)$, the input value $\delta_{TO}$ (i.e., the signal outputted from the low-pass filter 402). This transfer function is expressed as $(T_1 \cdot s+1)/(T_2 \cdot s+1)$, and the time constant $T_1$ is variable.

If a differential value, s, of the target steering angle $\delta_{TO}$ (s=d$\delta_{TO}$/dt) is equal to zero, the input value (i.e., the target steering angle $\delta_{TO}$) is outputted as it is. However, if the differential value s is not equal to zero, a value ($\delta_O$) determined based on the differential value and the input value is outputted.

Figure 33:
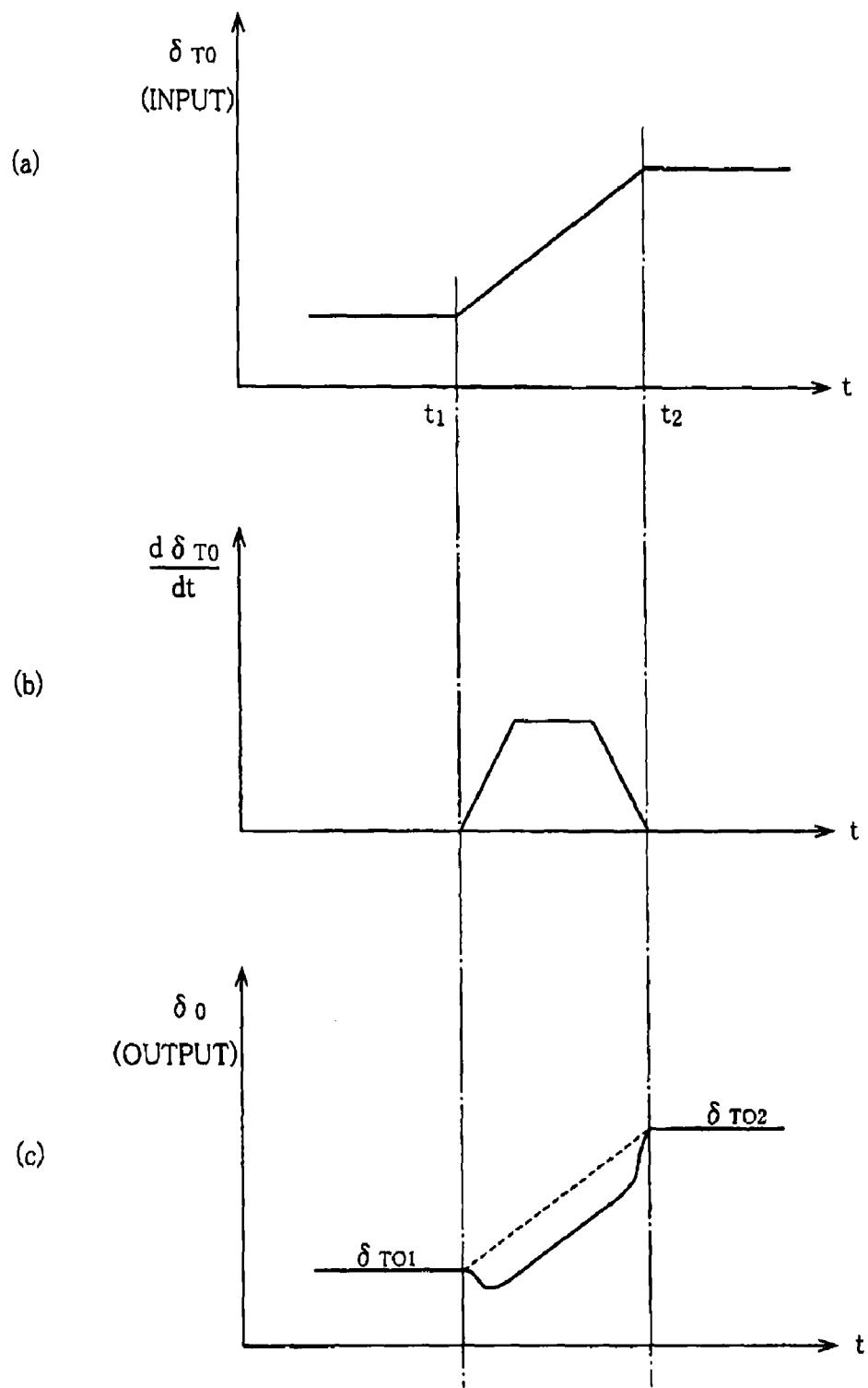
FIGS. 33(a), 33(b), and 33(c) are views showing changes of a target steering angle in the vehicle.
Figure 34:
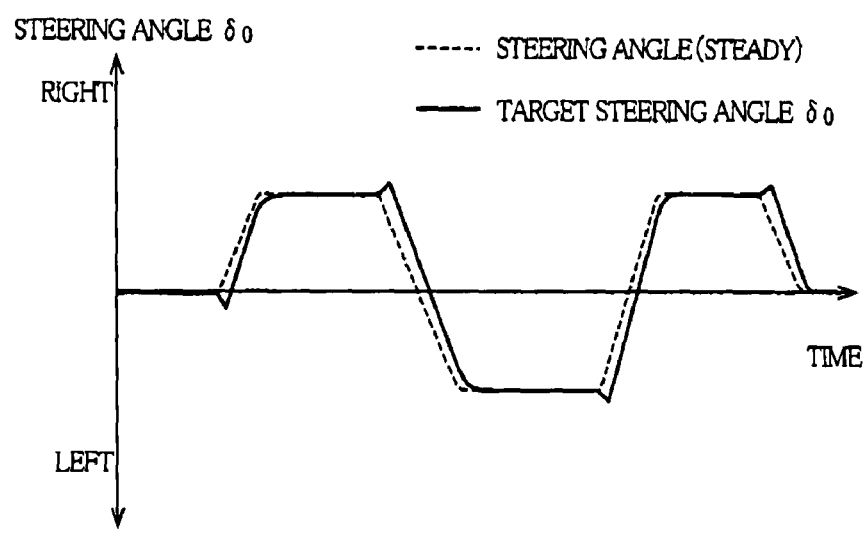
FIG. 34 is a view showing a manner in which the target steering angle changes.

In the case where the input value (i.e., the target steering angle $\delta_{TO}$) supplied to the processing portion 404 is changed by the operation or rotation of the grips 200 during a time period between time t1 and time t2, as shown in FIG. 33(a), the differential value s of the target steering angle δTO is equal to zero before time t1 and after time 2, but is changed during the time period between time t1 and time t2, as shown in FIG. 33(b), such that the differential value s is first increased, subsequently kept constant, and then decreased. Consequently the values $\delta_O$ outputted by the processing portion 404 are changed as shown in FIG. 33(c). As the differential value s is increased, a deviation of the output value from the input value is increased; and when the differential value s is constant, the deviation of the output value from the input value is also constant. Then, as the differential value s is decreased, the output value gradually approaches the input value. FIG. 34 shows an example of a time-wise change of the output value (i.e., the target steering angle $\delta_O$).

Thus, in the present embodiment, in a transitional state in which the target steering angle $\delta_{TO}$ is changed (i.e., the two grips 200 are rotated about the respective first axis lines D1 and accordingly the rotation angle $\theta_{LAT}$ is changed), the target steering angle $\delta_O$ is first changed in a direction opposite to the direction of changing of the target steering angle $\delta_{TO}$, and subsequently is kept at a constant value (i.e., a value, $\delta_{TO2}$, after the changing, shown in FIG. 33(c)). Since the steering wheel 12 is steered in the direction opposite to the direction corresponding to the direction of operation of the grips 200 (i.e., the direction of changing of the target steering angle so), a roll moment is produced by a reaction force against a lateral force applied to a tire of the wheel 12. However, this roll moment can be utilized to incline reliably and quickly the body 10 in a radially inward direction of its turning circle after the changing (i.e., in a radially outward direction of a turning circle when the steering wheel 12 is steered in the opposite direction). Thus, the vehicle can run even in a slalom mode or can turn quickly.

A centrifugal force applied to the body 10 is greater when the vehicle speed V is high than when the vehicle speed V is low. Thus, a force against the inclination of the body 10 in the radially inward direction of its turning circle is greater when the vehicle speed V is high than when the vehicle speed V is low. However, in the present embodiment, the angle of steering in the opposite direction is made greater when the vehicle speed V is high than when the vehicle speed V is low. Therefore, even if the vehicle speed V may be high, the body 10 can be reliably inclined in the radially inward direction of its turning circle.

In addition, the angle of steering in the opposite direction is made greater when the absolute value of the differential value of the target steering angle $\delta_{TO}$ (i.e., the speed of operation of the grips 200 about the respective first axis lines D1, or the speed of change of the rotation angle $\theta_{LAT}$) is great than it is small. Therefore, when the speed of operation of the grips 200 is high, the body 10 can be quickly inclined in the radially inward direction of its turning circle. Thus, the operator's request can be quickly satisfied.

When the change of the target drive torque $M_8$ is considerably small, the rotation of the steering motor 32 does not substantially change because of the inertia of the motor 32. When the differential value is small and the angle of steering in the opposite direction is small, the change of the target drive torque $M_8$ is small. Thus, the operation state of the steering motor 32 does not change, and the opposite-direction steering does not occur. In short, if the speed of operation or rotation of the grips 200 about the respective first axis lines D1 is lower than a pre-set value, then the steering wheel 12 is not steered in the direction opposite to the direction corresponding to the operation of the grips 200; and if the operation speed is not lower than the pre-set value, then the wheel 12 is steered in the opposite direction.

Meanwhile, a roll-over-guard control portion (i.e., a roll-over-guard-control correction-value calculating portion) 406 receives the actual roll rate (i.e., the value detected by the corresponding sensor) β, the respective actual up-down strokes $H_{CL}$, $H_{CR}$ of the left and right rear wheels 14, 16, and the target steering angle $\delta_{TO}$ as the value processed by the low-pass filter 402, and outputs a roll-over-guard-control correction value, $\delta_{RO}$.

The roll-over guard control is started when it is judged that the vehicle is in a roll-over state, and is ended when the roll-over state has ended or when the roll-over guard control is not needed any longer. When the left-right-direction or front-rear-direction lean angle is limited, the vehicle may be brought into the roll-over state. The roll-over guard control is performed by making smaller the absolute value of the steering angle of the steering wheel 12.

The roll-over guard control will be described by reference to the flow chart shown in FIG. 24.

At Step S21, it is judged whether a roll-over-guard-control flag is set. If the roll-over-guard-control flag is reset, the control goes to Step S22 to estimate a roll rate, β', based on respective speeds of change of the respective actual up-down strokes $H_{CL}$, $H_{CR}$ of the left and right driving wheels 14, 16; and at Step S23, the estimated roll rate β' obtained at Step S22 is compared with the value β actually detected by the roll sensor 332. If the two roll rates β, β' have different signs (i.e., the two roll rates β, β' have different directions), or if the absolute value of $β_s$, difference of the two roll rates β, β is greater than a pre-set value, $β_s$, it is judged that the vehicle is in the roll-over state (that is, it is judged that a roller-over-guard-control starting condition has been met).

$$β'×β<0$$

or $$|β'-β|>β_s$$

At Step S24, the roll-over-guard-control flag is set and the roll values are reset. Then, Step S25 and the following steps are carried out.

At Step S25, an actual roll angle is detected and, at Step S26, a roll-over-guard control amount, $δ_{ROS}$, is calculated based on the actual roll angle. The absolute value of the roll-over-guard control amount $δ_{ROS}$ is greater when the roll amount is great than when it is small.

At Step S27, the roll-over-guard control amount $δ_{ROS}$ is corrected based on the target steering angle $δ_{TO}$, i.e., an avoidance steering instructed by the operator. If the absolute value of the change amount $Δδ_{TO}$ of the target steering angle $δ_{TO}$ (this change amount $Δδ_{TO}$ is determined based on a value obtained by subtracting, from the current target steering angle $δ_{TO(n)}$, the target steering angle $δ_r$ at the time when the roll-over state was detected) is smaller than the absolute value of the roll-over-guard control amount $δ_{ROS}$, the avoidance steering instructed by the operator is insufficient, i.e., cannot avoid the roll-over state. Therefore, an amount of shortage of the avoidance steering is outputted as the roll-over-guard-control correction amount $δ_{RO}$.

$$Δδ_{TO} \leftarrow δ_{TO(n)} - δ_r$$

$$|Δδ_{TO}| < |δ_{ROS}|$$

$$δ_{RO} \leftarrow δ_{ROS} - Δδ_{TO}$$

On the other hand, if the avoidance steering is not instructed by the operator (i.e., if the current target steering angle $δ_{TO(n)}$ is equal to the target steering angle $δ_r$ at the time when the roll-over state was detected), the roll-over-guard control amount $δ_{ROS}$ is outputted, as it is, as the roll-over-guard-control correction amount $δ_{RO}$.

$$Δδ_{TO}=0$$

$$δ_{RO} \leftarrow δROS$$

In the current state, the roll-over-guard-control flag has been set. Therefore, the control goes to Step S29 to judge whether an ending condition has been met. If a negative judgment is made at Step S29, the control goes to Steps S25 through S28. On the other hand, if a positive judgment is made at Step S29, the control goes to Step S30 to reset the roll-over-guard-control flag and change the roll-over-guard control-correction amount $δ_{RO}$ to zero.

$$δ_{RO} \leftarrow 0$$

If the absolute value of the change amount $Δδ_{TO}$ of the steering angle $δ_{TO}$ by the operator is not smaller than the absolute value of the roll-over-guard control amount $δ_{ROS}$ (i.e., $|Δδ_{TO}| \geq |δ_{ROS}|$), then the roll-over-guard control is ended, because the roll-over state is restrained by the avoidance steering instructed by the operator. However, the operator may have operated the grips 200 so as to turn or steer back the vehicle. In the latter case, it is desirable to perform the steering control according to the operator's intension and not to perform the roll-over-guard control. Alternatively, the roll-over-guard control is ended if the absolute value of the roll rate falls within a pre-set range and accordingly it can be estimated that the roll-over state is over.

On the other hand, if it is judged at Step S23 that the roller-over-guard-control starting condition has not been met, the control goes to Step S31 to change the roll-over-guard-control correction amount δRO to zero.

Figure 35:
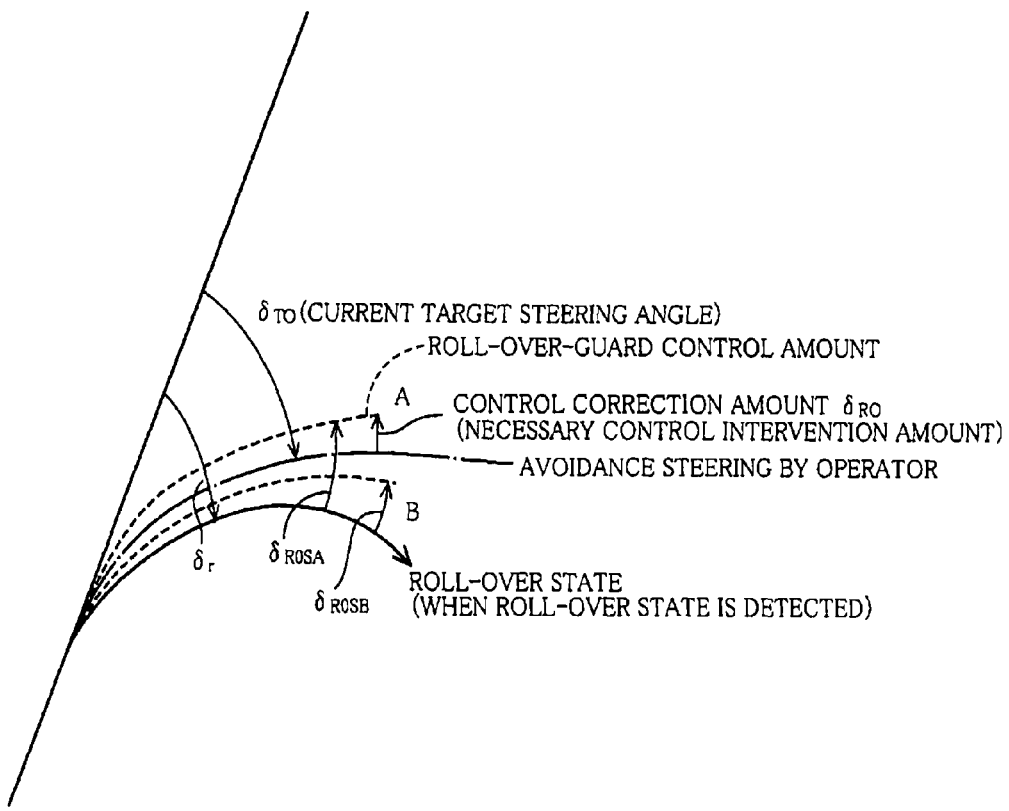
FIG. 35 is a view showing a manner in which the vehicle turns in the case where a roll-over-guard control is performed in the vehicle.

In the case where the vehicle is turning on a locus indicated by a solid line in FIG. 35, if the vehicle is brought into the roll-over state but the operator does not perform steering to correct the roll-over state, the roll-over-guard control portion 406 outputs the roll-over-guard control amount $δ_{ROS}$ as the roll-over-guard-control correction amount $δ_{RO}$.

If the operator does not perform the correcting steering, it is judged whether the operator's avoidance steering can restrain the roll-over state. In a case "A" in which the roll-over state cannot be restrained, an amount of shortage of the avoidance steering is outputted as the roll-over-guard-control correction amount $δ_{RO}$. On the other hand, in a case "B" in which the roll-over state can be restrained by the operator's avoidance steering, it is judged that the control ending condition has been met, and the roll-over-guard-control correction amount $δ_{RO}$ is selected at zero.

Thus, in the case where the roll-over state is detected, a sum of the target steering angle $δ_0$ outputted by the processing portion 404 and the roll-over-guard-control correction amount $δ_{RO}$ (the absolute value of this sum is smaller than the target steering angle $δ_0$ by the roll-over-guard-control correction amount $δ_{RO}$) is outputted as the target steering angle $δ_T$.

$$δ_T \leftarrow δ_0 + δ_{RO}$$

where $δ_0$ and $δ_{RO}$ have different signs.

Thus, the absolute value of the steering angle is decreased (i.e., the vehicle is steered back) and accordingly the roll-over state is restrained.

Meanwhile, as shown in FIG. 33(c), even if the vehicle may be in the roll-over state, the processing portion 404 outputs, when the grips 200 are operated, the opposite-direction target steering angle $δ_0$ corresponding to the speed of operation of the grips 200. That is, even if the operator may perform the avoidance steering, the processing portion 404 outputs the target steering angle $δ_0$ to steer the vehicle in the opposite direction. However, it is not desirable to steer, in the roll-over state, the vehicle in the opposite direction.

Hence, in the present embodiment, when the vehicle is in the roll-over state, the roll-over-guard-control correction amount $δ_{RO}$ to decrease the absolute value of the target steering angle $δ_{TO}$ is outputted. Therefore, owing to the correction amount $δ_{RO}$, the steering in the opposite direction is not performed.

In addition, even if the operator may operate or rotate the grips 200 to steer back the vehicle, the steering in the opposite direction is not performed because the roll-over-guard-control correction amount $δ_{RO}$ to decrease the absolute value of the target steering angle $δ_{TO}$ is outputted. Even in this case, however, if the absolute value of the change amount $Δδ_{TO}$ of the target steering angle $δ_{TO}$ by the operator becomes not smaller than the absolute value of the roll-over-guard control amount $δ_{ROS}$, then the roll-over-guard control is ended. Thus, the target steering angle $\delta_T$ is determined, and the steering wheel 12 is steered, according to the operator's operation of the grips 200.

When the vehicle is not in the roll-over state, the roll-over-guard control portion 406 outputs the roll-over-guard-control correction amount $\delta_{RO}$ that is equal to zero. Therefore, the opposite-direction steering is performed.

Figure 24:
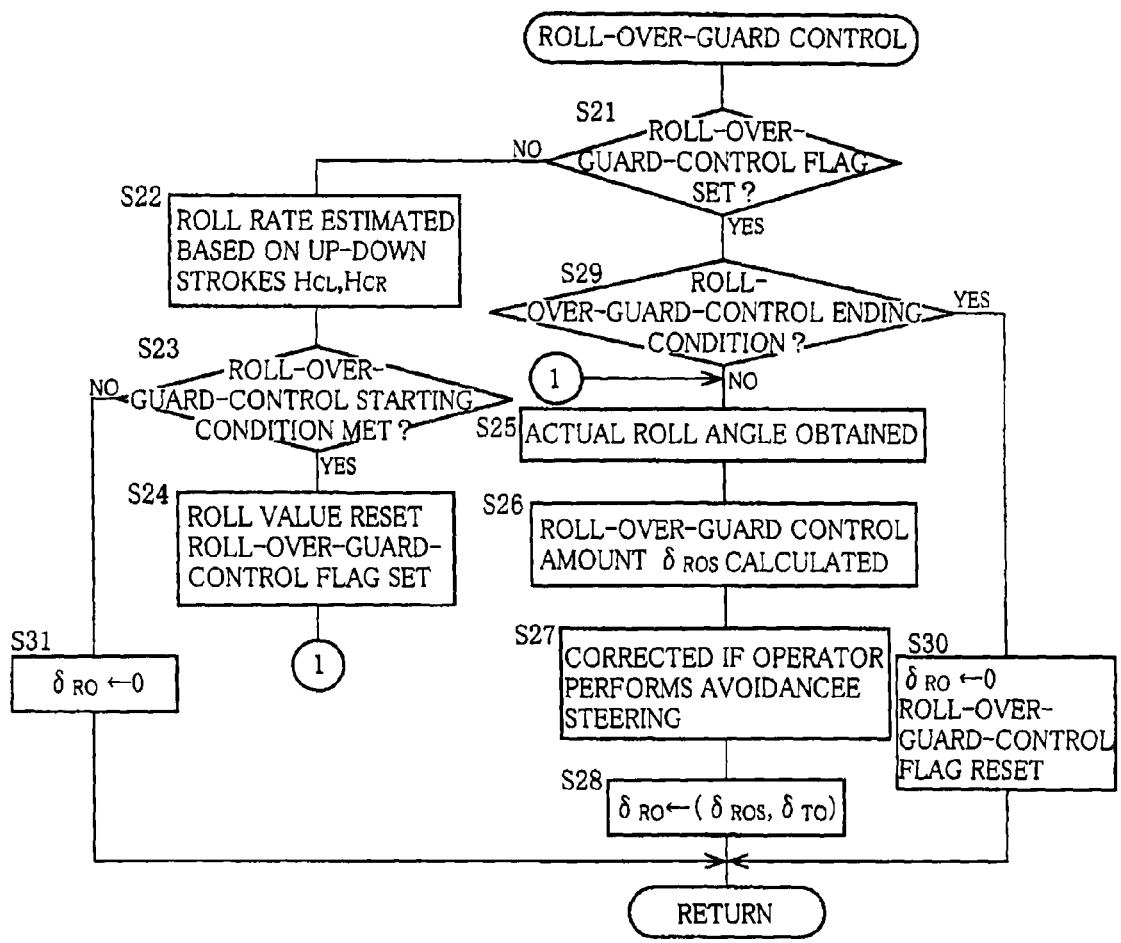
FIG. 24 is a flow chart representing a roll-over-guard-control-correction-amount calculating program that is stored in the storing portion.

In the present embodiment, the target-front-steering-angle calculating portion 356, the target-motor-torque calculating portion 354, a portion of the storing portion 304 that stores the roll-over-guard control program represented by the flow chart of FIG. 24, and the implementing portion 302 cooperate with each other to constitute a steering control device. This steering control device also functions as a steering-operation-dependent steering control portion. In particular, the processing portions 404, 410 and the target-motor-torque calculating portion 354 cooperate with each other to constitute an opposite-direction steering portion; and the processing portions 404, 410 cooperate with each other to constitute an opposite-direction steering-angle determining portion. In addition, the low-pass filter 402 and the target-motor-torque calculating portion 354 cooperate with each other to constitute an after-posture-control steering control portion.

Figure 20:
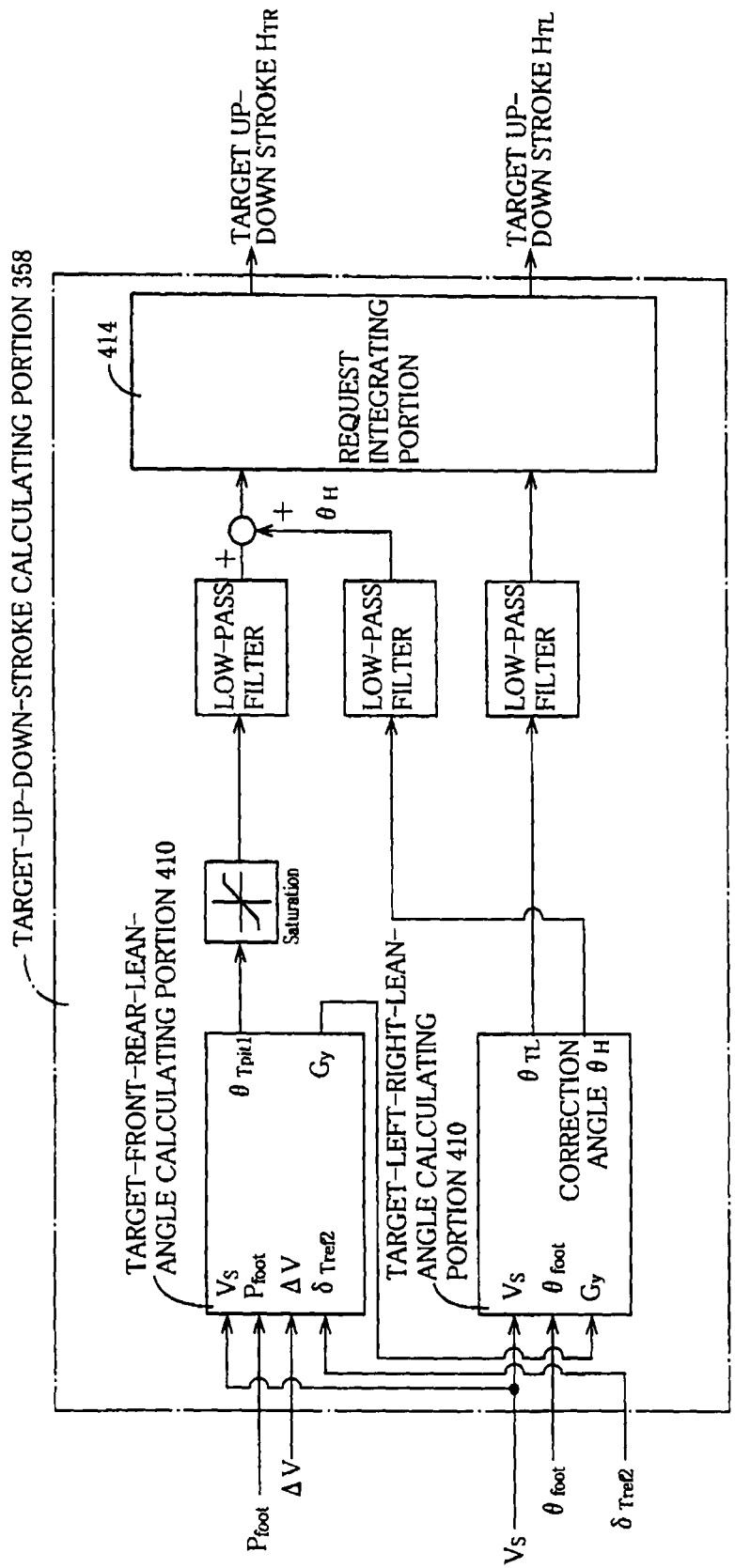
FIG. 20 is a view showing a target-up-down-stroke calculating portion of the control device.

As shown in FIG. 20, the target-up-down-stroke calculating portion 358 receives the values $\theta_{foot}$, $P_{foot}$ detected by the pedal-operation detecting device 312, the vehicle-speed deviation $\Delta V$, the actual vehicle speed $V_S$, and the target-steering-angle reference value $\delta_{Tref2}$, and outputs the respective target up-down strokes $H_{TL}$, $H_{TR}$ of the left and right driving wheels 14, 16.

A target-pitch-angle (target-front-rear-lean-angle) calculating portion 410 calculates, based on the foot force $P_{foot}$, the vehicle-speed deviation $\Delta V$, the actual vehicle speed $V_S$, and the target-steering-angle reference value $\delta_{Tref2}$, a target front-rear lean angle $\theta_{Tpit1}$ and a lateral acceleration, G (Gy); and a target-left-right-lean-angle calculating portion 412 calculates, based on the lateral acceleration Gy, the actual vehicle speed $V_S$, and the pedal pivot angle $\theta_{foot}$, a target left-right lean angle $\theta_{TL}$ and a correction angle $\theta_H$. The correction angle $\theta_H$ is added to the target front-rear lean angle $\theta T_{pit1}$ to provide a target front-rear lean angle $\theta_{Tpit}$, which is inputted to a request integrating portion 414 that calculates, based on the target front-rear lean angle $\theta_{Tpit}$ and the target left-right lean angle $\theta_{TL}$, respective target up-down strokes $H_{TL}$, $H_{TR}$ of the left and right driving wheels 14, 16.

Figure 21:
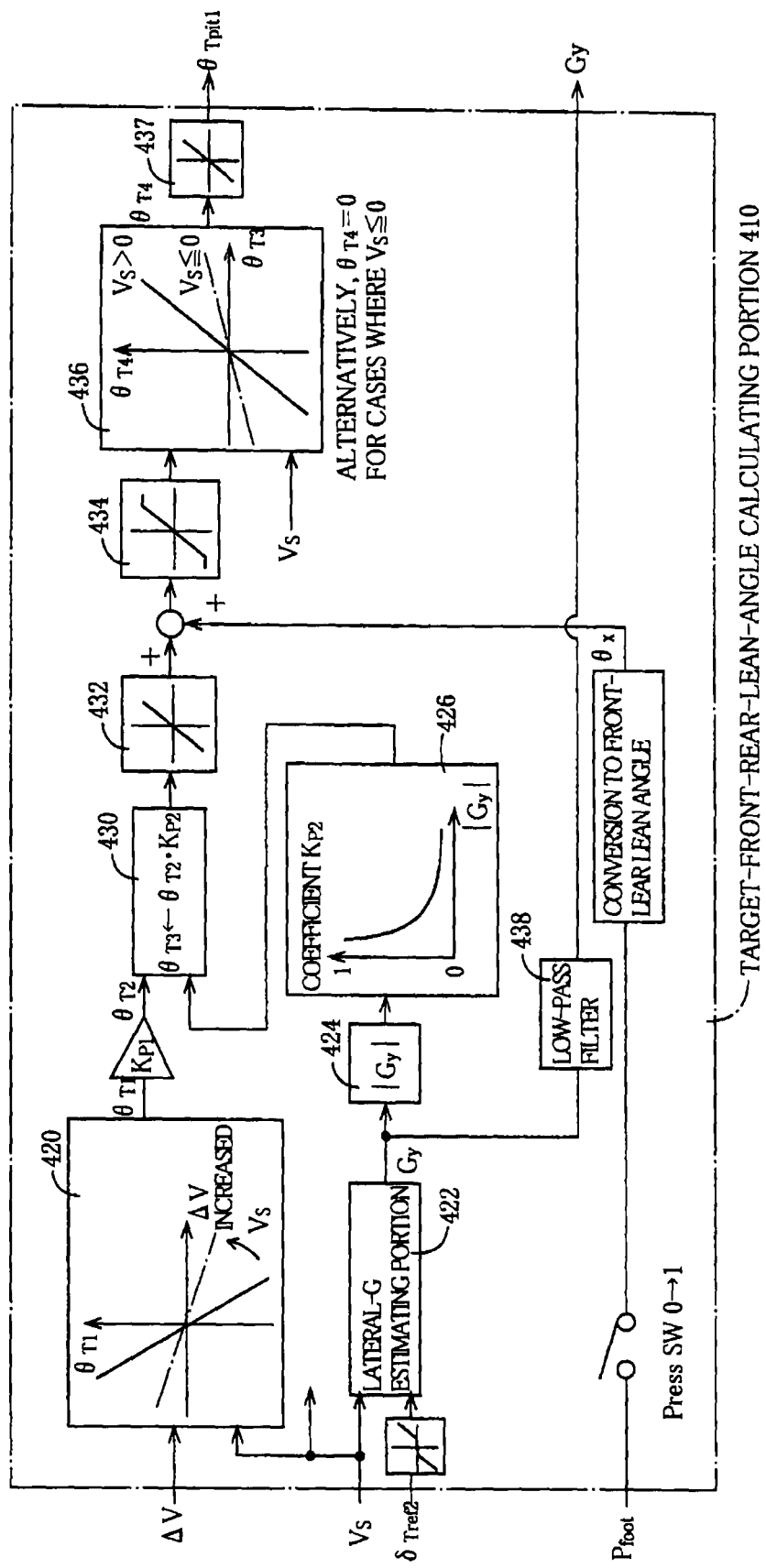
FIG. 21 is a view showing a target-front-rear-lean-angle calculating portion of the control device.

As shown in FIG. 21, the target-front-rear-lean-angle calculating portion 410 includes a processing portion 420 that calculates, based on the vehicle-speed deviation $\Delta V$ and the actual vehicle speed $V_S$, a target pitch angle $\theta_{T1}$.

In the case where the vehicle-speed deviation $\Delta V$ is positive, the vehicle is driven or accelerated and accordingly leans rearward. Therefore, the target pitch angle $\theta_{T1}$ is made negative ($\theta_{T1} < 0$) and accordingly the left and right wheels 14, 16 are moved to the rebound side relative to the body 10. The absolute value of the target pitch (lean) angle $\theta_{T1}$ is increased as the vehicle-speed deviation $\Delta V$ is increased, because the inertia force increases as the acceleration increases.

On the other hand, in the case where the vehicle-speed deviation $\Delta V$ is negative, the vehicle is braked or decelerated and accordingly leans frontward. Therefore, the target pitch angle $\theta_{T1}$ is made positive ($\theta_{T1} > 0$) and accordingly the left and right wheels 14, 16 are moved to the bound side relative to the body 10. The target pitch (lean) angle $\theta_{T1}$ is increased as the absolute value of the vehicle-speed deviation $\Delta V$ is increased.

In either case, the absolute value of the target pitch (lean) angle $\theta_{T1}$ is decreased as the actual vehicle speed $V_S$ is increased, because it is not desirable that when the vehicle speed $V_S$ is high, the front-rear-direction lean angle be increased.

The thus obtained lean angle $\theta_{T1}$ is multiplied by a gain, $K_{p1}$.

$$\theta_{T2} \leftarrow \theta_{T1} \cdot K_{p1}$$

As described above by reference to FIG. 2, the gravity center G of the present vehicle is located on the vertical line passing through the gravity center of the triangle connecting the respective ground-contact points of the three wheels 12, 14, 16 to each other. If the gravity center G is located inside an inscribed circle of the triangle, the vehicle is stable. Therefore, even if the gravity center G may be moved depending upon the running state of the vehicle, the vehicle is kept stable so long as the gravity center G remains inside the inscribed circle.

When the vehicle is accelerated, its gravity center G is moved rearward in its plan view. Therefore, if the target pitch angle $\theta_{Tpit}$ is made negative to move the gravity center G frontward, the amount of rearward movement of the center G can be decreased and accordingly the center G can be prevented from moving out of the inscribed circle.

Meanwhile, a lateral-G estimating portion 422 estimates, based on the actual vehicle speed $V_S$ and the target-steering-angle reference value $\delta_{Tref2}$, a lateral acceleration Gy. Before the reference value $\delta_{Tref2}$ is inputted to the lateral-G estimating portion 422, the reference value $\delta_{Tref2}$ is subjected to a processing step in which the value $\delta_{Tref2}$ whose absolute value is considerably small is changed to zero.

$$Gy \leftarrow f(\delta_{Tref2}, V_S)$$

The thus estimated lateral acceleration Gy is processed by an absolute-value obtaining portion 424 (i.e., an absolute value of the acceleration Gy is obtained); and a coefficient, $K_{p2}$, is obtained by a coefficient obtaining portion 426. The coefficient $K_{p2}$ falls within a range of from 0 to 1, and increases as the absolute value of the lateral acceleration Gy decreases. That is, the coefficient $K_{p2}$ approaches 1 as the absolute value approaches 0, and it approaches 0 as the absolute value increases. When the absolute value of the lateral acceleration Gy is great, that is, if the vehicle is turning and the turning radius is small or the running speed of the vehicle is high, it is desirable that the front-rear lean angle be small. Therefore, the coefficient $K_{p2}$ approaches 0 as the absolute value increases. Since this is true with both the leftward turning and the rightward turning, the absolute value of the lateral acceleration Gy is used.

Next, a processing portion 430 calculates, as a target front-rear lean angle $\theta_{T3}$, a product of the coefficient $K_{p2}$ and the target front-rear lean angle $\theta_{T2}$.

$$\theta_{T3} \leftarrow \theta_{T2} \cdot K_{p2}$$

A processing portion 432 limits a rate of change of the target front-rear lean angle $\theta_{T3}$ (if the absolute value of a difference of the previous and current values is too great, a pre-set rate of change is selected); a processing portion 434 saturates the thus processed lean angle $\theta_{T3}$; a processing portion 436 corrects the thus processed lean angle $\theta_{T3}$ based on the actual vehicle speed $V_S$, and outputs a target front-rear lean angle $\theta_{T4}$; and a processing portion 437 limits a rate of change of the lean angle $\theta_{T4}$, and outputs the thus processed lean angle $\theta_{T4}$ as a target front-rear lean angle $\theta_{Tpit1}$. In a particular case where the actual vehicle speed $V_S$ is very low and accordingly the vehicle can be regarded as being stopped, or where the vehicle is moving backward, it is less necessary to lean the vehicle in the frontward or rearward direction. Therefore, the target front-rear lean angle $\theta_{Tpit1}$ is selected at a very small value.

However, the target front-rear lean angle $\theta_{Tpit1}$ may be selected at zero in the case where the vehicle speed $V_S$ is not higher than a reference value at which the vehicle can be regarded as being stopped, or where the vehicle is moving backward.

Meanwhile, the lateral acceleration Gy estimated by the lateral-G estimating portion 422 is processed and then outputted by a low-pass filter 438, and subsequently is supplied to the target-left-right-lean-angle calculating portion 412.

The target-steering-angle reference value $\delta_{Tref2}$ contains the small delay as described above.

When the vehicle is in the comfort mode, a gain for the foot force $P_{foot}$ is equal to zero and accordingly the foot force $P_{foot}$ is not utilized.

On the other hand, when the vehicle is in the performance mode, the foot force $P_{foot}$ is multiplied by a gain equal to one so as to convert the force $P_{foot}$ into a front-rear lean angle $\theta_x$, which is added to the above-described front-rear lean angle $\theta_{T3}$. In the performance mode, the value of gain $K_{p1}$ is made smaller than the value of gain $K_{p1}$ used in the comfort mode. Each of the processing portions 434, 436, 437 that follow the processing portion 432 processes, in the above-described manner, the front-rear lean angle $\theta_{T3}$ obtained by taking the foot force $P_{foot}$ into account, and the processing portion 437 finally outputs the target front-rear lean angle $\theta_{Tpit1}$.

In short, in the comfort mode, if the vehicle-speed deviation $\Delta V$ is zero, the target front-rear lean angle $\theta_{Tpit1}$ is basically selected at zero; but in the performance mode, even if the vehicle-speed deviation $\Delta V$ may be zero, the target front-rear lean angle $\theta_{Tpit1}$ may be selected at a value different from zero, depending upon the foot force $P_{foot}$ applied to the pedals 24, 25 by the operator. In other words, the control of the posture of the vehicle with respect to the front-rear direction can be quickly performed.

In the performance mode, however, the target front-rear lean angle $\theta_{Tpit1}$ is not selected based on the foot force $P_{foot}$ only, but is selected based on the vehicle-speed deviation $\Delta V$ as well as the foot force $P_{foot}$. Therefore, the posture of the vehicle with respect to the front-rear direction can be appropriately controlled according to the operator's operation of the pedals 24, 25.

Figure 22:
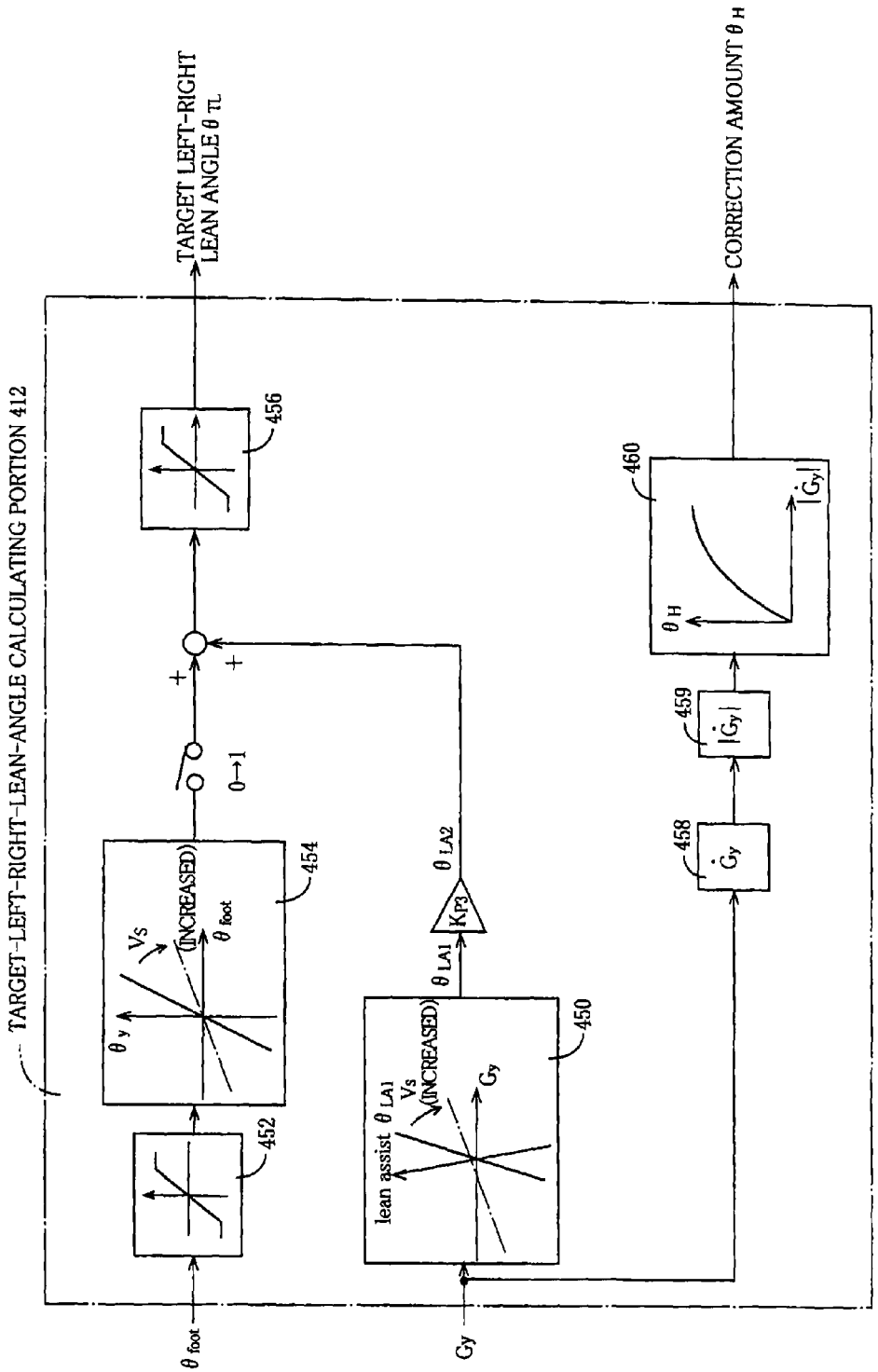
FIG. 22 is a view showing a target-left-right-lean-angle calculating portion of the control device.

As shown in FIG. 22, the left-right-lean-angle calculating portion 412 includes a processing portion 450 that obtains, based on the lateral acceleration Gy, an assist angle, $\theta_{LA1}$. The assist angle $\theta_{LA1}$ is multiplied by a gain, $K_{p3}$, to obtain an assist angle, $\theta_{LA2}$. If the absolute value of the lateral acceleration Gy is great and accordingly the centrifugal force is great, it is required that a centripetal force against the centrifugal force be great. Meanwhile, if the absolute value of the left-right lean angle (i.e., camber angle) of the left and right wheels 14, 16 is great, then the centripetal force (i.e., camber trust force) is also great. Therefore, the absolute value of the assist angle (i.e., target left-right lean angle) $\theta_{LA1}$ is made greater when the absolute value of the lateral acceleration Gy is great than when it is small. In addition, the target left-right lean angle $\theta_{LA1}$ is made smaller when the actual vehicle speed $V_S$ is high than when the speed $V_S$ is low.

If the left-right lean angle is increased, then the height position of the gravity center G of the vehicle can be lowered, and accordingly the position of the gravity center G can be moved toward the center of the turning circle.

$\theta_{LA2} \leftarrow K_{p3} \cdot \theta_{LA1}$

In the comfort mode, a gain for the pedal pivot angle $\theta_{foot}$ is selected at zero. Therefore, a processing portion 456 saturates the assist angle $\theta_{LA2}$, and the thus processed angle is outputted as the target left-right lean angle $\theta_{TL}$.

On the other hand, in the performance mode, after a processing portion 452 saturates the value $\theta_{foot}$ detected by the potentiometers 130, a processing portion 454 obtains, based on the pivot angle $\theta_{foot}$, a target left-right lean angle $\theta_y$. The absolute value of the target left-right lean angle $\theta_y$ is increased as the absolute value of the pivot angle $\theta_{foot}$ is increased, because the operator has an intension to lean the body 10 largely in the left-right direction when the pivot angle $\theta_{foot}$ is great. In addition, the absolute value of the target left-right lean angle $\theta_y$ is made smaller when the actual vehicle speed $V_S$ is high than when the speed $V_S$ is low. In this case, after the assist angle $\theta_{LA2}$ is added to the target left-right lean angle $\theta_y$ determined based on the pivot angle $\theta_{foot}$, the thus obtained value is saturated by the processing portion 456 and then is outputted as the target left-right lean angle $\theta_{TL}$.

In the performance mode, the gain $K_{p3}$ is selected at a value smaller than the value of gain $K_{p3}$ used in the comfort mode.

As shown in the plan view of FIG. 2, when the vehicle turns, for example, rightward, the gravity center G thereof is moved leftward because of the centrifugal force (i.e., the lateral acceleration Gy). In this case, if the body 10 is inclined rightward (toward the center of the turning circle), the gravity center G is moved rightward and can be prevented from being moved out of the inscribed circle of the triangle. In addition, the amount of leftward movement of the gravity center G can be decreased.

Meanwhile, a differential-value obtaining portion 458 obtains a differential value of the lateral acceleration Gy inputted to the target-left-right-lean-angle calculating portion 412; an absolute-value obtaining portion 459 obtains an absolute value of the differential value; and a processing portion 460 obtains a correction angle, OH, based on the absolute value of the differential value. The correction angle $\theta_H$ is made greater when the absolute value of the differential value of the lateral acceleration Gy is great than when it is small.

The target-left-right-lean-angle calculating portion 412 outputs the target left-right lean angle $\theta_{TL}$ and the correction angle $\theta_H$.

The correction angle $\theta_H$ is for compensating for the change of height position of the gravity center G caused by the control of the left-right lean angle. When the control of the left-right lean angle is performed, i.e., when the respective positions of the left and right wheels 14, 16 relative to the body 10 in the up-down direction are changed, an average height position of a rear portion of the body 10 is also changed. This change corresponds to the change of the front-rear lean angle. Therefore, it can be said that the correction angle $\theta_H$ is a portion of the front-rear lean angle. The correction angle $\theta_H$ is outputted in the case where the absolute value of the differential value of the lateral acceleration Gy is greater than zero, or where the absolute value is greater than a pre-set value (greater than zero), i.e., in the case where a steering operation is carried out (the direction of turning is changed and the posture of the vehicle with respect to the lateral direction is changed).

Figure 25:
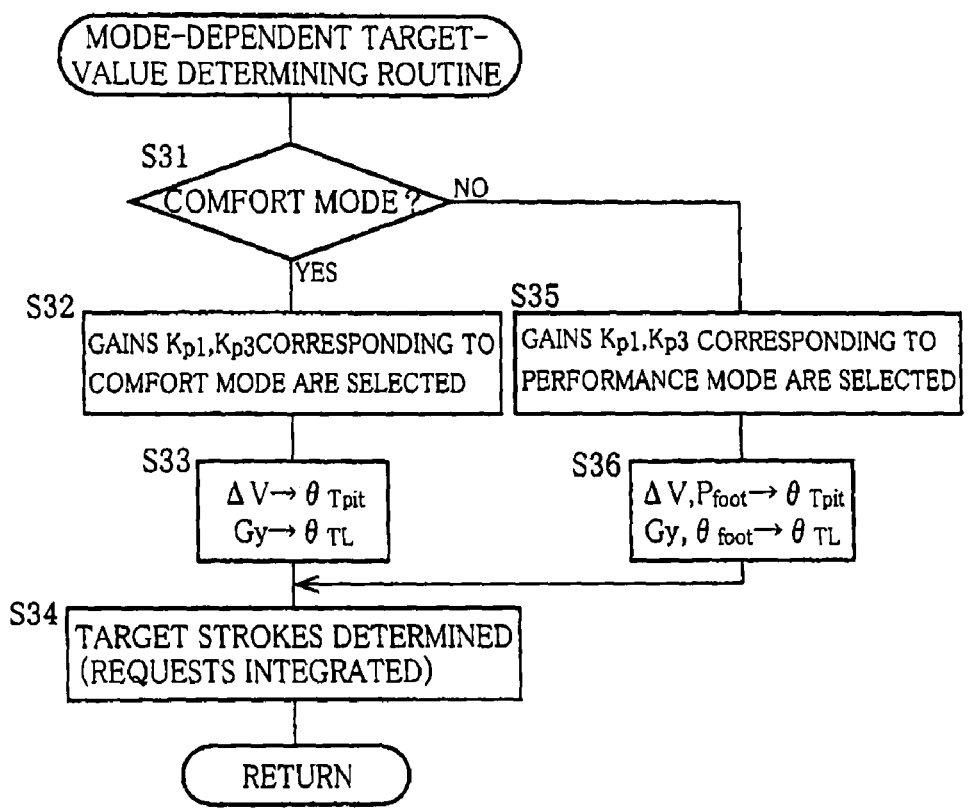
FIG. 25 is a flow chart representing a mode-dependent target-value determining program that is stored in the storing portion.

Next, there will be briefly described the operation of the vehicle when the comfort mode is selected, and the operation thereof when the performance mode is selected, by reference to the flow chart shown in FIG. 25. Each of the comfort mode and the performance mode is selected and established by the operator's operation of the mode switch 204.

At Step S31, it is judged whether the selected mode is the comfort mode or the performance mode. If the comfort mode has been selected, then the control goes to Step S32 to select the gains $K_{p1}$, $K_{p3}$ at respective values each corresponding to the comfort mode. Step S32 is followed by Step S33 to obtain a target front-rear lean angle $\theta_{Tpit}$ based on the vehicle-speed deviation $\Delta V$, and obtain a target left-right lean angle $\theta_{TL}$ based on the lateral acceleration Gy. Then, the control goes to Step S34 where the request integrating portion 414 determines target strokes $H_{TL}$, $H_{TR}$ of the left and right wheels 14, 16, which are outputted to the target-motor-torque calculating portion 354.

On the other hand, if the performance mode has been selected, then the control goes to Step S35 to select the gains $K_{p1}$, $K_{p3}$ at respective values that each correspond to the performance mode and are smaller than the respective values corresponding to the comfort mode. Step S35 is followed by Step S36 to obtain a target front-rear lean angle $\theta_{Tpit}$ based on the vehicle-speed deviation $\Delta V$ and the foot force $P_{foot}$, and obtain a target left-right lean angle $\theta_{TL}$ based on the lateral acceleration Gy and the pedal-pivot angle $\theta_{foot}$. Then, the control goes to Step S36 where the request integrating portion 414 determines target strokes $H_{TL}$, $H_{TR}$ of the left and right wheels 14, 16, which are outputted to the target-motor-torque calculating portion 354.

Thus, the present vehicle enables the operator to select the comfort mode or the performance mode, which improves the operability of the vehicle.

The present vehicle may be modified such that the operator can select respective desirable values of the gains $K_{p1}$, $K_{p3}$.

In addition, the vehicle may be modified such that when the performance mode is selected, the target left-right lean angle $\theta_{TL}$ and the target front-rear lean angle $\theta_{Tpit}$ are not determined based on the respective magnitudes of the pedal-pivot angle $\theta_{foot}$ and the foot force $P_{foot}$, but are selected at respective pre-set values in a manner in which the operation of the pedals 24, 25 is utilized as a trigger, and the detection of the pedal-pivot angle $\theta_{foot}$ is used as a signal to indicate that the operator has an intension to incline the body 10 in the left-right direction, or the detection of the foot force $P_{foot}$ is used as a signal to indicate that the operator has an intension to incline the body 10 in the front-rear direction. This is due to the fact that it may be somewhat difficult for the operator to adjust the respective magnitudes of the pedal pivot angle and the foot force by operating, with his or her feet, the pedals.

As shown in FIG. 20, the request integrating portion 414 receives the target left-right lean angle $\theta_{TL}$, and the target front-rear lean angle $\theta_{Tpit}$ as the sum of the target front-rear lean angle $\theta_{Tpit1}$ and the correction value OH.

The request adjusting potion 414 has a basic rule that respective target strokes (hereinafter, referred to as the pitch-related target strokes) $H_{TPR}$, $H_{TPL}$ are determined based on the target front-rear lean angle $\theta_{Tpit}$, respective target strokes (hereinafter, referred to as the lean-related target strokes) $H_{TLR}$, $H_{TLL}$ are determined based on the target front-rear lean angle $\theta_{TL}$, and a sum of the pitch-related target stroke $H_{TPR}$ and the corresponding lean-related target stroke $H_{TLR}$, and a sum of the pitch-related target stroke $H_{TPL}$ and the corresponding lean-related target stroke $H_{TLL}$ are outputted as respective target strokes $H_{TR}$, $H_{TL}$ of the left and right wheels 14, 16. Then, the target-motor-torque calculating portion 354 calculates, based on the target strokes $H_{TL}$, $H_{TR}$ and the actual strokes $H_{CL}$, $H_{CR}$, respective target torques $M_{TL}$, $M_{TR}$ of the left and right up-down moving motors 66, and outputs the thus calculated target torques $M_{TL}$, $M_{TR}$.

As shown in FIGS. 32(a) and 32(b), between the left-right lean angle $\theta_L$ and a stroke, H, of the wheels 14, 16, there is a relationship defined by the following expression:

$$\tan \theta_L = 2H/T$$

where T is the tread of the vehicle.

As described previously, when the vehicle turns rightward, a stroke $H_R$ of the wheels 14, 16 is positive and accordingly a value $\tan \theta_L$ and a left-right lean angle $\theta_L$ are also positive.

Likewise, between the front-rear lean angle $\theta_{pit}$ and the stroke H of the wheels 14, 16, there is a relationship defined by the following expression:

$$\tan \theta_{pit} = H/W$$

where W is the wheel base of the vehicle, and $H = H_R = H_L$. As described previously, when the left and right rear wheels 14, 16 are moved to the bound side relative to the body 10 (i.e., when the body 10 leans backward), a stroke H of the wheels 14, 16 is positive and accordingly a value $\tan \theta_{pit}$ and a front-rear lean angle $\theta_{pit}$ are also positive.

Therefore, according to the above-indicated expressions, a target stroke HT of the wheels 14, 16 can be obtained based on the target left-right lean angle $\theta_{TL}$ and the target front-rear lean angle $\theta_{Tpit}$.

Strictly described, the front-rear lean angle is influenced by the left-right lean angle. That is, if the wheels 14, 16 and the body 10 are inclined in the lateral direction, the respective contact points of the tires of the wheels 14, 16 on the ground are moved. In addition, if the body 10 is inclined in the lateral direction, the stroke H of the wheels 14, 16 is changed to the product ($H \cdot \cos \theta_L$) of the stroke H and a value, $\cos \theta_L$. If those facts are taken into account, then the pitch-related target strokes can be corrected based on the left-right lean angle $\theta_L$. However, it is not essentially required that the pitch-related target strokes be corrected.

In the following description of the present specification, "the strokes obtained based on the front-rear lean angle" may mean either the strokes obtained while the left-right lean angle is taken into account, or the strokes obtained while the left-right lean angle is not taken into account.

In either case, if the sum $H_{STL}$ of the pitch-related target stroke $H_{TPL}$ and the lean-related target stroke $H_{TLL}$, and the sum $H_{STR}$ of the pitch-related target stroke $H_{TPR}$ and the lean-related target stroke $H_{TLR}$ are within the respective stroke limits of the left and right up-down moving devices 50, 52, the sums $H_{STL}$, $H_{STR}$ are outputted as the respective target strokes $H_{TL}$, $H_{TR}$. On the other hand, if the sums $H_{STL}$, $H_{STR}$ are beyond the respective stroke limits of the up-down moving devices 50, 52, a request corresponding to the target left-right lean angle $\theta_{TL}$ and a request corresponding to the target front-rear lean angle $\theta_{Tpit}$ are integrated, and respective target strokes $H_{TL}$, $H_{TR}$ are obtained and outputted based on the integrated request.

As described previously, in the present embodiment, the posture control is performed prior to the steering control. That is, when the grips 200 are operated by being rotated about the respective first axis lines D1, the body 10 is inclined radially inward of a turning circle. For example, when the grips 200 are rotated leftward to instruct the vehicle to turn leftward, the body 10 is inclined leftward (i.e., radially inward of a turning circle). Since the direction of operation of the grips 200 is the same as the direction of inclination of the body 10 (or the operator), the operator's feeling of operation of the grips 200 is improved and accordingly the operator's feeling of riding on the vehicle is improved. In addition, since the posture control is performed prior to the steering control, the running stability and turning performance of the vehicle are improved.

In addition, as described previously, upon commencement of the operation or rotation of the grips 200, the steering wheel 12 is steered in the opposite direction. That is, during the control of inclination of the body 10 in the radially inward direction of the turning circle, the steering wheel 12 is steered in the opposite direction. Therefore, the body 10 can be quickly and reliably inclined radially inward of the turning circle, owing to the posture control and a roll moment caused by the steering of the wheel 12 in the opposite direction.

In the case where braking and turning simultaneously occur, pitch-related target strokes determined based on the front-rear lean angle corresponding to the braking have priority; and in the case where driving and turning simultaneously occur, lean-related target strokes based on the left-right lean angle corresponding to the turning have priority.

Figure 26A:
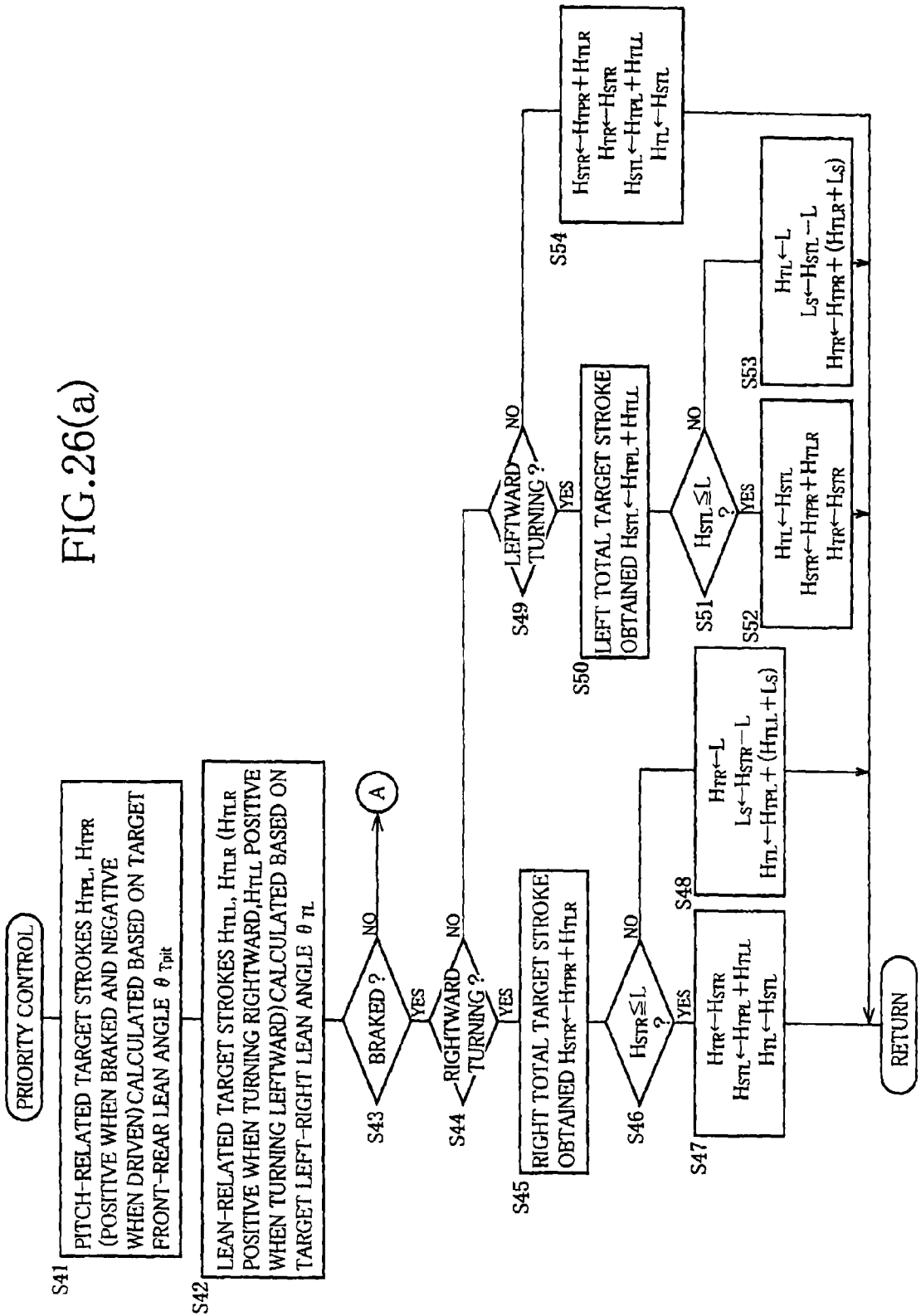
FIG. 26(a) is a portion of a flow chart representing a priority-dependent control program that is stored in the storing portion.

At Step S41 shown in FIG. 26(a), respective pitch-related target strokes ($H_{TPL}$, $H_{TPR}$) of the left and right driving wheels 14, 16 are calculated based on the target front-rear lean angle; and at Step S42, respective lean-related target strokes ($H_{TLL}$, $H_{TLR}$) of the left and right driving wheels 14, 16 are calculated based on the target left-right lean angle.

At Step S41, when the vehicle is being braked, the pitch-related target strokes are positive (i.e., on the bound side); and when the vehicle is being driven, the pitch-related target strokes are negative (i.e., on the rebound side).

At Step S42, when the vehicle turns rightward, the lean-related target stroke of the right driving wheel 16 is positive and the lean-related target stroke of the left driving wheel 14 is negative; and when the vehicle turns leftward, the lean-related target stroke of the right driving wheel 16 is negative and the lean-related target stroke of the left driving wheel 14 is positive.

At Step S43, it is judged whether the vehicle is being braked; and at Step S43, it is judged whether the vehicle is turning rightward. If the vehicle is being braked and is turning rightward, the control goes to Step S45 to obtain, for the right driving wheel 16, a sum of the pitch-related target stroke $H_{TPR}$ and the lean-related target stroke $H_{TLR}$ (hereinafter, referred to as a total target stroke, $H_{STR}$: $H_{STR} \leftarrow H_{TPR}+H_{TLR}$). At Step S46, it is judged whether the total target stroke $H_{STR}$ is not greater than a stroke limit, L (>0), of the up-down moving devices 50, 52. In the case where the vehicle is being braked and is turning rightward, the stroke of the right driving wheel 16 is more likely to be limited than the stroke of the left driving wheel 14. In this case, therefore, it is judged whether the total target stroke $H_{STR}$ of the right driving wheel 16 is not greater than the stroke limit L.

If the total target stroke $H_{STR}$ of the right driving wheel 16 is not greater than the stroke limit L, a positive judgment is made at Step S46, and the control goes to Step S47 to adopt the respective total target strokes $H_{STL}$, $H_{STR}$ of the left and right driving wheels 14, 16 as respective target strokes $H_{TL}$, $H_{TR}$ thereof.

$H_{STR} \leftarrow H_{TPR}+H_{TLR}$ $H_{TR} \leftarrow H_{STR}$ $H_{STL} \leftarrow H_{TPL}+H_{TLL}$ $H_{TL}-H_{STL}$ As shown in FIG. 2, when the gravity center G is moved frontward upon braking of the vehicle, the gravity center G is forcedly moved rearward by the inclination of the vehicle in the front-rear direction; and when the gravity center G is moved leftward upon turning of the vehicle in the rightward direction, the gravity center G is forcedly moved rightward by the inclination of the vehicle in the left-right direction. Thus, the amount of movement of the gravity center G from its reference position can be decreased.

On the other hand, if the total target stroke $H_{STR}$ of the right driving wheel 16 is greater than the stroke limit L, a negative judgment is made at Step S46, and the control goes to Step S48 to adopt the stroke limit L as the target stroke $H_{TR}$ of the right driving wheel 16 and adopt, as the target stroke $H_{TL}$ of the left driving wheel 14, a value whose absolute value is greater than the total target stroke $H_{STL}$ of the left driving wheel 14 by a shortage amount, $L_S$, obtained by subtracting the stroke limit L from the total target stroke $H_{STR}$.

$H_{STR} \leftarrow H_{TPR}+H_{TLR}$ $H_{TR} \leftarrow L$ $L_S \leftarrow H_{STR}-L$ $H_{STL} \leftarrow H_{TPL}+H_{TLL}$ $H_{TL} \leftarrow H_{STL}+L_S = H_{TPL}+(H_{TLL}+L_S)$ Thus, as shown in FIG. 36(a), the vehicle cannot be inclined by the target left-right lean angle $\theta_{TL}$ corresponding to the turning, but the vehicle can be inclined by the target front-rear lean angle $\theta_{Tpit}$ corresponding to the braking.

$\tan \theta_{TL} = 2H_{TLR}/T$ $\tan \theta_L = 2(H_{TLR}-L_S)/T = \tan \theta_{TL} - 2L_S/T$ $\tan \theta_{Tpit} = H_{TPR}/W$ In addition, as indicated by the above expressions, a shortage amount ($2L_S/T$) of the actual left-right lean angle $\tan \theta_L$ corresponds to the shortage amount $L_S$ of the target stroke $H_{TR}$.

It is noted that in FIG. 36(a), strokes H are scaled on the vertical line for easier understanding of the relationship between the strokes and the stroke limit L.

Meanwhile, if the vehicle is being braked and is turning leftward, a positive judgment is made at Step S49, and the control goes to Step S50 to obtain, for the left driving wheel 14, a sum of the pitch-related target stroke $H_{TPL}$ and the lean-related target stroke $H_{TLL}$ (hereinafter, referred to as a total target stroke, $H_{STL}$: $H_{STL} \leftarrow H_{TPL}+H_{TLL}$). At Step S51, it is judged whether the total target stroke $H_{STL}$ is not greater than the stroke limit L. In the case where the vehicle is being braked and is turning leftward, the stroke of the left driving wheel 14 is greater than the stroke of the right driving wheel 16. At Steps S52 and S53, respective target strokes $H_{TL}$, $H_{TR}$ of the left and right driving wheels 14, 16 are obtained in the same manners as described above in connection with Steps S47 and S48 corresponding to the case where the vehicle is turning rightward.

Thus, when the vehicle is being braked and is turning, it is judged whether the greater one of the respective total target strokes $H_{STL}$, $H_{STR}$ of the left and right driving wheels 14, 16 is not greater than the stroke limit L. If a positive judgment is made, the respective total target strokes $H_{STL}$, $H_{STR}$ of the left and right driving wheels 14, 16 are adopted and outputted as the respective target strokes $H_{TL}$, $H_{TR}$ of the same 14, 16. On the other hand, if a negative judgment is made, the greater one of the respective total target strokes $H_{STL}$, $H_{STR}$ is replaced with the stroke limit L, so that the stroke limit L is adopted and outputted as one of the two target strokes and the smaller one of the total target strokes $H_{STL}$, $H_{STR}$ is increased by the shortage amount $L_S$, so as to be adopted and outputted as the other target stroke.

Consequently the vehicle can be inclined by the target front-rear lean angle $\theta_{Tpit}$ corresponding to the braking, but the vehicle cannot be inclined by the target left-right lean angle $\theta_{TL}$ corresponding to the turning. That is, when braking and turning simultaneously occur to the vehicle, the braking has priority over the turning.

When the vehicle is being braked but is not turning rightward or leftward, the control goes to Step S54 to output the respective total target strokes $H_{STL}$, $H_{STR}$ as the respective target strokes $H_{TL}$, $H_{TR}$. In this case, since the lean-related target strokes $H_{TLL}$, $H_{TLR}$ are very small values or zero, it can be said that the respective target strokes $H_{TL}$, $H_{TR}$ are substantially equal to the respective pitch-related target strokes $H_{TPL}$, $H_{TPR}$.

Figure 26B:
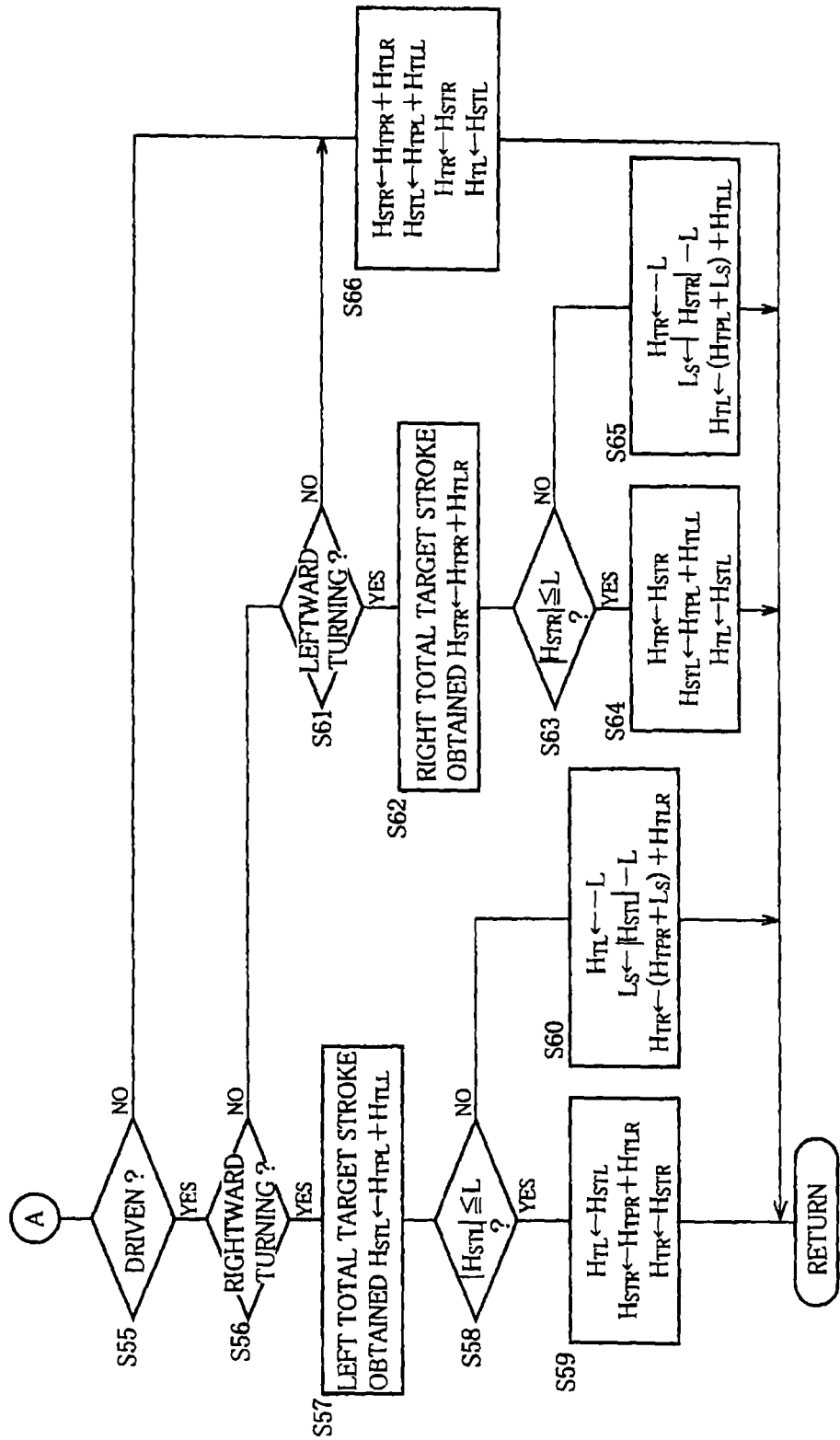
FIG. 26(b) is a remaining portion of the flow chart representing the priority-dependent control program.

Meanwhile, when the vehicle is being driven, Step S55 and the following steps shown in FIG. 26(b) are implemented. If the vehicle is being driven and is turning rightward, a positive judgment is made at each of Steps S55 and S56, and the control goes to Step S57 to obtain an absolute value of a total target stroke $H_{STL}$ of the left driving wheel 14, because when the vehicle is being driven and is turning rightward, the absolute value of the total target stroke $H_{STL}$ of the left driving wheel 14 is greater than that of a total target stroke $H_{STR}$ of the right driving wheel 16. Step S57 is followed by Step S58 to judge whether the absolute value of the total target stroke $H_{STL}$ of the left driving wheel 14 is not greater than the stroke limit L. If the absolute value of the total target stroke $H_{STL}$ is not greater than the stroke limit L, a positive judgment is made at Step S58, and the control goes to Step S59 to output the respective total target strokes $H_{STL}$, $H_{STR}$ of the left and right driving wheels 14, 16 as respective target strokes $H_{TL}$, $H_{TR}$ thereof. On the other hand, if the absolute value of the total target stroke $H_{STL}$ is greater than the stroke limit L, the control goes to Step S60 to adopt, as the target stroke $H_{TL}$ of the left driving wheel 14, a value, $-L$, obtained by inverting the sign of the stroke limit L ($>0$), and adopt, as the target stroke $H_{TR}$ of the right driving wheel 16, a value whose absolute value is smaller than the total target stroke $H_{STR}$ of the right wheel 16 by a shortage amount $L_S$.

As shown in FIG. 2, when the gravity center G of the vehicle is moved rearward upon driving of the vehicle, the gravity center G is forcedly moved frontward by the control of the front-rear lean angle; and when the gravity center G is moved rightward upon turning of the vehicle in the leftward direction, the gravity center G is forcedly moved leftward by the control of the left-right lean angle. Thus, the amounts of movement of the gravity center G from its reference position can be decreased.

$$H_{STL} \leftarrow H_{TPL} + H_{TLL}$$

$$H_{TL} \leftarrow -L_S (L > 0)$$

$$L_S \leftarrow |H_{STL}| - L$$

$$H_{STR} \leftarrow H_{TPR} + H_{TLR}$$

$$H_{TR} \leftarrow H_{STR} + L_S = H_{TLR} + (H_{TPR} + L_S)$$

Thus, as shown in FIG. 36(b), the vehicle cannot be inclined by the target front-rear lean angle $\theta_{Tpit}$ corresponding to the braking, but the vehicle can be inclined by the target left-right lean angle $\theta_{TL}$ corresponding to the turning.

$$\tan \theta_{Tpit} = H_{TPR}/W (<0)$$

$$\tan \theta_{pit} = (H_{TPR} + L_S)/W = \tan \theta_{Tpit} + L_S/W$$

$$\tan \theta_{TL} = 2H_{TLR}/T$$

Thus, a shortage amount ($L_S/W$) of the actual front-rear lean angle $\tan \theta_{pit}$ corresponds to the shortage amount $L_S$ of the target stroke $H_{TR}$.

On the other hand, when the vehicle is turning leftward, a positive judgment is made at Step S61 and then, at Steps S62 through S65, it is judged whether the total target stroke $H_{STR}$ of the right driving wheel 16 is not greater than the stroke limit L and respective target strokes $H_{TL}$, $H_{TR}$ of the left and right driving wheels 14, 16 are obtained in the same manners as described above.

When the vehicle is not turning rightward or leftward, or is not being braked or driven, the control goes to Step S66 to adopt the respective total target strokes $H_{STL}$, $H_{STR}$ of the left and right driving wheels 16 as respective target strokes $H_{TL}$, $H_{TR}$ of the same 14, 16, and output the same $H_{TL}$, $H_{TR}$.

In the above-indicated cases, the pitch-related target strokes and/or the lean-related target strokes are very small or even zero.

Thus, the braking request is the most important of the braking, driving, and turning requests. In many cases, there arises no problem even if the driving request may not be satisfied. Hence, in the present embodiment, the braking request has priority over the turning request which in turn has priority over the driving request, and the posture control is performed according to the order of priority. Thus, the running stability of the vehicle can be improved while as many as possible operator's requests are satisfied.

In addition, in the present embodiment, the control of the vehicle's posture with respect to the lateral direction involves restraining the change of height position of the gravity center G of the vehicle.

Figure 37:
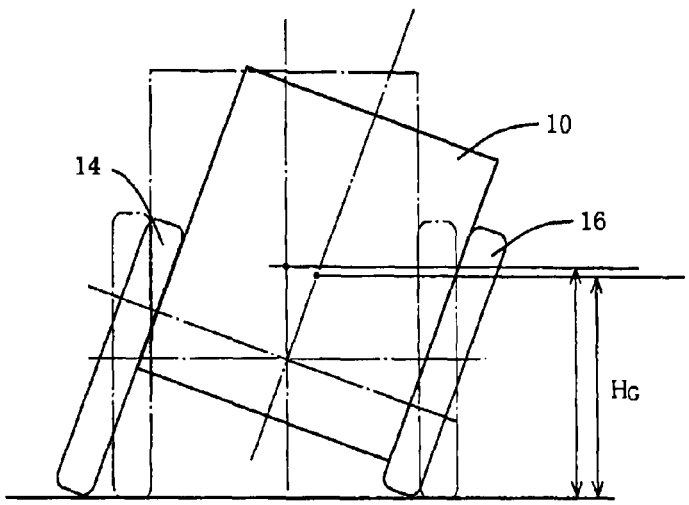
FIG. 37 is a view showing a manner in which the height of the gravity center is changed when a lateral-direction-posture control is performed in the vehicle.
Figure 38:
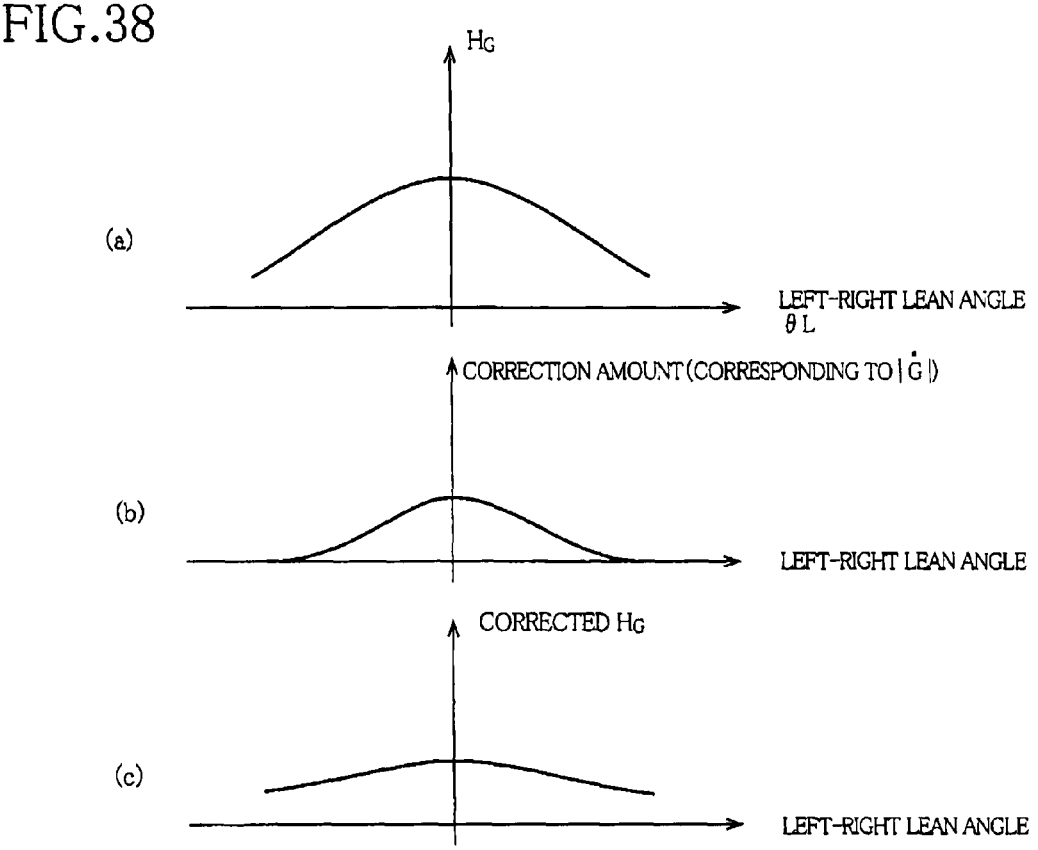
FIGS. 38(a), 38(b), and 38(c) are views showing changes of the height of the gravity center in the case where the gravity-center-height-change restraining control is performed when the vehicle is steered back.

As shown in FIG. 37, if the respective positions of the two rear wheels 14, 16 relative to the body 10 are changed symmetrically with respect to a neutral position, the left-right lean angle $\theta_L$ is changed and accordingly an average height position of the two wheels 14, 16 is changed, so that a height position, $H_G$, of the gravity center G is changed. As shown in FIG. 38(a), the height position $H_G$ of the gravity center G takes a maximum value when the respective positions of the two rear wheels 14, 16 relative to the body 10 are equal to the neutral position (i.e., when the left-right lean angle $\theta_L$ is equal to zero), and the height position $H_G$ decreases as the absolute value of the left-right lean angle $\theta_L$ increases. The change of the height position $H_G$ of the gravity center G makes the operator feel discomfort. In a particular case where the vehicle is turned back (i.e., the direction of turning of the vehicle is changed to the opposite direction), if the amount of change of the gravity-center height $H_G$ is large, then the body 10 cannot quickly be inclined to disadvantage. The neutral position depends on the strokes corresponding to the front-rear lean angle at the current time, and may coincide with the reference position.

Hence, in the present embodiment, when the posture of the body 10 with respect to the lateral direction is controlled, an average height position of the body 10 (i.e., a height position of a portion of the body 10 that corresponds to the rear wheels 14, 16) is changed based on the left-right lean angle $\theta_L$. More specifically described, while the average height position of the body 10 is changed, the respective positions of the two rear wheels 14, 16 relative to the body 10 are so controlled as to obtain the left-right lean angle $\theta_L$. The average height position of the body 10 is defined as a height position thereof when the left-right lean angle $\theta_L$ is equal to zero, and accordingly it corresponds to the neutral position of the wheels 14, 16. The average height position (i.e., the neutral position) can be changed by changing the respective positions of the left and right rear wheels 14, 16 in the same direction, which results in a change of the front-rear lean angle. The above-described correction value $\theta_H$ corresponds to this change of the front-rear lean angle that corresponds to the change of the neutral position.

As described above, the correction value $\theta_H$ of the front-rear lean angle increases as the absolute value of the differential value of the lateral acceleration $G_y$ increases.

The front-rear lean angle $\theta_{pit}$ is positive when the two rear wheels 14, 16 are moved to the bound side, and the angle $\theta_{pit}$ increases as the stroke increases on the bound side. That is, an amount of correction (i.e., decrease) of the average height position of the body 10 is greater when the correction value $\theta_H$ is great than when the correction value $\theta_H$ is small.

Moreover, as shown in FIG. 33(b), the speed of operation of the grips 200 is high during an intermediate period of operation of the grips 200 (i.e., when the absolute value of the left-right lean angle $\theta_L$ is small), and is low during each of a starting and an ending period of operation of the grips 200 (i.e., when the absolute value of the left-right lean angle $\theta_L$ is great).

The lateral acceleration Gy is estimated based on the vehicle speed $V_S$ and the rotation angle $\theta_{LAT}$ of the grips 200. Therefore, providing that the vehicle speed $V_S$ is constant, the absolute value of the differential value of the lateral acceleration Gy is greater when the speed of change of the rotation angle $\theta_{LAT}$ (i.e., the speed of operation of the grips 200) is high than when the speed is low.

As shown in FIG. 22 (i.e., the processing portion 460), the correction value $\theta_H$ is greater when the absolute value of the differential value of the lateral acceleration Gy (i.e., the speed of operation of the grips 200) is great than when the absolute value is small. Therefore, as shown in FIG. 38(b), the correction value $\theta_H$ is greater when the absolute value of the left-right lean angle $\theta_L$ is small than when the absolute value is great.

Thus, as the absolute value of the left-right lean angle $\theta_L$ decreases, the neutral position is moved to the bound side so as to control the vehicle's posture with respect to the lateral direction. An amount of movement of the neutral position to the bound side (i.e., an amount of decrease of the average height of the body 10) is greater when the absolute value of the left-right lean angle $\theta_L$ is small than when the absolute value is great.

In the present embodiment, the target front-rear lean angle $\theta_{Tpit}$ contains the correction value $\theta_H$. Therefore, in the case where the sum of the pitch-related target stroke and the lean-related target stroke is adopted as the target stroke, it is meant that the correction value $\theta_H$ is taken into account. Thus, as shown in FIG. 38(c), the change of average height of the body 10, i.e., the change of height of the gravity center G is restrained as compared with the case (shown in FIG. 38(a)) where the correction value $\theta_H$ is not taken into account. However, in the case where the lateral acceleration Gy is not changed, i.e., in the case where the grips 200 are not operated to steer the vehicle and accordingly the left-right lean angle (i.e., the posture with respect to the lateral direction) is not changed, the correction value $\theta_H$ takes zero.

Figure 27:
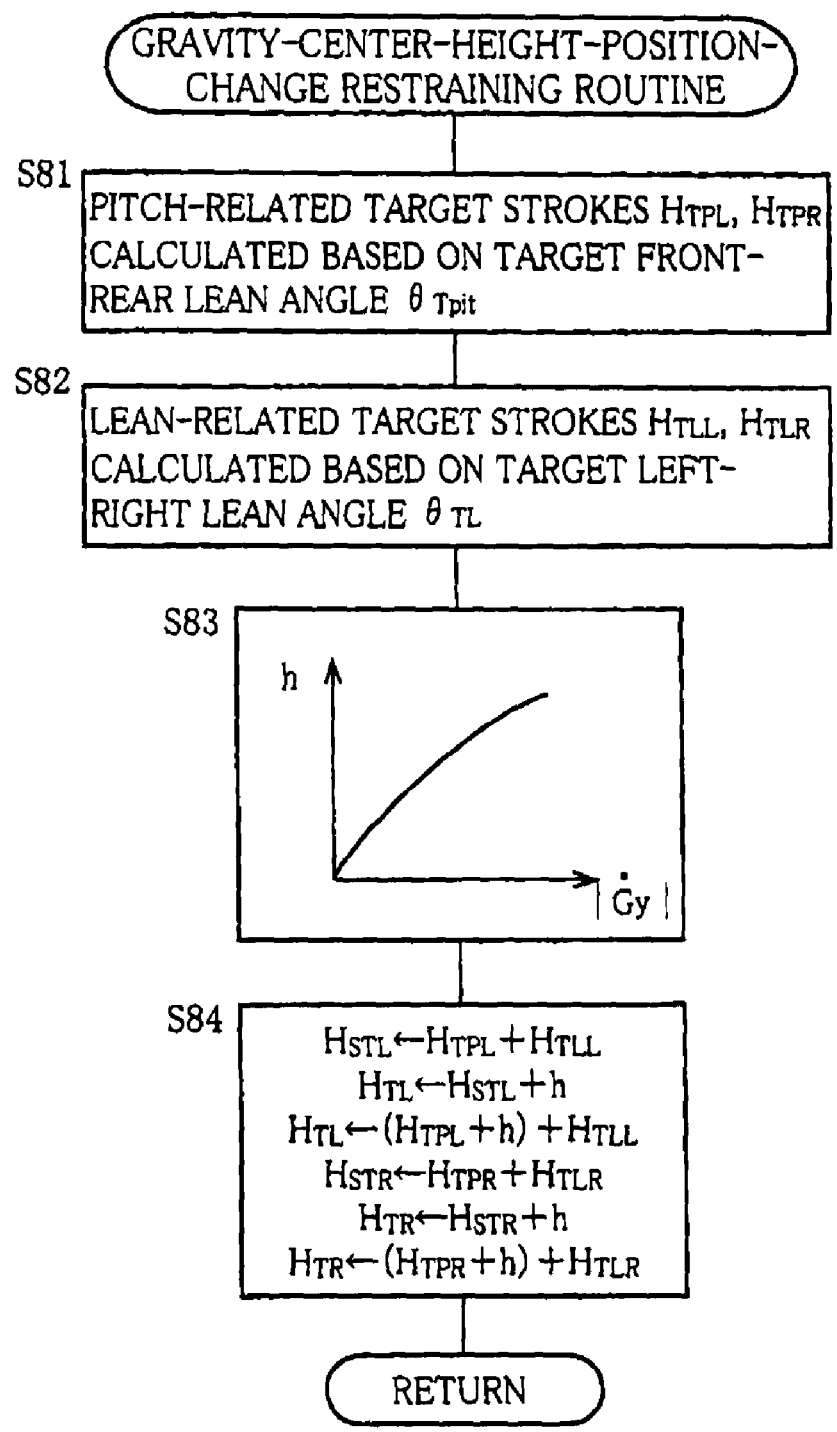
FIG. 27 is a flow chart representing a gravity-center-height-change restraining program that is stored in the storing portion.

An example of this control will be explained by reference to a flow chart shown in FIG. 27. This flow chart does not represent steps carried out by the request integrating portion 414, but represents respective operations of the target-front-rear-lean angle calculating portion 410, the target-left-right-lean angle calculating portion 412, and the request integrating portion 414. In FIG. 38(b), the correction value of the average height of the body 10 is obtained as the correction value $\theta_H$ of the target front-rear lean angle. However, this flow chart relates to a case where the correction value of the average height of the body 10 is obtained as a correction value, h, of an up-down stroke.

At Step S81, pitch-related target strokes $H_{TPL}$, $H_{TPR}$ are obtained based on the target front-rear lean angle $\theta_{Tpit}$; and, at Step S82, lean-related target strokes $H_{TLL}$, $H_{TLR}$ are obtained based on the target left-right lean angle $\theta_{TL}$. Then, at Step S83, a correction value h is obtained based on the absolute value of the differential value of the estimated lateral acceleration Gy. At Step S84, values (i.e., values on the bound side) obtained by adding the correction value h to each of the respective total target strokes $H_{STL}$, $H_{STR}$ of the left and right wheels 14, 16 are outputted as respective target up-down strokes $H_{TL}$, $H_{TR}$.

As a result, the change of the average height of the body 10 can be decreased and accordingly the change of the height of the gravity center G can be decreased. In addition, when the vehicle is turned back, the body 10 can be quickly inclined while the discomfort felt by the operator can be reduced.

Figure 39:
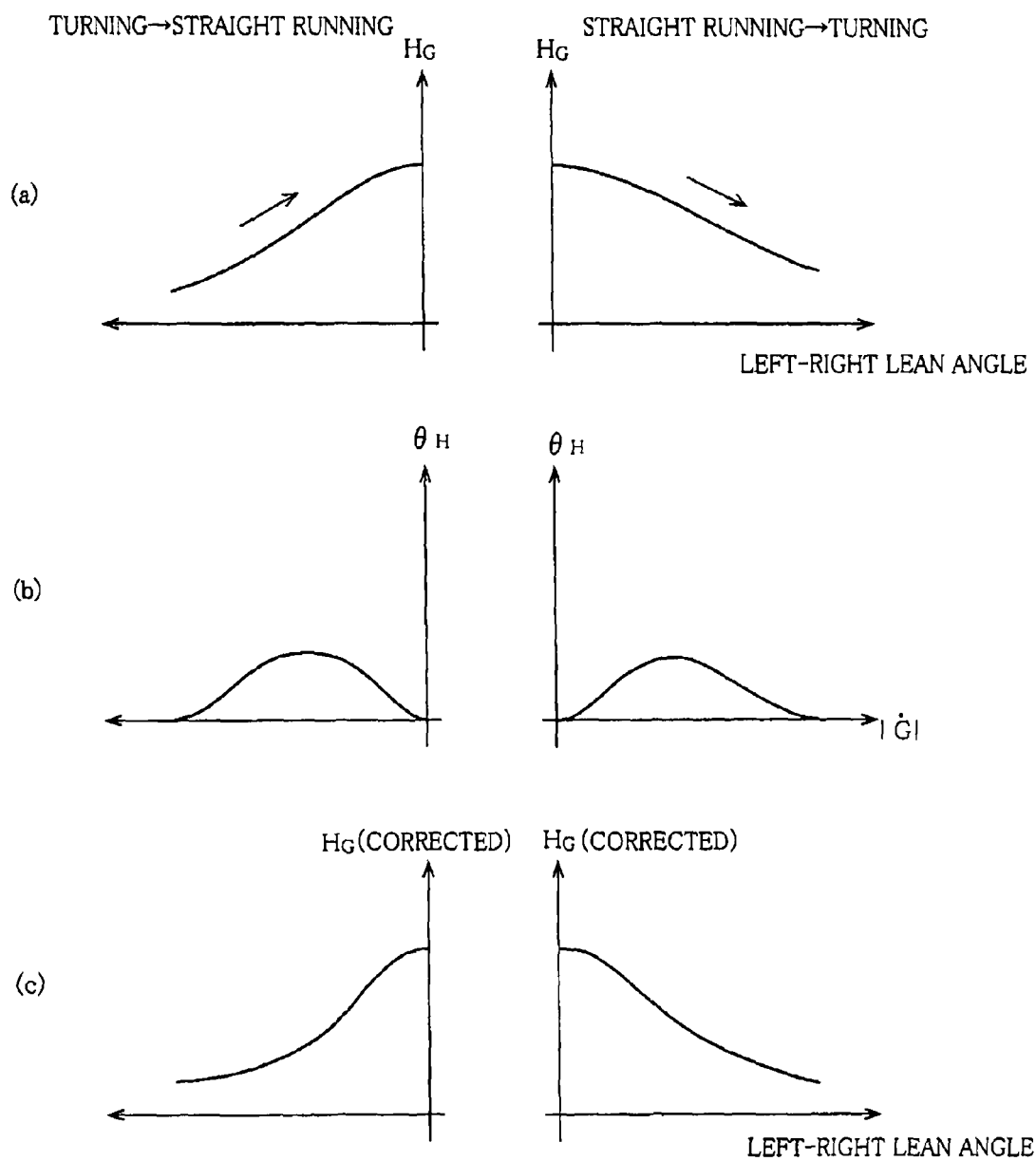
FIGS. 39(a), 39(b), and 39(c) are views showing changes of the height of the gravity center in the case where the gravity-center-height-change restraining control is performed when the vehicle is changed between a straight running state and a turning state.

Meanwhile, when the vehicle changes from the straight running state to the turning state (i.e., when the grips 200 are rotated rightward or leftward from the respective neutral positions), or when the vehicle changes from the turning state to the straight running state (i.e., when the grips 200 are rotated back to the respective neutral positions), the height position $H_G$ of the gravity center G changes as shown in FIG. 39(a). On the other hand, the correction value $\theta_H$ changes as shown in FIG. 39(b) because, as described above, the correction value $\theta_H$ is great during the intermediate period of operation of the grips 200, and is small during each of the starting and ending periods of operation of the grips 200. Therefore, the height of the gravity center G changes as shown in FIG. 39(c), and the amount of change thereof is not restrained.

Thus, in the present embodiment, in the case where the direction of turning of the vehicle is changed to the opposite direction, the change of the height of the gravity center G is more restrained as compared with the case where the straight running state is changed to the turning state or the turning state is changed to the straight running state.

The present vehicle may be modified such that when the vehicle is braked or driven while turning, the target strokes $H_{TL}$, $H_{TR}$ are obtained while the target front-rear lean angle $\theta_{Tpit}$ is limited. Whether the vehicle is being braked or driven can be known from a sign of the target front-rear lean angle $\theta_{Tpit}$ (when the vehicle is being braked, the sign is positive; and when the vehicle is being driven, the sign is negative).

Figure 28:
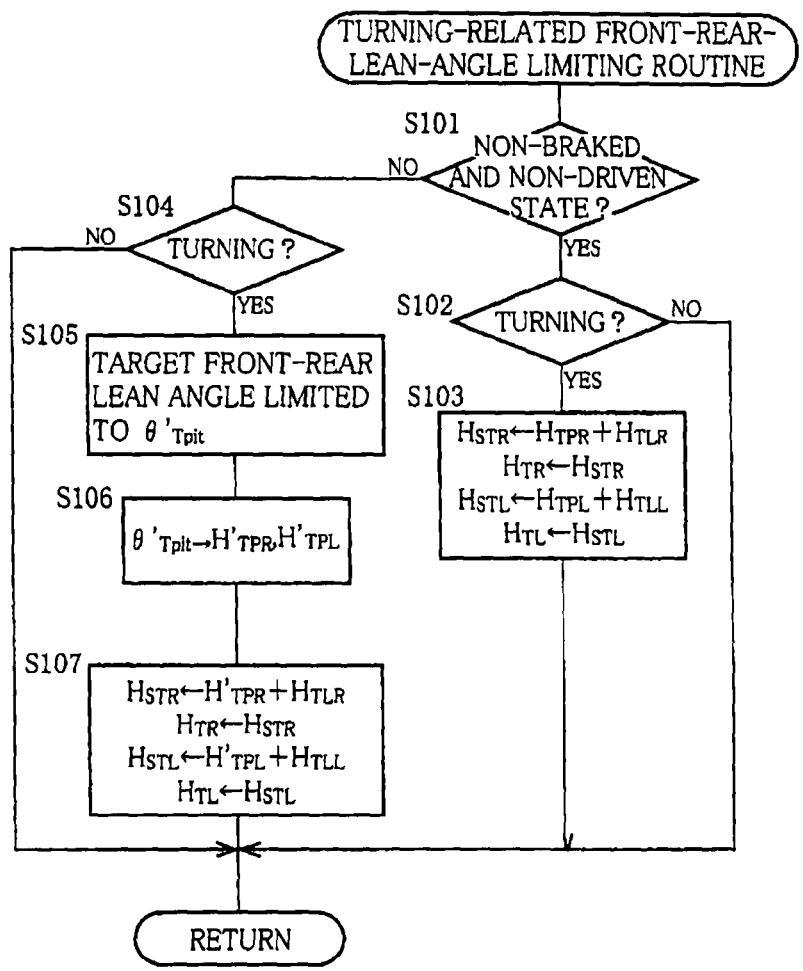
FIG. 28 is a flow chart representing a turning-related front-rear-lean-angle limiting program that is stored in the storing portion.

An example of this control will be explained by reference to a flow chart shown in FIG. 28.

At Step S101, it is judged whether the vehicle is not being braked or driven. If the vehicle is not being braked or driven, the control goes to Step S102 to judge whether the vehicle is turning. If a positive judgment is made at Step S102, the control goes to Step S103 to obtain respective total target strokes $H_{STL}$, $H_{STR}$ that are equal to respective sums of respective pitch-related target strokes $H_{TPL}$, $H_{TPR}$ and respective lean-related target strokes $H_{TLL}$, $H_{TLR}$, and output the respective total target strokes $H_{STL}$, $H_{STR}$ as respective target strokes $H_{TL}$, $H_{TR}$.

On the other hand, if the vehicle is being braked or driven, the control goes to Step S104 to judge whether the vehicle is turning. If a positive judgment is made at Step S104, the control goes to Step S105 to limit the target front-rear lean angle $\theta_{Tpit}$ to a limited target front-rear lean angle $\theta_{Tpit}'$. The limitation of the target front-rear lean angle $\theta_{Tpit}$ may be carried out based on at least one of a roll angle and a roll rate. Even when the vehicle is turning, if the roll angle is small or the roll rate is small, it is not necessarily required to decrease the front-rear lean angle. In this case, the limited target front-rear lean angle $\theta_{Tpit}'$ is made equal to the target front-rear lean angle $\theta_{Tpit}$. On the other hand, if the roll angle is great or the roll rate is great, it is not necessarily required to decrease the front-rear lean angle. In this case, the limited target front-rear lean angle $\theta_{Tpit}'$ is made equal to the target front-rear lean angle $\theta_{Tpit}$. On the other hand, the absolute value of the limited target front-rear lean angle $\theta_{Tpit}'$ is made smaller than that of the target front-rear lean angle $\theta_{Tpit}$ ($|\theta_{Tpit}'|<|\theta_{Tpit}|$). And, at Step S106, respective limited pitch-related target strokes $H_{TPL}'$, $H_{TPR}'$ are obtained based on the limited target front-rear lean angle $\theta_{Tpit}'$. Step S106 is followed by Step S107 to obtain respective total target strokes $H_{STL}$, $H_{STR}$ that are equal to respective sums of the respective limited pitch-related target strokes $H_{TPL}'$, $H_{TPR}'$ and respective lean-related target strokes $H_{TLL}$, $H_{TLR}$, and output the respective total target strokes $H_{STL}$, $H_{STR}$ as respective target strokes $H_{TL}$, $H_{TR}$.

Since the target front-rear lean angle is limited when the vehicle is turning, the body 10 can be prevented from being largely inclined in the frontward and rearward directions. Thus, the turning stability of the vehicle can be improved. That is, since the target front-rear lean angle $\theta_{Tpit}$ is limited based on at least one of the roll angle and the roll rate, the turning performance of the vehicle can be advantageously maintained.

However, it is not essentially required that the target front-rear lean angle $\theta_{Tpit}$ be limited based on at least one of the roll angle and the roll rate. For example, the vehicle may be modified such that whenever the vehicle is braked or driven while turning, the absolute value of the target front-rear lean angle $\theta_{Tpit}$ is decreased by a pre-set angle, $\theta_{TS}$ ($|\theta_{Tpit}'|=|\theta_{Tpit}|-\theta_{TS}$).

Alternatively, the present vehicle may be modified such that when the vehicle is driven while turning, the target strokes $H_{TL}$, $H_{TR}$ are obtained while the target front-rear lean angle $\theta_{Tpit}$ is limited, and such that when the vehicle is braked while turning, the target strokes $H_{TL}$, $H_{TR}$ are obtained while the target front-rear lean angle $\theta_{Tpit}$ is not limited. Otherwise, the present vehicle may be modified such that when the vehicle is braked while turning, the target strokes $H_{TL}$, $H_{TR}$ are obtained while the target left-right lean angle is limited.

In addition, the present vehicle may be modified such that the target front-rear lean angle $\theta_{Tpit}$ is limited while the pitch angle and/or the pitch rate are/is also taken into count.

As is apparent from the foregoing description of the preferred embodiment, the target-left-right-lean-angle calculating portion 412, the request integrating portion 414, and the target-motor-torque calculating portion 354 of the control device 300 cooperate with each other to constitute a lateral-direction-posture control device; and the target-front-rear-lean-angle calculating portion 410, the request integrating portion 414, and the target-motor-torque calculating portion 354 of the control device 300 cooperate with each other to constitute a front-rear-direction-posture control device.

In addition, the processing portion 450 of the lateral-direction-posture control device constitutes an inclination-angle determining portion; and the processing portions 458, 459, 460 and the request integrating portion 414 of the lateral-direction-posture control device cooperate with each other to constitute a gravity-center-height-change restraining portion. The processing portions 420, 422, 424, 426, 430, 432, 434, 436, 437 of the target-front-rear-lean-angle calculating portion 410 of the front-rear-direction-posture control device cooperate with each other to constitute an acceleration-deceleration-related front-rear-direction inclining portion; and portions of the control device 300 that stores and implements the turning-related front-rear-lean-angle limiting routine represented by the flow chart of FIG. 28 cooperate with each other to constitute an inclination-angle restraining portion.

Portions of the control device 300 that stores and implements Steps S48 and S53 of the flow chart of FIG. 26(a) cooperate with each other to constitute a turning-and-braking-related control portion or a limit-using lateral-direction-posture control portion; portions of the control device 300 that stores and implements Steps S60 and S65 of the flow chart of FIG. 26(b) cooperate with each other to constitute a turning-and-driving-related control portion or a limit-using front-rear-direction-posture control portion; and the processing portion 454 and the target-motor-torque calculating portion 354 of the control device 300 cooperate with each other to constitute an operation-dependent posture control portion.

In the above-described first embodiment, if the target strokes $H_{TL}$, $H_{TR}$ cannot be outputted because of the stroke limits of the up-down moving devices 50, 52, then the target front-rear lean angle $\theta_{Tpit}$ or the target left-right lean angle $\theta_{TL}$ is not achieved depending on the order of priority.

However, in a second embodiment of the present invention, if the target front-rear lean angle $\theta_{Tpit}$ is not achieved, then the drive torque $M_D$ is restrained; and if the target left-right lean angle $\theta_{TL}$ is not achieved, then the absolute value of the target steering angle $\delta$ is decreased. In the present embodiment, the signals outputted by the request integrating portion 414 are supplied to the target-front-steering-angle calculating portion 356 and the target-motor-torque calculating portion 354.

Figure 29:
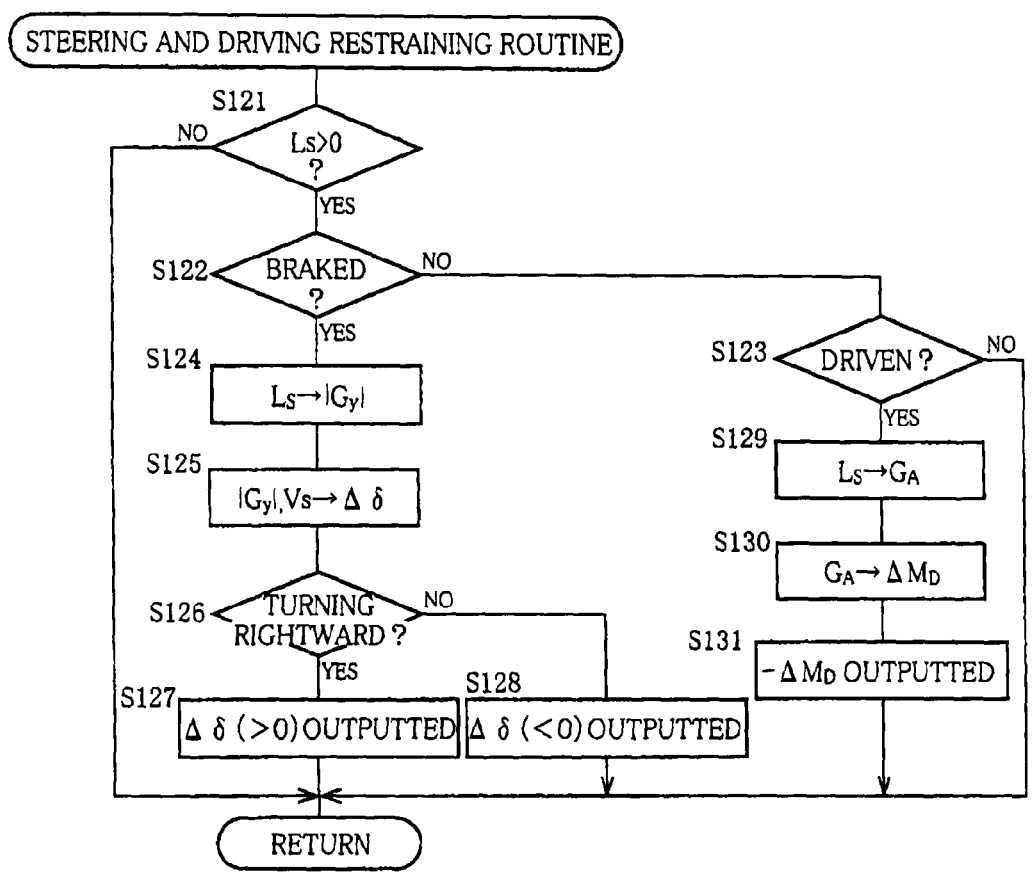
FIG. 29 is a flow chart representing a steering-driving restraining program that is stored in a storing portion of a control device of another vehicle as another embodiment of the present invention.

An example of this control is represented by a flow chart shown in FIG. 29.

At Step S121, it is judged whether an amount, $L_S$, of shortage of a stroke is greater than zero, i.e., whether the posture control is restricted by the stroke limits of the up-down moving devices 50, 52. If a positive judgment is made at Step S121, the control goes to Step S122 to judge whether the vehicle is being braked, and to Step S123 to judge whether the vehicle is being driven.

If a positive judgment is made at Step S122, the control goes to Steps S124 through S128 so as to restrain the steering angle. First, at Step S124, the absolute value of the lateral acceleration $G_y$ corresponding to the stroke shortage amount $L_S$ is calculated; and at Step S125, an amount, $\Delta\delta$, of restraint of the steering angle corresponding to the absolute value of the lateral acceleration $G_y$ is calculated. The absolute value of the lateral acceleration $G_y$ is greater when the shortage amount $L_S$ is great than when the amount $L_S$ is small and the restraint amount $\Delta\delta$ of the steering angle is greater when the absolute value of the lateral acceleration $G_y$ is great than when the absolute value is small. When the vehicle is turning rightward, the restraint amount $\Delta\delta(>0)$ is outputted to the target-front-steering-angle calculating portion 356; and when the vehicle is turning leftward, the product $\Delta\delta(<0)$ of the value, −1, and the restraint amount $\Delta\delta$ is outputted to the calculating portion 356.

$$\Delta\delta \leftarrow -\Delta\delta$$

The target-front-steering-angle calculating portion 356 subtracts, from the target steering angle $\delta_T$, the restraint amount $\Delta\delta$ so as to provide a final target steering angle, $\delta_T$.

$$\delta T \leftarrow \delta T - \Delta\delta$$

Thus, irrespective of whether the vehicle may be turning rightward or leftward, the absolute value of the final target steering angle is smaller than the target steering angle before being restrained.

Meanwhile, if a positive judgment is made at Step S123, the control goes to Steps S129 through S131 so as to restrain the drive torque. First, at Step S129, the front-rear acceleration $G_A$ corresponding to the stroke shortage amount $L_S$ is calculated; and at Step S130, an amount, $\Delta M_D$, of decrease of the drive torque corresponding to the front-rear acceleration $G_A$ is calculated. The front-rear acceleration $G_A$ is greater when the shortage amount $L_S$ is great than when the amount $L_S$ is small, and the decrease amount $\Delta M_D$ of the drive torque is greater when the front-rear acceleration $G_A$ is great than when the front-rear acceleration $G_A$ is small. The target-motor-torque calculating portion 354 subtracts the decrease amount $\Delta M_D$ from the respective target drive torques $M_{WL}$, $M_{WR}$ (determined based on the respective target wheel speeds $W_{TL}$, $W_{TR}$ and the respective actual wheel speeds $W_{CL}$, $W_{CR}$), so as to provide respective final target drive torques $M_{WL}$, $M_{WR}$.

$$M_{WL} \leftarrow M_{WL} - \Delta M_D/2$$

$$M_{WR} \leftarrow M_{WR} - \Delta M_D/2$$

Thus, in the case where the strokes are short when the vehicle turns while being braked, the target left-right lean angle $\theta_{TL}$ is not achieved, whereas the absolute value of the target steering angle $\delta_T$ is decreased. Thus, the lateral-direction posture of the vehicle and the turning state thereof are related to each other. In addition, in the case where the strokes are short when the vehicle turns while being driven, the target front-rear lean angle $\theta_{Tpit}$ is not achieved, whereas the drive torque is decreased in relation with the front-rear-direction posture. Thus, the front-rear-direction posture of the vehicle and the front-rear acceleration thereof are related to each other. Therefore, the running stability of the vehicle can be improved.

In the present embodiment, portions of the control device 300 that store and implement Steps S124 through S128 cooperate with each other to constitute a steering restraining portion; and portions of the control device 300 that store and implement Steps S129 through S131 cooperate with each other to constitute a speed decreasing portion.

In the above-described second embodiment, the drive torque is decreased by the amount corresponding to the stroke shortage amount. However, the drive torque may be limited based on the pitch angle and/or the pitch rate. In a third embodiment of the present invention, information representing the limitation of the drive torque is supplied from the request integrating portion 414 to the target-motor-torque calculating portion 354.

Figure 30:
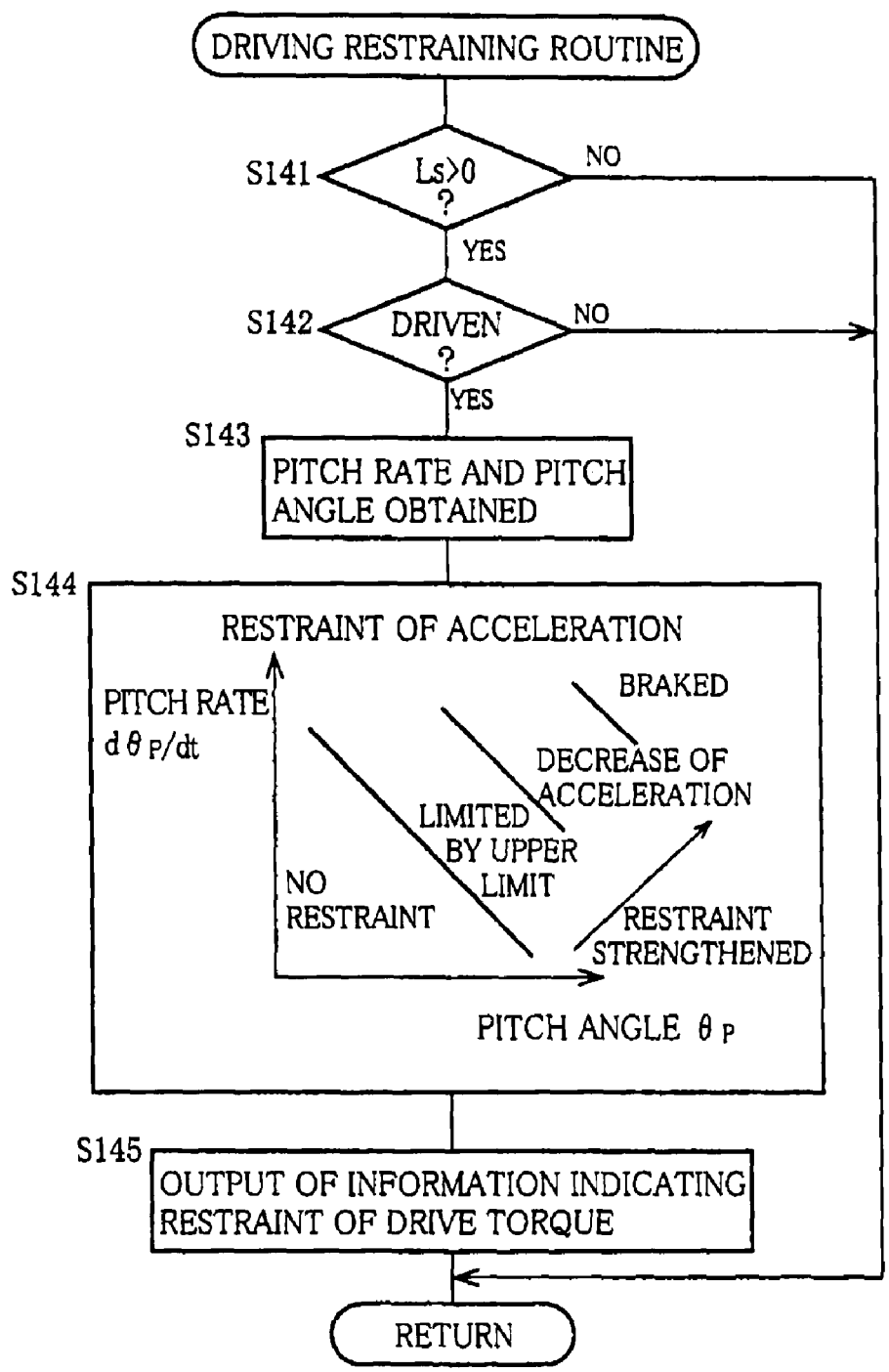
FIG. 30 is a flow chart representing a driving limiting program that is stored in a storing portion of a control device of another vehicle as another embodiment of the present invention.
Figure 31:
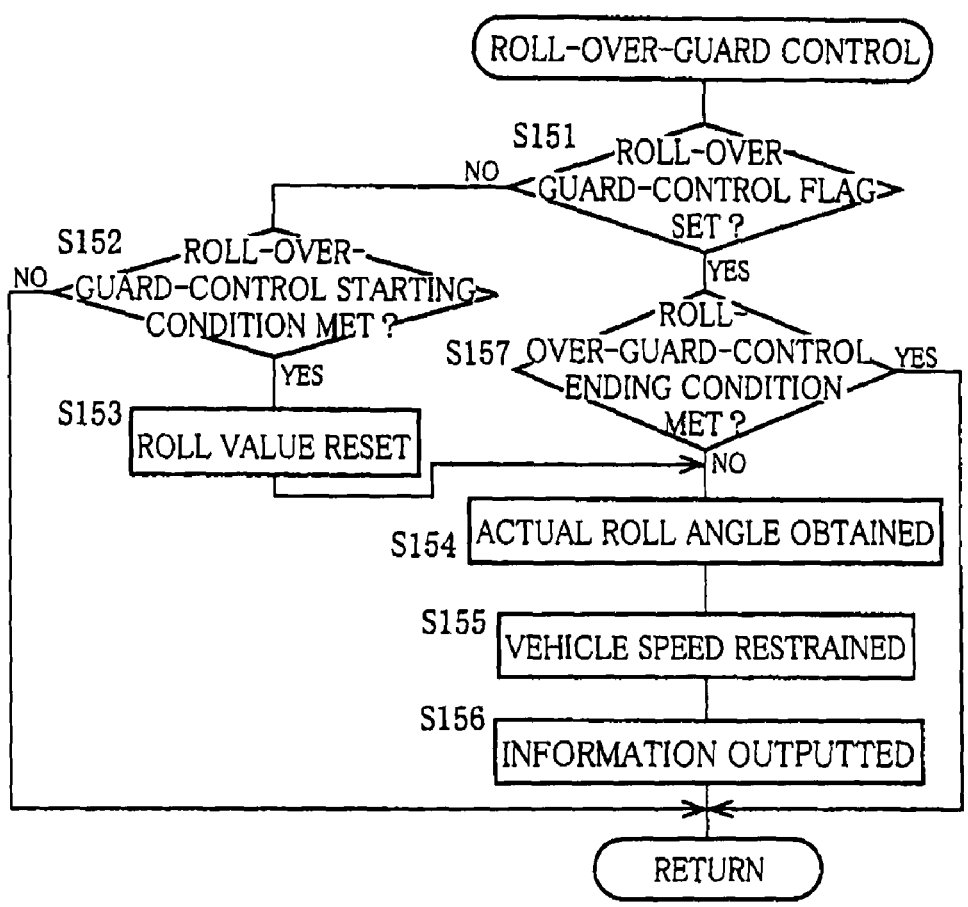
FIG. 31 is a flow chart representing a roll-over-guard control program that is stored in a storing portion of a control device of another vehicle as another embodiment of the present invention.

An example of this control is represented by a flow chart shown in FIG. 30. At Step S141, it is judged whether the up-down-stroke control is restricted (i.e., whether an amount $L_S$ of shortage of a stroke is greater than zero).

If a positive judgment is made at Step S141, the control goes to Step S142 to judge whether the vehicle is being driven. If a positive judgment is made at Step S142, the control goes to Step S143 to detect a pitch rate and a pitch angle, and further to Step S144 to obtain an amount of limitation of acceleration based on the detected pitch rate and the detected pitch angle.

The limitation of acceleration is stronger when the pitch rate or the pitch angle is great than when the pitch rate or the pitch angle is small. In the case where the pitch rate or the pitch angle is small, even though the stroke may be short, it is not necessarily required to limit the acceleration. On the other hand, if the pitch rate or the pitch angle is great, an acceleration higher than an upper limit are not outputted; if the pitch rate or the pitch angle is greater, a decreased acceleration is outputted; and if the pitch rate or the pitch angle is still greater, a braking force is applied. At Step S145, an amount of limitation to the drive torque is obtained based on the amount of limitation of acceleration, and information representing the amount of limitation to the drive torque is outputted to the target-motor-torque calculating portion 354.

The target-motor-torque calculating portion 354 obtains a target motor torque based on the supplied information representing the amount of limitation to the drive torque.

Thus, in the present embodiment, when the up-down stroke is short, the drive torque can be restrained based on the pitch angle and/or the pitch rate. That is, even though the up-down stroke may be short, the drive torque may not be restrained if the pitch angle and/or the pitch rate are/is small. Therefore, based on the actual front-rear-direction posture of the vehicle, the drive torque can be restrained only in the case where the restraining is needed in deed. Thus, the running stability of the vehicle can be improved while the operator's intension is met to the highest possible degree.

In the third embodiment, portions of the control device 300 that store and implement Steps S143 and S144 cooperate with each other to constitute an acceleration limiting portion; and the pitch-rate sensor 324 constitutes a portion of an inclination-angle obtaining device.

In the above-described first embodiment, the roll-over-guard control is performed such that when the vehicle is in the roll-over state, the absolute value of the steering angle $\delta_T$ is decreased. However, the roll-over guard control may be modified such that when the vehicle is in the roll-over state, the vehicle speed $V_S$ is limited. In this case, the signal outputted by the roll-over-guard control portion 406 is supplied to the target-vehicle-speed calculating portion 352. An example of this control is described by reference to a flow chart shown in FIG. 31.

Like the above-described first embodiment, the present embodiment is designed such that at Step S151, it is judged whether a roll-over-guard-control flag has been set and, at Step S152, it is judged whether a roll-over-guard-control starting condition has been met. If a negative judgment is made at Step S151 and a positive judgment is made at Step S152, the control goes to Step S153 to reset a roll value, and further to Step S154 to obtain an actual roll angle. Step S154 is followed by Step S155 to limit the vehicle speed based on the obtained actual roll angle. For example, the vehicle speed is controlled in such a manner that the vehicle speed, or the upper limit of the vehicle speed, is lower when the actual roll angle is great than when the angle is small. Then, at Step S156, information representing the limitation of the vehicle speed is supplied to the target-vehicle-speed calculating portion 352.

Thus, in the present embodiment, when the roll-over state of the vehicle is detected, the vehicle speed is limited. Therefore, the lowering of running stability of the vehicle can be restrained.

The vehicle according to the present invention may be a wheelchair.

While the present invention has been described in its preferred embodiments, it is to be understood that the present invention is not limited to the details of those embodiments but may be embodied with various changes and improvements that may occur to a person skilled in the art.

The invention claimed is:

1. A vehicle comprising:
   a body;
   at least a pair of wheels including a left wheel and a right wheel which are distant from each other in a widthwise direction of the body;
   an up-down moving device which is provided between the body and each of the left wheel and the right wheel and which moves said each of the left wheel and the right wheel relative to the body in upward and downward directions;
a lateral-direction posture control device which controls, when the vehicle turns, the up-down moving device so that a position of the left wheel relative to the body and a position of the right wheel relative to the body differ from each other and accordingly the body and the left and right wheels are inclined, relative to a road surface, inward of a turning circle of the vehicle; and
a gravity-center-height-position-change restraining portion which restrains a change of a height position of a gravity center of the vehicle when a turning direction of the vehicle in a turning state is changed to a direction opposite to the turning direction, as compared with when the vehicle in a straight running state is changed to the turning state.

2. The vehicle according to claim 1, wherein the lateral-direction posture control device comprises an inclination-angle determining portion which determines an inclination angle defined as an angle of each of respective planes on which the left wheel and the right wheel rotate, relative to a normal line of the road surface, such that an absolute value of the inclination angle is greater when a centrifugal force exerted to the vehicle is great than when the centrifugal force is small.

3. The vehicle according to claim 1,
wherein the lateral-direction posture control device further comprises a relative-position control device which moves the left wheel and the right wheel relative to the body in the upward and downward directions, symmetrically with each other with respect to a neutral position, so as to incline the body and the left and right wheels with respect to a lateral direction, and
wherein the gravity-center-height-position-change restraining portion comprises a neutral-position changing portion which changes the neutral position such that a height position of the neutral position as measured from the road surface is more largely lowered when an absolute value of an inclination angle of the left and right wheels is small than when the absolute value of the inclination angle is great.

4. The vehicle according to claim 3, wherein the neutral-position changing portion comprises a neutral-position determining portion which determines the neutral position according to a speed of change of the turning direction of the vehicle.

5. The vehicle according to claim 1, further comprising a steering instructing member which is operable by an operator, wherein the gravity-center-height-position-change restraining portion operates when a speed of operation of the steering instructing member is not lower than a pre-set speed.

6. The vehicle according to claim 1,
wherein the up-down moving device comprises a left-side moving device and a right-side moving device which respectively move, in the upward and downward directions, the left wheel and the right wheel each relative to the body and parallel to each other, and
wherein the left-side moving device and the right-side moving device comprise respective guide members which extend parallel to each other.

7. The vehicle according to claim 1, further comprising:
at least one wheel which is attached to a portion of the body that is distant from the left and right wheels in a front-rear directions; and
a front-rear-direction posture control device which controls at least the up-down moving device to move the left and right wheels relative to the body in a same direction and thereby controls an inclination of the body relative to the road surface with respect to the front-rear direction,
wherein the front-rear-direction posture control device comprises an acceleration-deceleration-related front-rear-direction inclining portion which controls the up-down moving device to lower a front portion of the body relative to a rear portion thereof when the vehicle is accelerated by being driven and to lower the rear portion of the body relative to the front portion thereof when the vehicle is decelerated by being braked,
wherein the acceleration-deceleration-related front-rear-direction inclining portion comprises an inclination-angle determining portion which determines an inclination angle of the body with respect to the front-rear direction such that an absolute value of the inclination angle of the body is greater when an absolute value of a front-rear-direction acceleration of the vehicle is great than when the absolute value of the front-rear-direction acceleration is small.

8. The vehicle according to claim 7, wherein the front-rear-direction posture control device further comprises an inclination-angle restraining portion which determines the inclination angle of the body with respect to the front-rear direction such that the inclination angle of the body is smaller when at least one of braking and driving occurs to the vehicle in a turning state, than when at least one of braking and driving occurs to the vehicle in a straight running state.

9. A vehicle comprising:
a body;
at least a pair of wheels including a left wheel and a right wheel which are distant from each other in a widthwise direction of the body;
an up-down moving device which is provided between the body and each of the left wheel and the right wheel and which moves said each of the left wheel and the right wheel relative to the body in upward and downward directions;
a lateral-direction posture control device which controls, when the vehicle turns, the up-down moving device so that a position of the left wheel relative to the body and a position of the right wheel relative to the body differ from each other and accordingly the body and the left and right wheels are inclined, relative to a road surface, inward of a turning circle of the vehicle;
at least one steering wheel which is attached to a portion of the body that is located in front of the left and right wheels;
a steering device which steers said at least one steering wheel; and
a steering control device which controls the steering device and thereby controls steering of said at least one steering wheel;
a steering instructing member which is operable by an operator; and
a steering-instruction detecting device which detects an operation state of the steering instructing member,
wherein the steering control device comprises an operation-state-dependent steering control portion which controls the steering of said at least one steering wheel based on the operation state of the steering instructing member detected by the steering-instruction detecting device.

10. The vehicle according to claim 9, wherein the operation-state-dependent steering control portion comprises an opposite-direction steering portion which steers, when the operation state of the steering instructing member detected by the steering-instruction detecting device has changed, said at least one steering wheel in an opposite direction that is opposite to a steering direction corresponding to a direction of the change of the operation state.

11. The vehicle according to claim 10, wherein the opposite-direction steering portion comprises an opposite-direction-steering-angle determining portion which determines, according to at least a speed of the change of the operation state of the steering instructing member detected by the steering-instruction detecting device, a steering angle of said at least one steering wheel in the opposite direction.

12. The vehicle according to claim 11, wherein the opposite-direction-steering-angle determining portion determines the steering angle of said at least one steering wheel in the opposite direction, such that an absolute value of the steering angle is greater when a running speed of the vehicle is high than when the running speed is low.

13. The vehicle according to claim 10, wherein the opposite-direction steering portion comprises a normal-state opposite-direction steering portion which does not steer said at least one steering wheel in the opposite direction when the vehicle is in a roll-over state, and steers said at least one steering wheel in the opposite direction when the vehicle is not in the roll-over state.

14. The vehicle according to claim 9, wherein the steering control device further comprises a roll-over restraining portion which restrains a roll-over state of the vehicle by decreasing an absolute value of a steering angle of said at least one steering wheel.

15. The vehicle according to claim 14, wherein the steering control device further comprises a selecting portion which controls, when an angle of returning of said at least one steering wheel that corresponds to an amount of operation of the steering instructing member detected by the steering-instruction detecting device is smaller than an angle of returning of said at least one steering wheel by the roll-over restraining portion, the roll-over restraining portion to control the steering angle of said at least one steering wheel, and which does not control, when the angle of returning of said at least one steering wheel that corresponds to the amount of operation of the steering instructing member is greater than the angle of returning of said at least one steering wheel by the roll-over restraining portion, the roll-over restraining portion to control the steering angle of said at least one steering wheel.

16. The vehicle according to claim 9, wherein the steering control device further comprises a rotation-speed-difference control portion which controls, according to a turning state of the vehicle, a difference of respective rotation speeds of the left and right wheels.

17. The vehicle according to claim 9, wherein the steering control device further comprises an after-posture-control steering control portion which, after the lateral-direction posture control device has started a control to incline, according to the operation state of the steering instructing member, the body and the left and right wheels inward of the turning circle when the steering-instruction detecting device has detected the operation state of the steering instructing member caused by the operator, controls the steering device to steer said at least one steering wheel.

18. A vehicle comprising:
a body;
at least a pair of wheels including a left wheel and a right wheel which are distant from each other in a widthwise direction of the body;
an up-down moving device which is provided between the body and each of the left wheel and the right wheel and which moves said each of the left wheel and the right wheel relative to the body in upward and downward directions;
a lateral-direction posture control device which controls, when the vehicle turns, the up-down moving device so that a position of the left wheel relative to the body and a position of the right wheel relative to the body differ from each other and accordingly the body and the left and right wheels are inclined, relative to a road surface, inward of a turning circle of the vehicle;
at least one wheel which is attached to a portion of the body that is distant from the left and right wheels in a front-rear direction;
a front-rear-direction posture control device which controls at least the up-down moving device to move the left and right wheels relative to the body in a same direction, and thereby controls an inclination of the body relative to the road surface with respect to the front-rear direction;
a drive device which drives at least one driving wheel of a plurality of wheels comprising the left: and right wheels and said at least one wheel;
a steering device which steers at least one steering wheel of the plurality of wheels;
a steering control device which controls the steering device based on an operation state of a steering instructing member; and
a posture-control-failure-related running-state control device which, when at least one of the lateral-direction posture control device and the front-rear-direction posture control device fails to control a corresponding one of a lateral-direction posture and a front-rear-direction posture of the vehicle to a desirable posture, decreases at least one of an absolute value of a steering angle of said at least one steering wheel and a front-rear-direction acceleration of the vehicle.

19. A vehicle comprising:
a body;
at least a pair of wheels including a left wheel and a right wheel which are distant from each other in a widthwise direction of the body;
an up-down moving device which is provided between the body and each of the left wheel and the right wheel and which moves said each of the left wheel and the right wheel relative to the body in upward and downward directions;
a lateral-direction posture control device which controls, when the vehicle turns, the up-down moving device so that a position of the left wheel relative to the body and a position of the right wheel relative to the body differ from each other and accordingly the body and the left and right wheels are inclined, relative to a road surface, inward of a turning circle of the vehicle;
at least one wheel which is attached to a portion of the body that is distant from the left and right wheels in a front-rear direction; and
a front-rear-direction posture control device which controls at least the up-down moving device to move the left and right wheels relative to the body in a same direction, and thereby controls an inclination of the body relative to the road surface with respect to the front-rear direction,
wherein the front-rear-direction posture control device comprises a turning-braking-related control portion which controls, when turning and braking occur to the vehicle, the up-down moving device according to a deceleration of the vehicle and thereby lowers a rear portion of the body relative to a front portion thereof, and wherein the lateral-direction posture control device comprises a limit-using lateral-direction posture control portion which controls, when turning and braking occur to the vehicle, the up-down moving device to move the left and right wheels within respective limited movement ranges thereof, according to a centrifugal force exerted to the vehicle, and thereby inclines the body inward of the turning circle.

20. The vehicle according to claim 19, further comprising: a steering device which steers said at least one wheel; and a steering control device which controls the steering device and which comprises a steering restraining portion which, when the limit-using lateral-direction-posture control portion controls the up-down moving device while being limited by at least one of the limited movement ranges, controls the steering device such that an absolute value of a steering angle of said at least one wheel is smaller than an absolute value of a steering angle of said at least one wheel on an assumption that the limit-using lateral-direction-posture control portion controls the up-down moving device while being not limited by either of the respective limited movement ranges.

21. A vehicle comprising:
a body;
at least a pair of wheels including a left wheel and a right wheel which are distant from each other in a widthwise direction of the body;
an up-down moving device which is provided between the body and each of the left wheel and the right wheel and which moves said each of the left wheel and the right wheel relative to the body in upward and downward directions;
a lateral-direction posture control device which controls, when the vehicle turns, the up-down moving device so that a position of the left wheel relative to the body and a position of the right wheel relative to the body differ from each other and accordingly the body and the left and right wheels are inclined, relative to a road surface, inward of a turning circle of the vehicle;
at least one wheel which is attached to a portion of the body that is distant from the left and right wheels in a front-rear direction; and
a front-rear-direction posture control device which controls at least the up-down moving device to move the left and right wheels relative to the body in a same direction, and thereby controls an inclination of the body relative to the road surface with respect to the front-rear direction, wherein the lateral-direction posture control device comprises a turning-driving-related control portion which controls, when turning and driving occur to the vehicle, the up-down moving device according to a centrifugal force exerted to the vehicle and thereby inclines the body inward of the turning circle, and the front-rear-direction posture control device comprises a limit-using front-rear-direction-posture control portion which controls, when turning and driving occur to the vehicle, the up-down moving device to move the left and right wheels within respective limited movement ranges thereof, according to an acceleration of the vehicle, and thereby lowers a front portion of the body relative to a rear portion thereof.

22. The vehicle according to claim 21, further comprising:
a drive device which drives at least one driving wheel of a plurality of wheels comprising the left and right wheels and said at least one wheel; and
a driving control device which controls the drive device and which comprises an acceleration restraining portion which, when the limit-using front-rear-direction posture control portion controls the up-down moving device while being limited by at least one of the respective limited movement ranges, controls the drive device such that an acceleration of the vehicle is smaller than an acceleration of the vehicle when the limit-using front-rear-direction posture control portion controls the up-down moving device while being not limited by either of the respective limited movement ranges.

23. A vehicle comprising:
a body;
at least a pair of wheels including a left wheel and a right wheel which are distant from each other in a widthwise direction of the body;
an up-down moving device which is provided between the body and each of the left wheel and the right wheel and which moves said each of the left wheel and the right wheel relative to the body in upward and downward directions;
a lateral-direction posture control device which controls, when the vehicle turns, the up-down moving device so that a position of the left wheel relative to the body and a position of the right wheel relative to the body differ from each other and accordingly the body and the left and right wheels are inclined, relative to a road surface, inward of a turning circle of the vehicle;
at least one steering wheel which is attached to a portion of the body that is located in front of the left and right wheels;
a steering device which steers said at least one steering wheel; and
a steering control device which controls the steering device and thereby controls steering of said at least one steering wheel,
wherein the steering control device comprises a steering restraining portion which, when the lateral-direction posture control portion cannot control, according to a centrifugal force exerted to the vehicle, the up-down moving device to move the left and right wheels relative to the body in the upward and downward directions, controls the steering device such that an absolute value of a steering angle of said at least one steering wheel is smaller than an absolute value of a steering angle of said at least one steering wheel when the lateral-direction-posture control portion can control the up-down moving device according to the centrifugal force.

24. A vehicle comprising:
a body;
at least a pair of wheels including a left wheel and a right wheel which are distant from each other in a widthwise direction of the body;
an up-down moving device which is provided between the body and each of the left wheel and the right wheel and which moves said each of the left wheel and the right wheel relative to the body in upward and downward directions;
a lateral-direction posture control device which controls, when the vehicle turns, the up-down moving device so that a position of the left wheel relative to the body and a position of the right wheel relative to the body differ from each other and accordingly the body and the left and right wheels are inclined, relative to a road surface, inward of a turning circle of the vehicle;

at least one wheel which is attached to a portion of the body that is distant from the left and right wheels in a front-rear direction;

a front-rear-direction posture control device which controls at least the up-down moving device to move the left and right wheels relative to the body in a same direction and thereby controls an inclination of the body relative to the road surface with respect to the front-rear direction;

an obtaining device which obtains at least one of an angle of inclination of the body with respect to the front-rear direction and an angular speed of the inclination of the body;

a drive device which drives at least one driving wheel of a plurality of wheels comprising the left and right wheels and said at least one wheel; and a driving control device which controls the drive device and which comprises an acceleration restraining portion which, when the front-rear-direction posture control portion cannot control, according to a front-rear-direction acceleration of the vehicle, a front-rear-direction posture of the vehicle, controls the drive device based on said at least one of the angle of inclination of the body with respect to the front-rear direction and the angular speed of the inclination of the body, and thereby restrains the acceleration of the vehicle.

25. A vehicle comprising:

a body;

at least a pair of wheels including a left wheel and a right wheel which are distant from each other in a widthwise direction of the body;

an up-down moving device which is provided between the body and each of the left wheel and the right wheel and which moves said each of the left wheel and the right wheel relative to the body in upward and downward directions;

a lateral-direction posture control device which controls, when the vehicle turns, the up-down moving device so that a position of the left wheel relative to the body and a position of the right wheel relative to the body differ from each other and accordingly the body and the left and right wheels are inclined, relative to a road surface, inward of a turning circle of the vehicle;

at least one wheel which is attached to a portion of the body that is distant from the left and right wheels in a front-rear direction; and a front-rear-direction posture control device which controls at least the up-down moving device to move the left and right wheels relative to the body in a same direction and thereby controls an inclination of the body relative to the road surface with respect to the front-rear direction, wherein the front-rear-direction posture control device comprises an acceleration-deceleration-related front-rear-direction inclining portion which controls the up-down moving device to lower a front portion of the body relative to a rear portion thereof when the vehicle is accelerated by being driven and to lower the rear portion of the body relative to the front portion thereof when the vehicle is decelerated by being braked, wherein the acceleration-deceleration-related front-rear-direction inclining portion comprises an inclination-angle determining portion which determines an inclination angle of the body with respect to the front-rear direction such that an absolute value of the inclination angle of the body is greater when an absolute value of a front-rear-direction acceleration of the vehicle is great than when the absolute value of the front-rear-direction acceleration is small, and wherein the front-rear-direction posture control device further comprises an inclination-angle restraining portion which determines the inclination angle of the body with respect to the front-rear direction such that the inclination angle of the body is smaller when at least one of braking and driving occurs to the vehicle in a turning state, than when at least one of braking and driving occurs to the vehicle in a straight running state.

\* \* \* \* \*